US012664947B2

(12) United States Patent
Yun et al.

(10) Patent No.: US 12,664,947 B2
(45) Date of Patent: Jun. 23, 2026

(54) EMISSION SELECTION DRIVER, EMISSION SELECTION GATE DRIVER INCLUDING THE SAME, AND AN ELECTRONIC DEVICE INCLUDING THE EMISSION SELECTION GATE DRIVER

(71) Applicant: Samsung Display Co., LTD., Yongin-si (KR)

(72) Inventors: Eseudeo Yun, Yongin-si (KR); Nackhyeon Keum, Yongin-si (KR); Kyung-Hoon Kim, Yongin-si (KR); Yongchan Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/023,006

(22) Filed: Jan. 15, 2025

(65) Prior Publication Data

US 2025/0342807 A1 Nov. 6, 2025

(30) Foreign Application Priority Data

May 2, 2024 (KR) ........................ 10-2024-0058591

(51) Int. Cl.
*G09G 3/3266* (2016.01)
*G09G 3/36* (2006.01)

(52) U.S. Cl.
CPC ......... *G09G 3/3266* (2013.01); *G09G 3/3685* (2013.01); *G09G 3/3688* (2013.01); *G09G 2310/0202* (2013.01); *G09G 2310/0286* (2013.01); *G09G 2310/08* (2013.01); *G09G 2330/021* (2013.01)

(58) Field of Classification Search
CPC .. G09G 3/3266; G09G 3/3685; G09G 3/3688; G09G 2310/0202; G09G 2310/0286; G09G 2310/08; G09G 2330/021
See application file for complete search history.

(56) References Cited

U.S. PATENT DOCUMENTS

| | | | | |
|---|---|---|---|---|
| 10,354,592 | B2 | 7/2019 | Han | |
| 10,453,386 | B2 * | 10/2019 | Jang | G09G 3/3266 |
| 11,232,734 | B2 * | 1/2022 | Shang | G09G 3/3674 |
| 11,244,629 | B2 * | 2/2022 | Cho | G09G 3/3275 |
| 11,423,843 | B2 * | 8/2022 | Kim | G09G 3/3225 |
| 11,462,170 | B2 * | 10/2022 | Lim | G09G 3/3266 |
| 11,574,584 | B2 * | 2/2023 | Kim | G09G 5/391 |
| 11,594,169 | B2 * | 2/2023 | Kim | G09G 3/3241 |
| 11,869,442 | B2 * | 1/2024 | Ji | G09G 3/3266 |
| 11,893,943 | B2 * | 2/2024 | Chen | G09G 3/3266 |
| 11,922,886 | B2 * | 3/2024 | In | G09G 3/3266 |
| 12,211,446 | B2 * | 1/2025 | In | G09G 3/3275 |
| 12,293,703 | B2 * | 5/2025 | Kim | G09G 3/32 |
| 12,394,385 | B2 * | 8/2025 | Seo | G09G 3/3291 |
| 12,400,603 | B2 * | 8/2025 | Choi | G09G 3/3266 |

(Continued)

*Primary Examiner* — Michael J Jansen, II
(74) *Attorney, Agent, or Firm* — Womble Bond Dickinson (US) LLP

(57) ABSTRACT

An emission selection driver includes an emission driver configured to output an emission signal in response to a voltage of an emission control node and a voltage of an inverted emission control node and a selection driver configured to output a selection signal based on the voltage of the emission control node, the voltage of the inverted emission control node, and an enable signal.

20 Claims, 44 Drawing Sheets

(56) References Cited

U.S. PATENT DOCUMENTS

| | | | | |
|---|---|---|---|---|
| 12,505,782 | B2 * | 12/2025 | Park | G09G 3/2096 |
| 2017/0345366 | A1 * | 11/2017 | Jang | G09G 3/3225 |
| 2021/0090484 | A1 * | 3/2021 | Shang | G09G 3/3266 |
| 2021/0110774 | A1 * | 4/2021 | Cho | G09G 3/3266 |
| 2021/0193048 | A1 * | 6/2021 | Lim | G09G 3/3266 |
| 2021/0366402 | A1 * | 11/2021 | In | G09G 3/3266 |
| 2022/0157250 | A1 * | 5/2022 | Kim | G09G 3/3225 |
| 2022/0208075 | A1 * | 6/2022 | Kim | G11C 19/28 |
| 2022/0375400 | A1 * | 11/2022 | Kim | G09G 5/391 |
| 2023/0075449 | A1 * | 3/2023 | Ji | G09G 3/3266 |
| 2023/0177999 | A1 * | 6/2023 | Park | G09G 3/3266 |
| 2023/0260462 | A1 * | 8/2023 | Chen | G11C 19/28<br>345/214 |
| 2023/0351972 | A1 * | 11/2023 | In | G09G 3/3233 |
| 2024/0265847 | A1 * | 8/2024 | Kim | G09G 3/3266 |
| 2024/0290285 | A1 * | 8/2024 | Choi | G09G 3/3266 |
| 2025/0209985 | A1 * | 6/2025 | Kim | G09G 3/3233 |
| 2025/0209989 | A1 * | 6/2025 | Seo | G09G 3/3291 |
| 2025/0232726 | A1 * | 7/2025 | Cha | G09G 3/3233 |

* cited by examiner

EMISSION SELECTION DRIVER, EMISSION SELECTION GATE DRIVER INCLUDING THE SAME, AND AN ELECTRONIC DEVICE INCLUDING THE EMISSION SELECTION GATE DRIVER

CROSS-REFERENCE TO RELATED APPLICATION

The present application claims priority to and the benefit of Korean Patent Application No. 10-2024-0058591, filed on May 2, 2024, in the Korean Intellectual Property Office, the entire disclosure of which is incorporated by reference herein.

BACKGROUND

1. Field

The present disclosure relates to an emission selection driver, an emission selection gate driver including the same, and an electronic device including the emission selection gate driver. More particularly, the present disclosure relates to an emission selection driver, an emission selection gate driver including the same, and an electronic device including the emission selection gate driver applicable to a display device for performing multi-frequency driving (MFD).

2. Description of the Related Art

Recently, reducing power consumption of a display device has been a focus of the electronic industry. In particular, research focusing on reduction of power consumption of a display device in mobile devices, such as, smartphones and tablet computers has been conducted. In order to reduce the power consumption of the display device, a driving frequency of a display panel may be reduced.

For example, when a still image is displayed on an entire area of the display panel or the display panel operates in always-on display (AOD) mode, the entire area of the display panel may be driven at a low frequency. For example, when the still image is displayed only on a part of the display panel, the part of the display panel may be driven at the low frequency.

In order for the display panel to be driven at the low frequency, a part of signals applied to pixels of the display panel are required to be masked. However, when the part of the signals has pulses in a frame period and is masked by a global scan signal, only a part of the pulses may be masked. That is, a masking operation may malfunction.

SUMMARY

Embodiments of the present disclosure provide an emission selection driver applicable to a display device performing multi-frequency driving (MFD).

Embodiments of the present disclosure provide an emission selection gate driver including the emission selection driver.

In one or more embodiments an emission selection driver includes an emission driver configured to output an emission signal in response to a voltage of an emission control node and a voltage of an inverted emission control node and a selection driver configured to output a selection signal based on the voltage of the emission control node, the voltage of the inverted emission control node, and an enable signal.

In one or more embodiments, the enable signal may be a global scan signal, and the emission signal and the selection signal may be progressive scan signals.

In one or more embodiments, the voltage of the emission control node may have a phase opposite to the voltage of the inverted emission control node. The emission signal may have a same phase as the voltage of the emission control node.

In one or more embodiments, when a pulse of the enable signal overlaps a pulse of the emission signal, a pulse of the selection signal may be output.

In one or more embodiments, when a pulse of the enable signal is output before a pulse of the emission signal and the pulse of the enable signal partially overlaps with the pulse of the emission signal, the selection signal may have no pulse.

In one or more embodiments, when the enable signal maintains a first level, a pulse of the selection signal may be output.

In one or more embodiments, when a pulse of the enable signal is output later than a pulse of the emission signal and the pulse of the enable signal partially overlaps with the pulse of the emission signal, a pulse of the selection signal may be output.

In one or more embodiments, a pulse of the selection signal may have a same length and timing as a pulse of the emission signal.

In one or more embodiments, the selection driver may include a first selection transistor including a gate electrode configured to receive the voltage of the emission control node, a first electrode configured to receive the enable signal, and a second electrode, a second selection transistor including a gate electrode connected to the second electrode of the first selection transistor, a first electrode configured to receive the voltage of the inverted emission control node, and a second electrode connected to a selection control node, a third selection transistor including a gate electrode configured to receive the voltage of the emission control node, a first electrode configured to receive a high gate voltage, and a second electrode connected to the selection control node, a fourth selection transistor including a gate electrode connected to the selection control node, a first electrode configured to receive the high gate voltage, and a second electrode connected to a selection output node from which the selection signal is output, and a fifth selection transistor including a gate electrode configured to receive the voltage of the emission control node, a first electrode configured to receive a low gate voltage, and a second electrode connected to the selection output node.

In one or more embodiments, the first to fifth selection transistors may be P-type transistors.

In one or more embodiments, the selection driver may further include a selection capacitor including a first electrode configured to receive the high gate voltage and a second electrode connected to the selection control node.

In one or more embodiments, when the voltage of the emission control node has a first level, the voltage of the inverted emission control node may have a second level, and the enable signal may have the first level, the selection signal may have the first level.

In one or more embodiments, when the voltage of the emission control node has a first level, the voltage of the inverted emission control node may have a second level, and the enable signal may have the second level, the selection signal may have the first level.

In one or more embodiments, when the voltage of the emission control node has a second level and the voltage of the inverted emission control node has a first level, a voltage of the gate electrode of the second selection transistor may maintain a previous state.

In one or more embodiments, when the previous state of the voltage of the gate electrode of the second selection transistor is the first level, the selection signal may have the second level.

In one or more embodiments, when the previous state of the voltage of the gate electrode of the second selection transistor is the second level, a voltage of the selection control node may maintain a previous state.

In one or more embodiments, when the previous state of the voltage of the selection control node is the second level, the selection signal may maintain the previous state.

In one or more embodiments, an emission selection gate driver includes an emission driver configured to output an emission signal in response to a voltage of an emission control node and a voltage of an inverted emission control node, a selection driver configured to output a selection signal based on the voltage of the emission control node, the voltage of the inverted emission control node, and an enable signal, and a gate driver configured to output a gate signal which is masked based on the selection signal.

In one or more embodiments, the enable signal may be a global scan signal, and the emission signal and the selection signal may be progressive scan signals.

In one or more embodiments, the emission selection driver may include a first selection transistor including a gate electrode configured to receive the voltage of the emission control node, a first electrode configured to receive the enable signal, and a second electrode, a second selection transistor including a gate electrode connected to the second electrode of the first selection transistor, a first electrode configured to receive the voltage of the inverted emission control node, and a second electrode connected to a selection control node, a third selection transistor including a gate electrode configured to receive the voltage of the emission control node, a first electrode configured to receive a high gate voltage, and a second electrode connected to the selection control node, a fourth selection transistor including a gate electrode connected to the selection control node, a first electrode configured to receive the high gate voltage, and a second electrode connected to a selection output node from which the selection signal is output, and a fifth selection transistor including a gate electrode configured to receive the voltage of the emission control node, a first electrode configured to receive a low gate voltage, and a second electrode connected to the selection output node.

In one or more embodiments, an electronic device including a display device having an emission selection driver to drive the display device, the emission selection driver including: an emission driver configured to output an emission signal in response to a voltage of an emission control node and a voltage of an inverted emission control node; and a selection driver configured to output a selection signal based on the voltage of the emission control node, the voltage of the inverted emission control node, and an enable signal.

The electronic device is a smart phone, a cellular phone, a video phone, a smart pad, a smart watch, a tablet PC, a car navigation system, a computer monitor, a laptop, or a head mounted display (HMD) device.

According to one or more embodiments, the emission selection driver and the emission selection gate driver including the emission selection driver, the selection signal may be generated based on the voltage of the emission control node, the voltage of the inverted emission control node, and the enable signal. Therefore, the selection signal may have a same pulse length and timing as the emission signal.

The gate signal may be masked based on the selection signal having the same pulse length and timing as the emission signal, and because the selection signal is the progressive scan signal, an erroneous operation of masking only part of activation pulses of the gate signal may not occur.

BRIEF DESCRIPTION OF THE DRAWINGS

The above and other features of embodiments of the present disclosure will become more apparent by describing in detailed embodiments thereof with reference to the accompanying drawings, in which.

DETAILED DESCRIPTION

Figure 1:
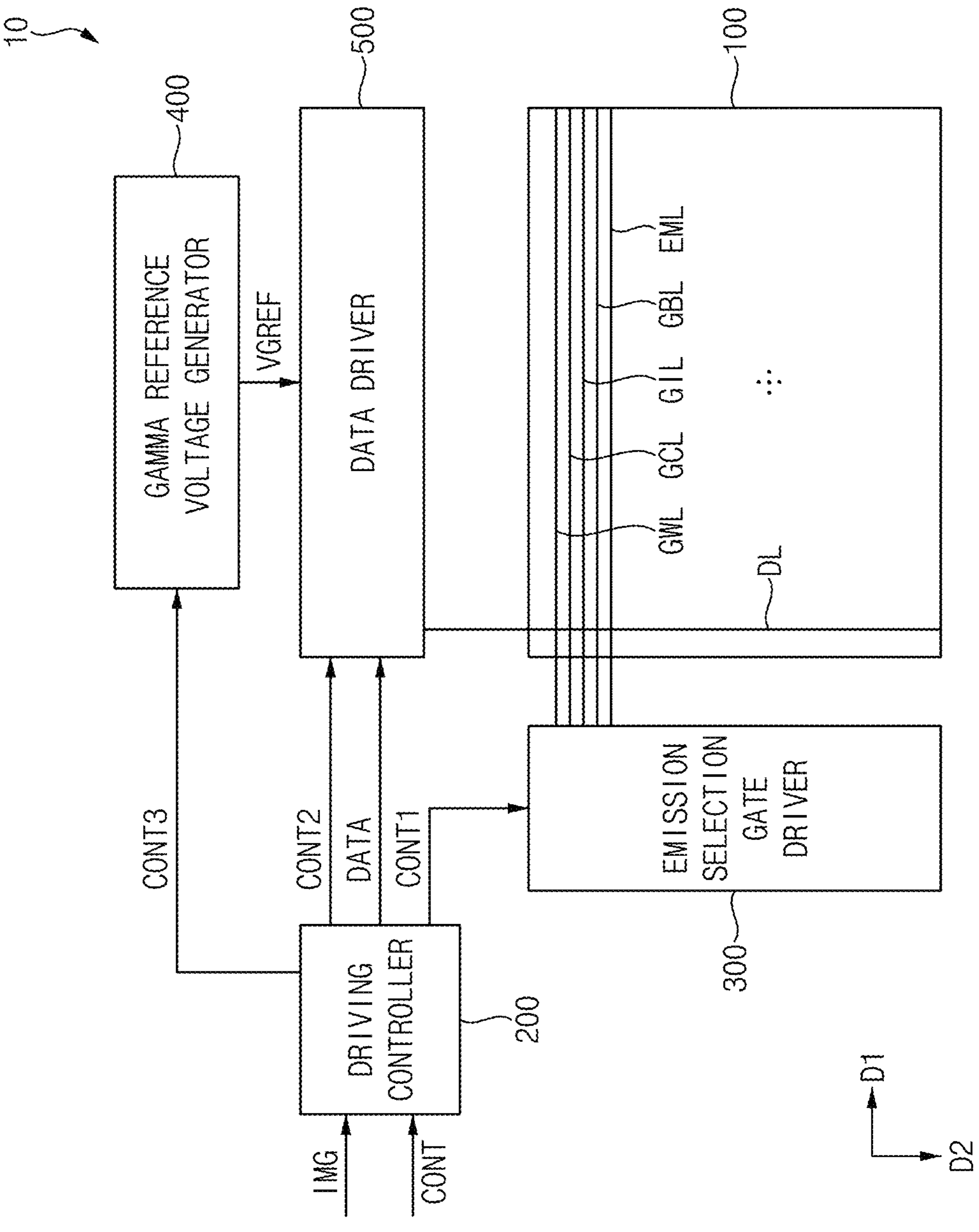
FIG. 1 is a block diagram showing a display device according to one or more embodiments of the present disclosure.

The present disclosure will now be described more fully hereinafter with reference to the accompanying drawings, in which embodiments of the present disclosure are shown. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

It will also be understood that when a layer is referred to as being "on" another layer or substrate, it can be directly on the other layer or substrate, or intervening layers may also be present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Features of various embodiments of the present disclosure may be combined partially or totally. As will be clearly appreciated by those skilled in the art, technically various interactions and operations are possible. Various embodiments can be practiced individually or in combination.

For the purposes of the present disclosure, expressions, such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, XZ, YZ, and ZZ, or any variation thereof. Similarly, the expression, such as "at least one of A and/or B" may include A, B, or A and B. As used herein, the term "and/or" includes any and all combinations of one or more of the associated listed items. For example, the expression, such as "A and/or B" may include A, B, or A and B. Further, the use of "may" when describing embodiments of the present disclosure refers to "one or more embodiments of the present disclosure".

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Also, any numerical range disclosed and/or recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Hereinafter, the present disclosure will be described in more detail with reference to the accompanying drawings.

FIG. 1 is a block diagram showing a display device 10 according to one or more embodiments of the present disclosure.

Referring to FIG. 1, a display device 10 may include a display panel 100 and a display panel driver. The display panel driver may include a driving controller 200, an emission selection gate driver 300, a gamma reference voltage generator 400, and a data driver 500.

The display panel 100 may include a display region for displaying an image and a peripheral region disposed adjacent to the display region.

The display panel 100 may include gate lines GWL, GCL, GIL, GBL, emission lines EML, data lines DL, and pixels electrically connected to the gate lines GWL, GCL, GIL, GBL, the emission lines EML, and the data lines DL, respectively. The gate lines GWL, GCL, GIL, GBL may extend in a first direction D1, the emission lines may extend in the first direction D1, and the data lines DL may extend in a second direction D2 crossing the first direction D1.

The driving controller 200 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the emission selection gate driver 300 based on the input control signal CONT, and output the first control signal CONT1 to the emission selection gate driver 300. The first control signal CONT1 may include a vertical start signal, a gate clock signal, and an emission clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The emission selection gate driver 300 may generate gate signals for driving the gate lines GWL, GCL, GIL, GBL in response to the first control signal CONT1 received from the driving controller 200. The emission selection gate driver 300 may output the gate signals to the gate lines GWL, GCL, GIL, GBL. The emission selection gate driver 300 may generate emission signals for driving the emission lines EML in response to the first control signal CONT1 received from the driving controller 200. The emission selection gate driver 300 may output the emission signals to the emission lines EML.

In FIG. 1, for a convenience of an explanation, the emission selection gate driver 300 may be disposed on a first side of the display panel 100. Although shown, the present disclosure is not limited thereto. The emission selection gate driver 300 may be disposed on an either side of the display panel 100. For example, a part of the emission selection gate driver 300 may be disposed on the first side of the display panel 100 and other part of the emission selection gate driver 300 may be disposed on a second side of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
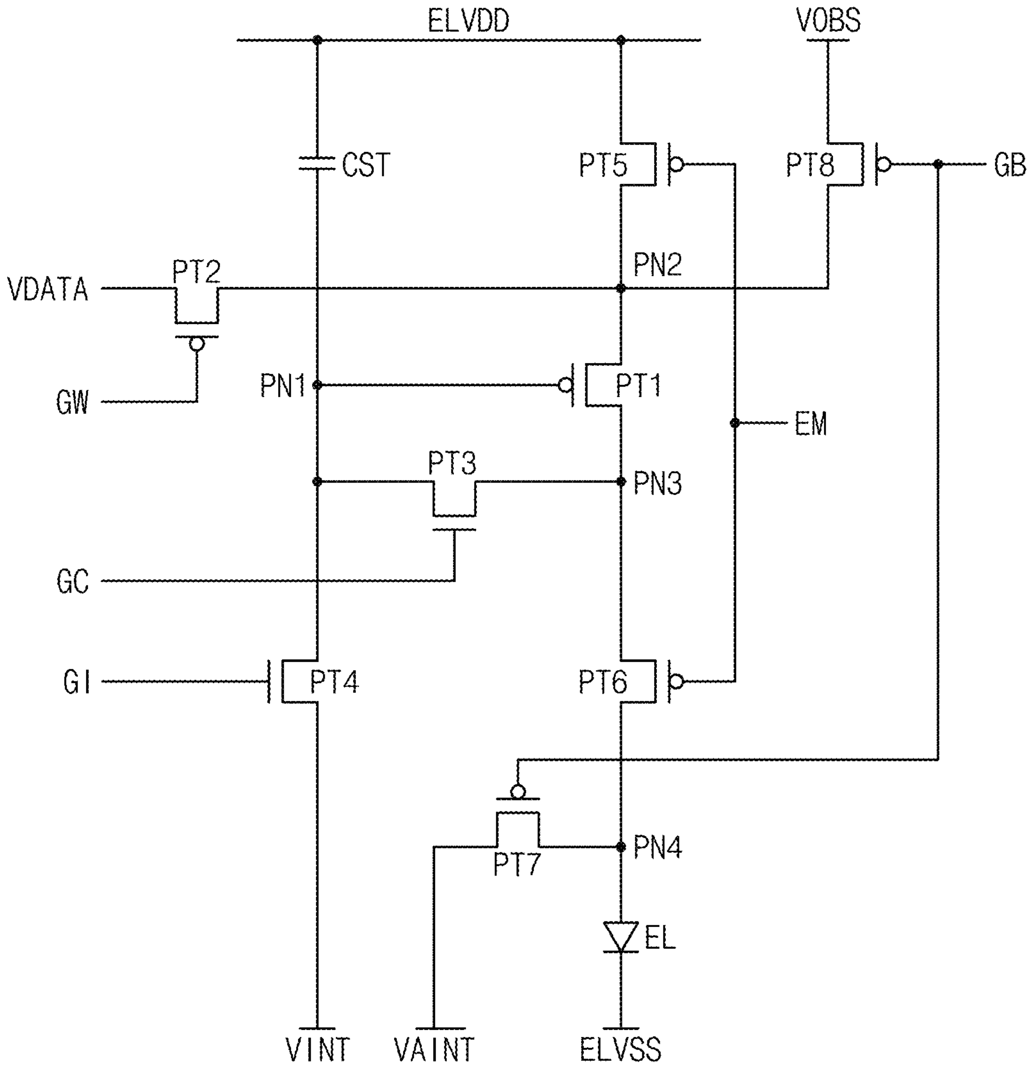
FIG. 2 is a circuit diagram showing an example of a pixel of FIG. 1.

FIG. 2 is a circuit diagram showing an example of a pixel of FIG. 1.

Referring to FIGS. 1 and 2, the pixel may include first to eighth pixel transistors PT1 to PT8, a storage capacitor CST, and a light emitting element EL.

The first pixel transistor PT1 may include a gate electrode connected to a first pixel node PN1, a first electrode connected to a second pixel node PN2, and a second electrode connected to a third pixel node PN3. The first pixel transistor PT1 may generate a driving current based on a difference between a voltage of the first pixel node PN1 and a voltage of the second pixel node PN2.

The second pixel transistor PT2 may include a gate electrode receiving a write gate signal GW, a first electrode receiving a data voltage VDATA, and a second electrode connected to the second pixel node PN2. The second pixel transistor PT2 may be turned on in response to the write gate signal GW to provide the data voltage VDATA to the second pixel node PN2.

The third pixel transistor PT3 may include a gate electrode receiving a compensation gate signal GC, a first electrode connected to the third pixel node PN3, and a second electrode connected to the first pixel node PN1. The third pixel transistor PT3 may be turned on in response to the compensation gate signal GC to diode-connect the first pixel transistor PT1.

The fourth pixel transistor PT4 may include a gate electrode receiving an initialization gate signal GI, a first electrode receiving an initialization voltage VINT, and a second electrode connected to the first pixel node PN1. The fourth pixel transistor PT4 may be turned on in response to the initialization gate signal GI to provide the initialization voltage VINT to the first pixel node PN1.

The fifth pixel transistor PT5 may include a gate electrode receiving an emission signal EM, a first electrode receiving a first power supply voltage ELVDD, and a second electrode connected to the second pixel node PN2. The sixth pixel transistor PT6 may include a gate electrode receiving the emission signal EM, a first electrode connected to the third pixel node PN3, and a second electrode connected to a fourth pixel node PN4. The fifth pixel transistor PT5 and the sixth pixel transistor PT6 may be turned on in response to the emission signal EM to control a light emission of the light emitting element EL.

The seventh pixel transistor PT7 may include a gate electrode receiving a bias gate signal GB, a first electrode receiving an anode initialization voltage VAINT, and a second electrode connected to the fourth pixel node PN4. The seventh pixel transistor PT7 may provide the anode initialization voltage VAINT to the fourth pixel node PN4 in response to the bias gate signal GB.

The eighth pixel transistor PT8 may include a gate electrode receiving the bias gate signal GB, a first electrode receiving a bias voltage VOBS, and a second electrode connected to the second pixel node PN2. The eighth pixel transistor PT8 may be turned on in response to the bias gate signal GB to provide the bias voltage VOBS to the second pixel node PN2.

The storage capacitor CST may include a first electrode receiving the first power supply voltage ELVDD and a second electrode connected to the first pixel node PN1. The storage capacitor CST may store the data voltage VDATA.

The light emitting element EL may include an anode connected to the fourth pixel node PN4 and a cathode receiving a second power supply voltage ELVSS. The light emitting element EL may emit a light based on the driving current. Because an intensity of the driving current is determined based on a level of the data voltage VDATA, a light emitting intensity of the light emitting element EL may be determined based on the level of the data voltage VDATA.

In one or more embodiments, the first, second, and fifth to eighth pixel transistors PT1, PT2, PT5 to PT8 may be P-type transistors, and the third and fourth pixel transistors PT3, PT4 may be N-type transistors. For example, the P-type transistor may be a PMOS (P-type Metal Oxide Semiconductor) transistor. For example, the N-type transistor may be an NMOS (N-type Metal Oxide Semiconductor) transistor. However, the present disclosure is not limited thereto. When a signal applied to a gate electrode of the P-type transistor has the low level, the P-type transistor may be turned on. That is, an activation level of the P-type transistor may be the low level. When a signal applied to the gate electrode of the N-type transistor has a high level, the N-type transistor may be turned on. That is, an activation level of the N-type transistor may be the high level.

In addition, although the pixel in FIG. 2 is shown as including eight transistors PT1 to PT8 and one capacitor CST, the present disclosure is not limited thereto.

Figure 3:
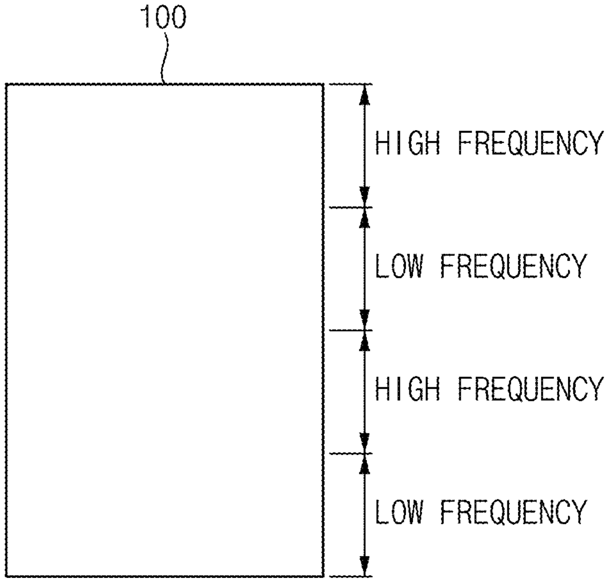
FIG. 3 is a conceptual diagram showing a driving frequency of each region of a display panel of FIG. 1.
Figure 4:
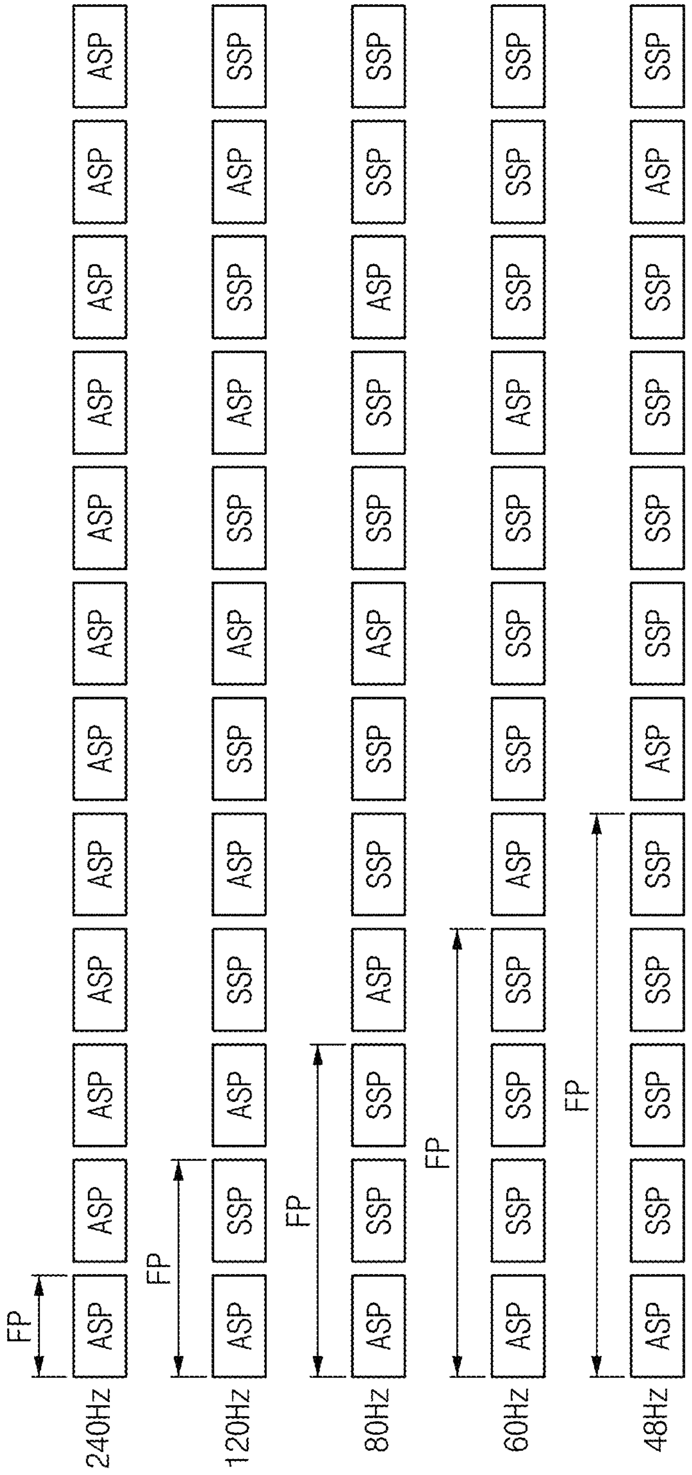
FIG. 4 is a conceptual diagram explaining a driving operation of a display device 10 of FIG. 1.

FIG. 3 is a conceptual diagram showing a driving frequency of each region of a display panel 100 of FIG. 1. FIG. 4 is a conceptual diagram explaining a driving operation of a display device 10 of FIG. 1.

Referring to FIG. 1 and FIG. 4, the display device 10 may support multi-frequency driving (MFD). For the display device 10 supporting MFD, a part of the display panel 100 may be driven at a high frequency, and other part of the display panel 100 may be driven at a low frequency.

A frame period FP may include an address scan period ASP in which a data voltage VDATA is written to a pixel and the light is emitted, and a self-scan period SSP in which the data voltage VDATA is not written to the pixel and only the light is emitted.

When a driving frequency of the display panel 100 is a maximum driving frequency (e.g., 240 Hz), the frame period FP may include only the address scan period ASP. When the driving frequency of the display panel 100 is driving frequencies other than the maximum driving frequency of the display panel 100 (i.e., 120 Hz, 80 Hz, 60 Hz, 48 Hz), the frame period FP may include the address scan period ASP and the self-scan period SSP following the address scan period ASP.

A number of the self-scan periods SSP included in the frame period FP may vary depending on the driving frequency of the display panel 100. For example, when the driving frequency of the display panel 100 is 240 Hz, the frame period FP may include one address scan period ASP. For example, when the driving frequency of the display panel 100 is 120 Hz, the frame period FP may include one address scan period ASP and one self-scan period SSP. For example, when the driving frequency of the display panel 100 is 80 Hz, the frame period FP may include one address scan period ASP and two self-scan periods SSP. For example, when the driving frequency of the display panel 100 is 60 Hz, the frame period FP may include one address scan period ASP and three self-scan periods SSP. For example, when the driving frequency of the display panel 100 is 48 Hz, the frame period FP may include one address scan period ASP and four self-scan periods SSP.

Figure 5:
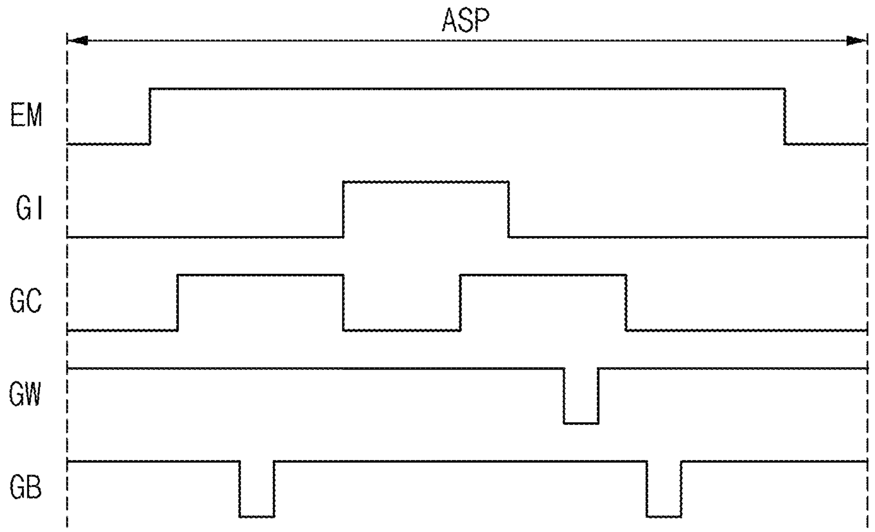
FIG. 5 is a timing diagram showing signals applied to a pixel of FIG. 2 in an address scan period of FIG. 4.

FIG. 5 is a timing diagram showing signals GW, GC, GI, GB, and EM applied to the pixel of FIG. 2 in an address scan period ASP of FIG. 4.

Referring to FIGS. 1-5, in the address scan period ASP, each of a write gate signal GW, a compensation gate signal GC, an initialization gate signal GI, a bias gate signal GB, and an emission signal EM may have at least one activation pulse. For example, each of the write gate signal GW, the initialization gate signal GI, and the emission signal EM may have one activation pulse. For example, each of the compensation gate signal GC and the bias gate signal GB may have two activation pulses.

Each of the write gate signal GW, the bias gate signal GB, and the emission signal EM may have a low pulse as the activation pulse. Here, the low pulse may have a low level as an activation level. For example, the compensation gate signal GC and the initialization gate signal GI may have a high pulse as the activation pulse. Here, the high pulse may have a high level as the activation level.

The duration in which the emission signal EM has a deactivation level (i.e., the high level) may include the activation pulse of the write gate signal GW, the activation pulses of the compensation gate signal GC, the activation pulses of the initialization gate signal GI, and the activation pulse of the bias gate signal GB.

Figure 6:
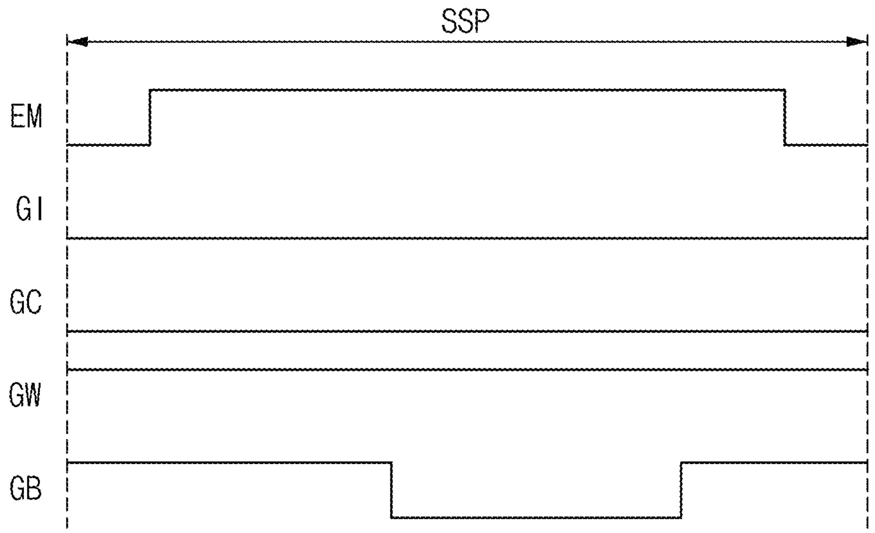
FIG. 6 is a timing diagram showing signals applied to the pixel of FIG. 2 in a self-scan period of FIG. 4.

FIG. 6 is a timing diagram showing signals GW, GC, GI, GB, and EM applied to the pixel of FIG. 2 in a self-scan period SSP of FIG. 4.

Referring to FIGS. 1-6, in the self-scan period SSP, each of the bias gate signal GB and the emission signal EM may have at least one activation pulse. For example, each of the bias gate signal GB and the emission signal EM may have one activation pulse. Each of the bias gate signal GB and the emission signal EM may have the low pulse as the activation pulse. Here, the low pulse may have the low level as the activation level.

The period in which the emission signal EM has the deactivation level (i.e., the high level) may include the activation pulse of the bias gate signal GB.

On the other hand, each of the write gate signal GW, the compensation gate signal GC, and the initialization gate signal GI may not have the activation pulse. That is, each of the write gate signal GW, the compensation gate signal GC, and the initialization gate signal GI may have only the deactivation level. For example, each of the write gate signal GW, the compensation gate signal GC, and the initialization gate signal GI may be masked to have only the deactivation level.

Figure 7:
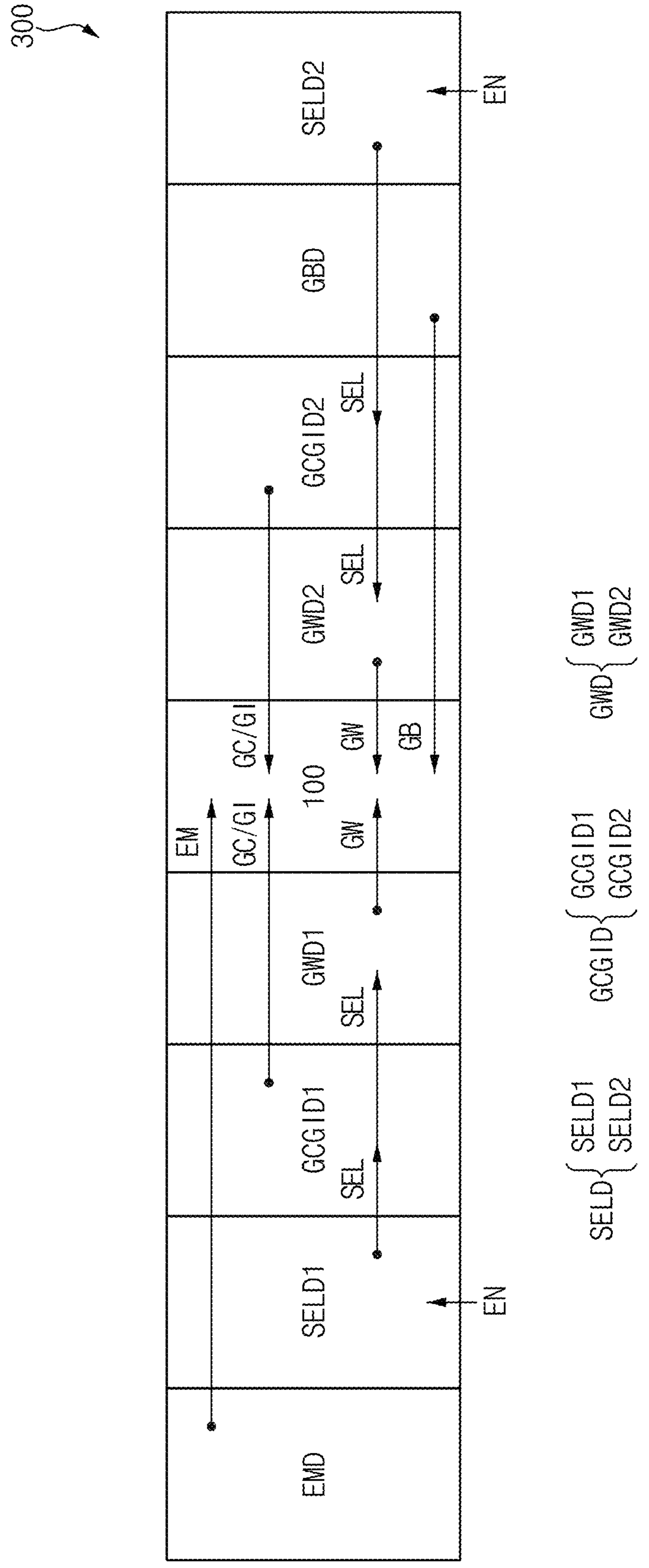
FIG. 7 is a block diagram showing an example of an emission selection gate driver of FIG. 1.

FIG. 7 is a block diagram showing an example of an emission selection gate driver 300 of FIG. 1.

Referring to FIGS. 1-7, the emission selection gate driver 300 may include a plurality of drivers.

For example, the drivers may include an emission driver EMD, a selection driver SELD, a compensation initialization gate driver GCGID, a write gate driver GWD, and a bias gate driver GBD. For example, the selection driver SELD may include a first selection driver SELD1 and a second selection driver SELD2, the compensation initialization gate driver GCGID may include a first compensation initialization gate driver GCGID1 and a second compensation initialization gate driver GCGID2, and the write gate driver GWD may include a first write gate driver GWD1 and a second write gate driver GWD2.

A part of the drivers of the emission selection gate driver 300 may be disposed on a first side of the display panel 100, and other part of the drivers of the emission selection gate driver 300 may be disposed on a second side of the display panel 100.

For example, the emission driver EMD, the first selection driver SELD1, the first compensation initialization gate driver GCGID1, and the first write gate driver GWD1 may be disposed on the first side of the display panel 100. For example, the second selection driver SELD2, the bias gate driver GBD, the second compensation initialization gate driver GCGID2, and the second write gate driver GWD2 may be disposed on the second side of the display panel 100.

The emission driver EMD may generate the emission signal EM and provide the emission signal EM to the pixels of the display panel 100.

The first selection driver SELD1 may generate a selection signal SEL based on an enable signal EN, and may provide the selection signal SEL to the first compensation initialization gate driver GCGID1 and the first write gate driver GWD1.

The first compensation initialization gate driver GCGID1 may generate the compensation gate signal GC and the initialization gate signal GI, and may provide the compensation gate signal GC and the initialization gate signal GI to the pixels of the display panel 100. However, the compensation gate signal GC and the initialization gate signal GI may be masked based on the selection signal SEL.

The first write gate driver GWD1 may generate the write gate signal GW and provide the write gate signal GW to the pixels of the display panel 100. However, the write gate signal GW may be masked based on the selection signal SEL.

The second selection driver SELD2 may generate the selection signal SEL based on the enable signal EN, and provide the selection signal SEL to the second compensation initialization gate driver GCGID2 and the second write gate driver GWD2.

The bias gate driver GBD may generate the bias gate signal GB and provide the bias gate signal GB to the pixels of the display panel 100.

The second compensation initialization gate driver GCGID2 may generate the compensation gate signal GC and the initialization gate signal GI, and may provide the compensation gate signal GC and the initialization gate signal GI to the pixels of the display panel 100. However, the compensation gate signal GC and the initialization gate signal GI may be masked based on the selection signal SEL.

The second write gate driver GWD2 may generate the write gate signal GW, and may provide the write gate signal GW to the pixels of the display panel 100. However, the write gate signal GW may be masked based on the selection signal SEL.

Here, the enable signal EN may be a global scan signal, and each of the write gate signal GW, the compensation gate signal GC, the initialization gate signal GI, the bias gate signal GB, the emission signal EM, and the selection signal SEL may be a progressive scan signal.

Figure 8:
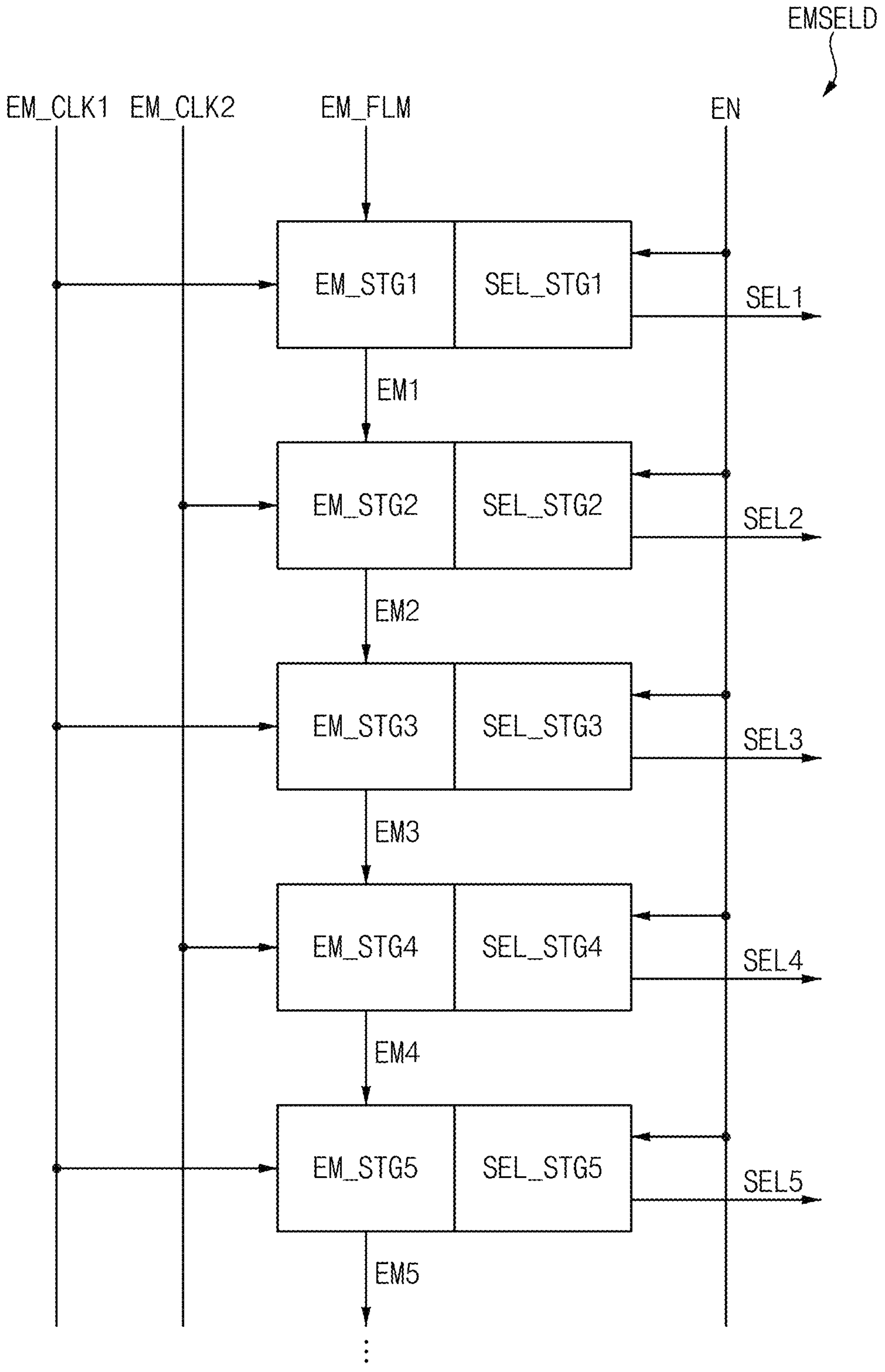
FIG. 8 is a block diagram showing an emission selection driver including an emission driver and a selection driver of FIG. 7.
Figure 9:
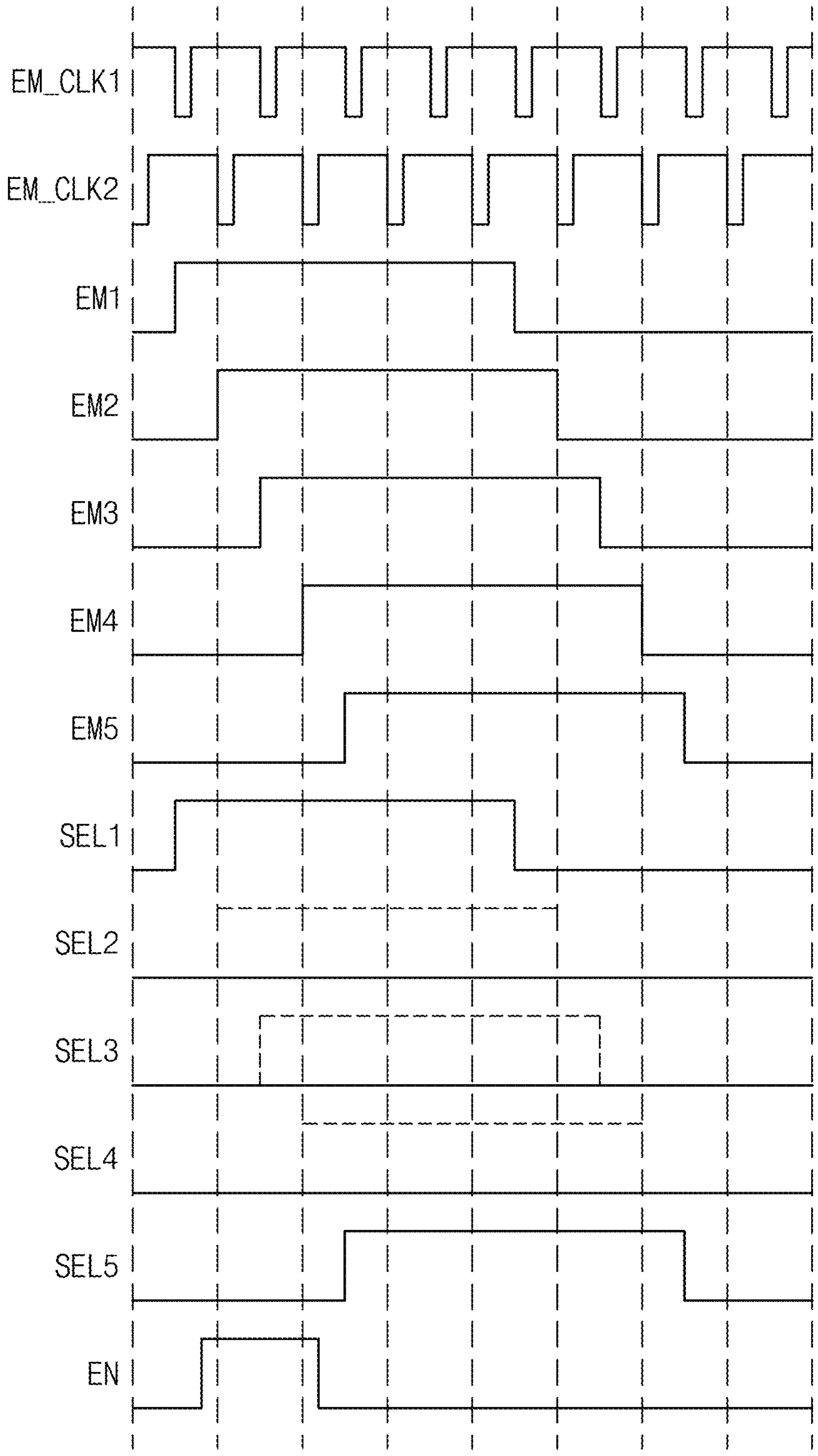
FIG. 9 is a timing diagram showing emission signals and selection signals of FIG. 8.

FIG. 8 is a block diagram showing an emission selection driver EMSELD including an emission driver EMD and a selection driver SELD of FIG. 7. FIG. 9 is a timing diagram showing emission signals EM1, EM2, EM3, EM4, EM5, . . . and selection signals SEL1, SEL2, SEL3, SEL4, SEL5, . . . of FIG. 8.

Referring to FIGS. 1-9, the emission selection driver EMSELD may include the emission driver EMD and the selection driver SELD. The emission driver EMD may include a plurality of emission stages EM_STG1, EM_STG2, EM_STG3, EM_STG4, EM_STG5, . . . , and the selection driver SELD may include a plurality of selection stages SEL_STG1, SEL_STG2, SEL_STG3, SEL_STG4, SEL_STG5, . . . .

The emission stages EM_STG1, EM_STG2, EM_STG3, EM_STG4, EM_STG5, . . . may receive an emission start signal EM_FLM, a first emission clock signal EM_CLK1, and a second emission clock signal EM_CLK2.

Each of the emission stages EM_STG1, EM_STG2, EM_STG3, EM_STG4, EM_STG5, . . . may alternately receive the first emission clock signal EM_CLK1 and the second emission clock signal EM_CLK2. For example, a clock terminal of a first emission stage EM_STG1 may receive the first emission clock signal EM_CLK1. For example, a clock terminal of a second emission stage EM_STG2 may receive the second emission clock signal EM_CLK2. For example, a clock terminal of a third emission stage EM_STG3 may receive the first emission clock signal EM_CLK1. For example, a clock terminal of a fourth emission stage EM_STG4 may receive the second emission clock signal EM_CLK2. For example, a clock terminal of a fifth emission stage EM_STG5 may receive the first emission clock signal EM_CLK1.

The emission stages EM_STG1, EM_STG2, EM_STG3, EM_STG4, EM_STG5, . . . may sequentially output emission signals EM1, EM2, EM3, EM4, EM5, . . . in response to a voltage of an emission control node and a voltage of an inverted emission control node. For example, the first emission stage EM_STG1 may output a first emission signal EM1. For example, the second emission stage EM_STG2 may output a second emission signal EM2. For example, the third emission stage EM_STG3 may output a third emission signal EM3. For example, the fourth emission stage EM_STG4 may output a fourth emission signal EM4. For example, the fifth emission stage EM_STG5 may output a fifth emission signal EM5.

An input terminal of the first emission stage EM_STG1 may receive the emission start signal EM_FLM, and an input terminal of each of subsequent emission stages EM_STG2, EM_STG3, EM_STG4, . . . may receive an emission signal of a previous emission stage. For example, the input terminal of the second emission stage EM_STG2 may receive the first emission signal EM1 of the first emission stage EM_STG1. For example, the third emission stage EM_STG3 may receive the second emission signal EM2 of the second emission stage EM_STG2. For example, the fourth emission stage EM_STG4 may receive the third emission signal EM3 of the third emission stage EM_STG3. For example, the fifth emission stage EM_STG5 may receive the fourth emission signal EM4 of the fourth emission stage EM_STG4.

Each of the selection stages SEL_STG1, SEL_STG2, SEL_STG3, SEL_STG4, SEL_STG5, . . . may receive the voltage of the emission control node, the voltage of the inverted emission control node, and an enable signal EN.

The selection stages SEL_STG1, SEL_STG2, SEL_STG3, SEL_STG4, SEL_STG5, . . . may sequentially output the selection signals SEL1, SEL2, SEL3, SEL4, SEL5, . . . in response to the voltage of the emission control node, the voltage of the inverted emission control node, and the enable signal EN. For example, the first selection stage SEL_STG1 may output a first selection signal SEL1. For example, the second selection stage SEL_STG2 may output a second selection signal SEL2. For example, the third selection stage SEL_STG3 may output a third selection signal SEL3. For example, the fourth selection stage SEL_STG4 may output a fourth selection signal SEL4. For example, the fifth selection stage SEL_STG5 may output a fifth selection signal SEL5.

Because the emission signals EM1, EM2, EM3, EM4, EM5, . . . and the selection signals SEL1, SEL2, SEL3, SEL4, SEL5, . . . are output based on the voltage of the emission control node and the voltage of the inverted emission control node, a pulse of the selection signal SEL1, SEL2, SEL3, SEL4, SEL5, . . . may have a same length and timing as a pulse of the emission signal EM1, EM2, EM3, EM4, EM5, . . . .

An output of the selection signal SEL1, SEL2, SEL3, SEL4, SEL5, . . . may be controlled based on the enable signal EN. An output of the pulse of the selection signal SEL1, SEL2, SEL3, SEL4, SEL5, . . . may be controlled according to a position of the enable signal EN. Because the pulse of the selection signal SEL1, SEL2, SEL3, SEL4, SEL5, . . . has the same length and timing as the pulse of the emission signal EM1, EM2, EM3, EM4, EM5, . . . , the output of the pulse of the selection signal SEL1, SEL2, SEL3, SEL4, SEL5, . . . may be determined based on a relationship between a position of the pulse of the emission signal EM1, EM2, EM3, EM4, EM5, . . . and a position of the pulse of the selection signal SEL1, SEL2, SEL3, SEL4, SEL5, . . . .

For example, the pulse of the enable signal EN may be included in the pulse of the emission signal EM1. That is, the pulse of the enable signal EN may completely overlap with the pulse of the emission signal EM1. In this case, the pulse of the selection signal SEL1 may be output, and the pulse of the selection signal SEL1 may have the same length and timing as the pulse of the emission signal EM1.

For example, the pulse of the enable signal EN may be output before the pulse of the emission signals EM2, EM3, EM4, EM5 and the pulse of the enable signal EN may partially overlap with the pulse of the emission signals EM2, EM3, EM4. In this case, the selection signal SEL2, SEL3, SEL4 may not have the pulse.

For example, when the enable signal EN maintains a low level, the pulse of the selection signal SEL5 may be output, and the pulse of the selection signal SEL5 may have the same length and timing as the pulse of the emission signal EM5 in length and timing.

For example, the pulse of the enable signal EN may be output later than a pulse of an emission signal, and the pulse of the enable signal EN may partially overlap with the pulse of the emission signal. In this case, the pulse of the selection signal may be output, and the pulse of the selection signal may have the same length and timing as the pulse of the emission signal.

Figure 10:
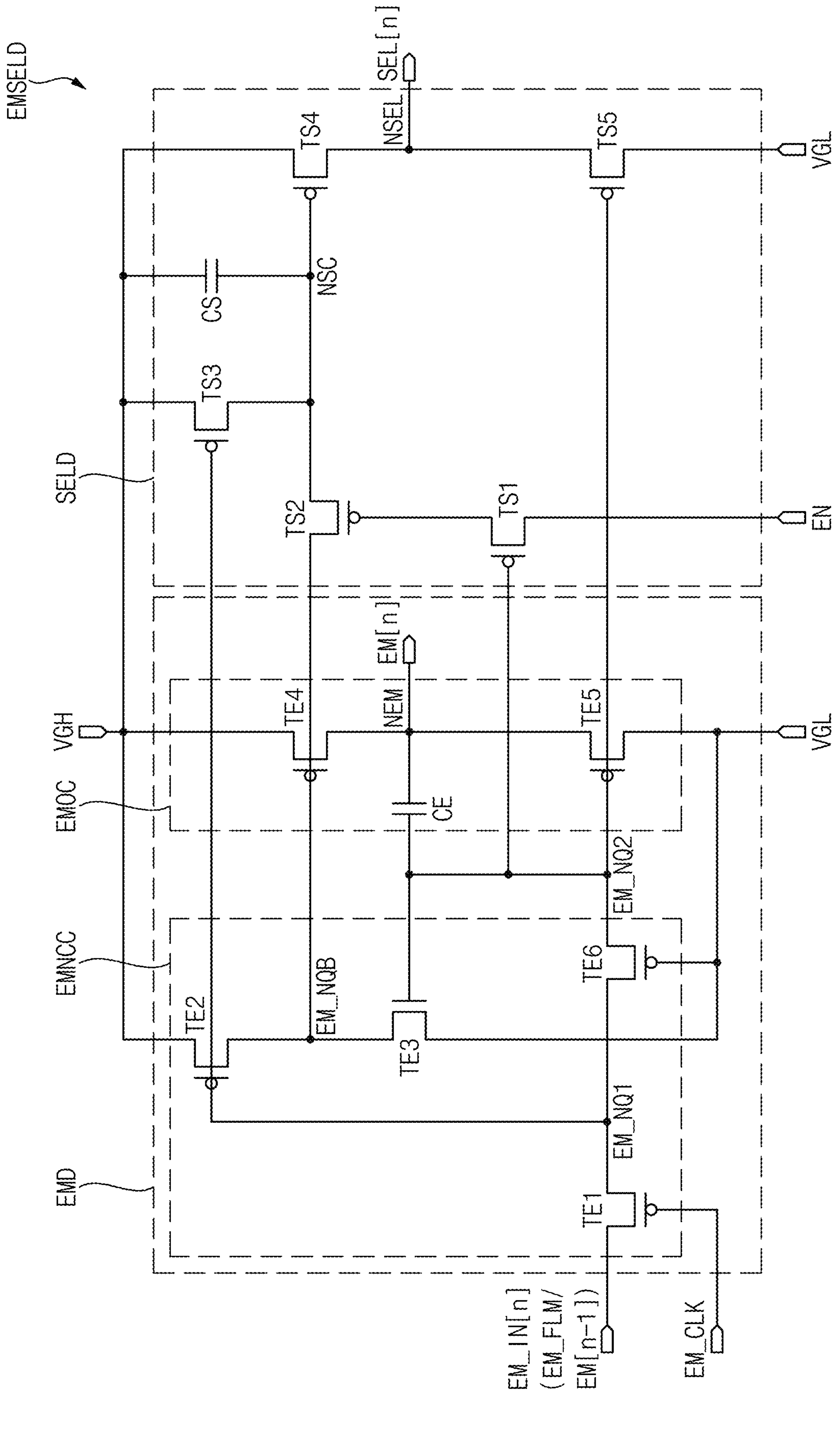
FIG. 10 is a circuit diagram showing the emission selection driver of FIG. 8.

FIG. 10 is a circuit diagram showing an emission selection driver EMSELD of FIG. 8.

Referring to FIGS. 1-10, the emission selection driver EMSELD may include an emission driver EMD and a selection driver SELD. The emission driver EMD may include a plurality of emission stages, and the selection driver SELD may include a plurality of selection stages. FIG. 10 shows an n-th emission stage and an n-th selection stage. Here, n is a positive integer greater than or equal to 1.

The emission driver EMD may include an emission node control circuit EMNCC and an emission output circuit EMOC. The emission node control circuit EMNCC may include a first emission transistor TE1, a second emission transistor TE2, a third emission transistor TE3, and a sixth emission transistor TE6. The emission output circuit EMOC may include a fourth emission transistor TE4, a fifth emission transistor TE5, and an emission capacitor CE.

The first emission transistor TE1 may include a gate electrode receiving an emission clock signal EM_CLK, a first electrode receiving an emission input signal EM_IN[n], and a second electrode connected to an emission control node EM_NQ1, EM_NQ2. The first emission transistor TE1 may be turned on in response to the emission clock signal EM_CLK to provide the input signal EM_IN[n] to the emission control node EM_NQ1, EM_NQ2. The emission input signal EM_IN[n] may be an emission start signal EM_FLM or a previous emission signal EM[n−1]. When n is 1, the emission input signal EM_IN[n] may be the emission start signal EM_FLM. When n is 2 or greater, the emission input signal EM_IN[n] may be the previous emission signal EM[n−1].

The second emission transistor TE2 may include a gate electrode connected to the emission control node EM_NQ1, EM_NQ2, a first electrode receiving a high gate voltage VGH, and a second electrode connected to an inverted emission control node EM_NQB. The second emission transistor TE2 may be turned on in response to a voltage of the emission control node EM_NQ1, EM_NQ2 to provide the high gate voltage VGH to the inverted emission control node EM_NQB.

The third emission transistor TE3 may include a gate electrode connected to the emission control node EM_NQ1, EM_NQ2, a first electrode receiving a low gate voltage VGL, and a second electrode connected to the inverted emission control node EM_NQB. The third emission transistor TE3 may be turned on in response to the voltage of the emission control node EM_NQ1, EM_NQ2 to provide the low gate voltage VGL to the inverted emission control node EM_NQB.

The fourth emission transistor TE4 may include a gate electrode connected to the inverted emission control node EM_NQB, a first electrode receiving the high gate voltage VGH, and a second electrode connected to an emission output node NEM outputting an emission signal EM[n]. The fourth emission transistor TE4 may be turned on in response to a voltage of the inverted emission control node EM_NQB to output the high gate voltage VGH as the emission signal EM[n].

The fifth emission transistor TE5 may include a gate electrode connected to the emission control node EM_NQ1, EM_NQ2, a first electrode receiving the low gate voltage VGL, and a second electrode connected to the emission output node NEM. The fifth emission transistor TE5 may be turned on in response to the voltage of the emission control node EM_NQ1, EM_NQ2 to output the low gate voltage VGL as the emission signal EM[n].

The emission control node EM_NQ1, EM_NQ2 may include a first emission control node EM_NQ1 and a second emission control node EM_NQ2.

The sixth emission transistor TE6 may include a gate electrode receiving the low gate voltage VGL, a first electrode connected to the first emission control node EM_NQ1, and a second electrode connected to the second emission control node EM_NQ2. The sixth emission transistor TE6 may be turned on in response to the low gate voltage VGL. Therefore, the sixth emission transistor TE6 may be an always-on transistor (AOT). The sixth emission transistor TE6 may control a voltage of the first emission control node EM_NQ1 and a voltage of the second emission control node EM_NQ2.

The emission capacitor CE may include a first electrode connected to the emission control node EM_NQ1, EM_NQ2 and a second electrode connected to the emission output node NEM.

The first, second, and fourth to sixth emission transistors TE1, TE2, TE4 to TE6 may be P-type transistors. For example, the P-type transistor may be a PMOS transistor. The third emission transistor TE3 may be an N-type transistor. For example, the N-type transistor may be an NMOS transistor.

In FIG. 10, the emission driver EMD is shown as including six transistors TE1 to TE6 and one capacitor CE, but the present disclosure is not limited thereto. The emission driver EMD may have any configuration which outputs the emission signal EM[n] in response to the voltage of the emission control node EM_NQ1, EM_NQ2 and the voltage of the inverted emission control node EM_NQB.

The selection driver SELD may include first to fifth selection transistors TS1 to TS5 and a selection capacitor CS.

The first selection transistor TS1 may include a gate electrode connected to the emission control node EM_NQ1, EM_NQ2, a first electrode receiving an enable signal EN, and a second electrode connected to a gate electrode of the second selection transistor TS2. The first selection transistor TS1 may provide the enable signal EN to the second selection transistor TS2 in response to the voltage of the emission control node EM_NQ1, EM_NQ2.

The second selection transistor TS2 may include a gate electrode connected to the second electrode of the first selection transistor TS1, a first electrode connected to the inverted emission control node EM_NQB, and a second electrode connected to a selection control node NSC. The second selection transistor TS2 may be turned on in response to a voltage of the gate electrode of the second selection transistor TS2 to provide the voltage of the inverted emission control node EM_NQB to the selection control node NSC.

The third selection transistor TS3 may include a gate electrode connected to the emission control node EM_NQ1, EM_NQ2, a first electrode receiving the high gate voltage VGH, and a second electrode connected to the selection control node NSC. The third selection transistor TS3 may provide the high gate voltage VGH to the selection control node NSC in response to the voltage of the emission control node EM_NQ1, EM_NQ2.

The fourth selection transistor TS4 may include a gate electrode connected to the selection control node NSC, a first electrode receiving the high gate voltage VGH, and a second electrode connected to a selection output node NSEL from which the selection signal SEL[n] is output. The fourth selection transistor TS4 may be turned on in response to the voltage of the selection control node NSC to output the high gate voltage VGH as the selection signal SEL[n].

The fifth selection transistor TS5 may include a gate electrode connected to the emission control node EM_NQ1, EM_NQ2, a first electrode receiving the low gate voltage VGL, and a second electrode connected to the selection output node NSEL. The fifth selection transistor TS5 may be turned on in response to the voltage of the emission control node EM_NQ1, EM_NQ2 to output the low gate voltage VGL as the selection signal SEL[n].

The selection capacitor CS may include a first electrode receiving the high gate voltage VGH and a second electrode connected to the selection control node NSC.

The first to fifth selection transistors TS1 to TS5 may be the P-type transistors. For example, the P-type transistor may be the PMOS transistor.

When a signal applied to a gate electrode of the P-type transistor is a low level, the P-type transistor may be turned on. That is, an activation level of the P-type transistor may be the low level. When a signal applied to a gate electrode of the N-type transistor is a high level, the N-type transistor may be turned on. That is, an activation level of the N-type transistor may be the high level. In FIGS. 11-45, the low level may be referred to as a first level and the high level may be referred to as a second level.

Figure 11:
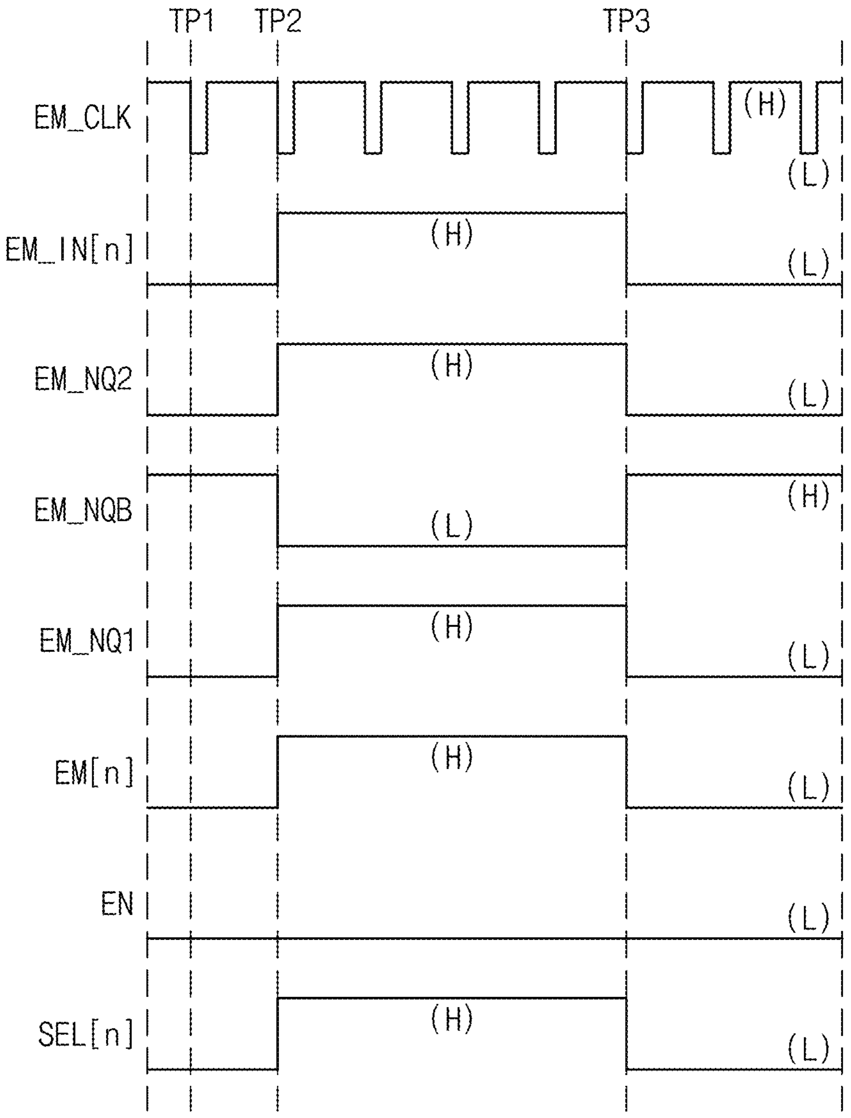
FIG. 11 is a timing diagram showing an operation of the emission selection driver of FIG. 10 when an enable signal of FIG. 10 maintains a first level.
Figure 12:
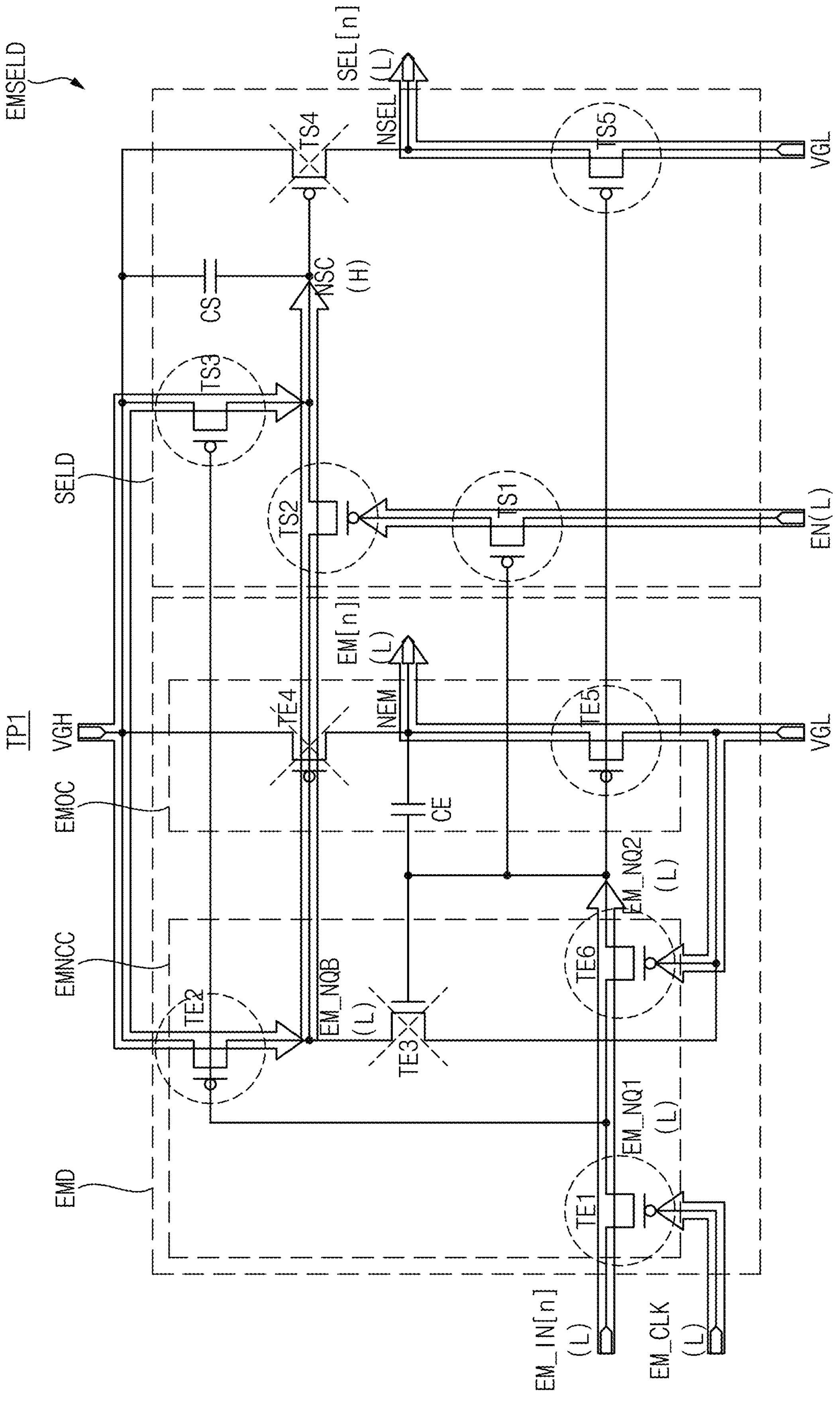
FIG. 12 is a circuit diagram showing an operation of the emission selection driver of FIG. 10 at a first time point of FIG. 11.
Figure 13:
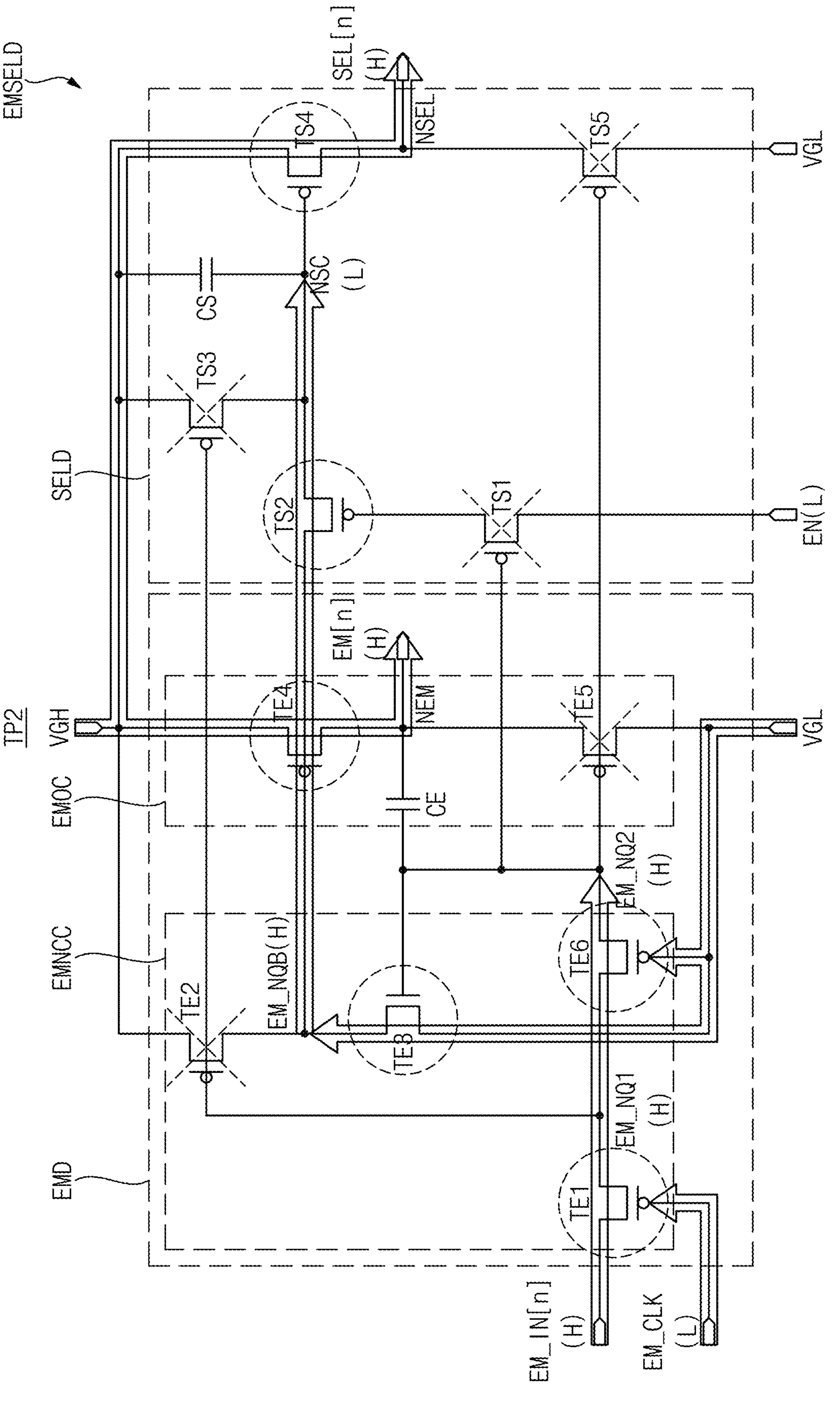
FIG. 13 is a circuit diagram showing the operation of an emission selection driver of FIG. 10 at a second time point of FIG. 11.
Figure 14:
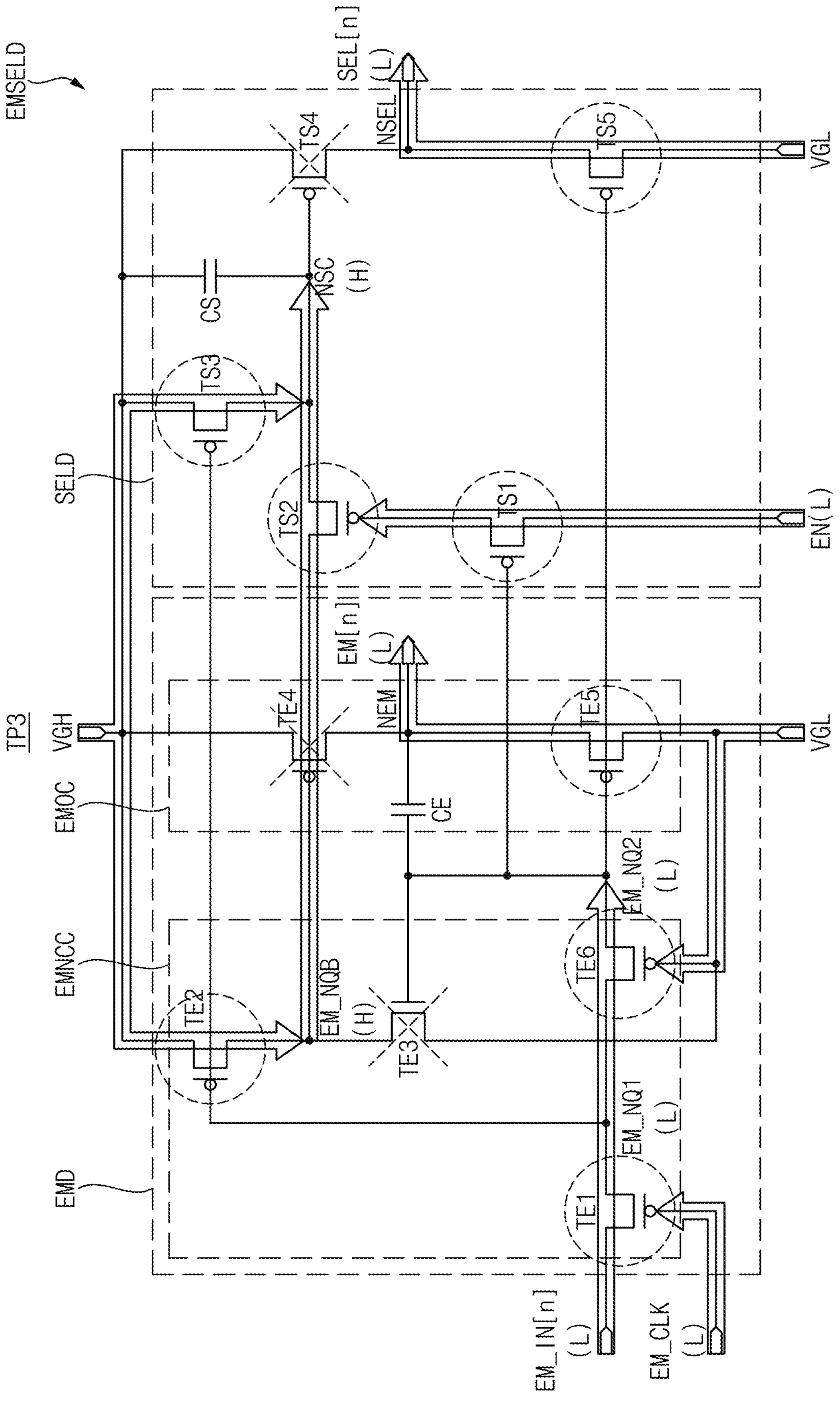
FIG. 14 is a circuit diagram showing an operation of the emission selection driver of FIG. 10 at a third time point of FIG. 11.

FIG. 11 is a timing diagram showing an operation of the emission selection driver EMSELD of FIG. 10 when an enable signal EN of FIG. 10 maintains a first level L. FIG. 12 is a circuit diagram showing an operation of the emission selection driver EMSELD of FIG. 10 at a first time point TP1 of FIG. 11. FIG. 13 is a circuit diagram showing an operation of the emission selection driver EMSELD of FIG. 10 at a second time point TP2 of FIG. 11. FIG. 14 is a circuit diagram showing an operation of the emission selection driver EMSELD of FIG. 10 at a third time point TP3 of FIG. 11.

Referring to FIGS. 1-14, at the first time point TP1, the emission clock signal EM_CLK may have the first level L, the emission input signal EM_IN[n] may have the first level L, and the enable signal EN may have the first level L.

The first emission transistor TE1 may be turned on in response to the emission clock signal EM_CLK having the first level L to provide the emission input signal EM_IN[n] having the first level L to the first emission control node EM_NQ1. In addition, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the first level L.

The fifth emission transistor TE5 may be turned on in response to the voltage of the emission control node EM_NQ1, EM_NQ2 having the first level L to output the low gate voltage VGL as the emission signal EM[n]. Therefore, the emission signal EM[n] may have the first level L.

The third emission transistor TE3 may be turned off in response to the voltage of the emission control node EM_NQ1, EM_NQ2 having the first level L.

The second emission transistor TE2 may be turned on in response to the voltage of the emission control node EM_NQ1, EM_NQ2 having the first level L to provide the high gate voltage VGH to the inverted emission control node EM_NQB. Therefore, the voltage of the inverted emission control node EM_NQB may have the second level H.

The fourth emission transistor TE4 may be turned off in response to the voltage of the inverted emission control node EM_NQB having the second level H.

The fifth selection transistor TS5 may be turned on in response to the voltage of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage of the emission control node EM_NQ1, EM_NQ2 having the first level L to provide the enable signal EN having the first level L to the gate electrode of the second selection transistor TS2. Therefore, the voltage of the gate electrode of the second selection transistor TS2 may have the first level L.

The second selection transistor TS2 may be turned on in response to the voltage of the gate electrode of the second selection transistor TS2 having the first level L to provide the voltage of the inverted emission control node EM_NQB having the second level H to the selection control node NSC. Therefore, the voltage of the selection control node NSC may have the second level H.

The third selection transistor TS3 may be turned on in response to the voltage of the emission control node EM_NQ1, EM_NQ2 having the first level L to provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

At the second time point TP2, the emission clock signal EM_CLK may have the first level L, the emission input signal EM_IN[n] may have the second level H, and the enable signal EN may have the first level L.

The first emission transistor TE1 may be turned on in response to the emission clock signal EM_CLK having the first level L to provide the emission input signal EM_IN[n] having the second level H to the first emission control node EM_NQ1. In addition, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the second level H.

The fifth emission transistor TE5 may be turned off in response to the voltage of the emission control node EM_NQ1, EM_NQ2 having the second level H.

The third emission transistor TE3 may be turned on in response to the voltage of the emission control node EM_NQ1, EM_NQ2 having the second level H to provide the low gate voltage VGL to the inverted emission control node EM_NQB. Therefore, the voltage of the inverted emission control node EM_NQB may have the first level L.

The fourth emission transistor TE4 may be turned on in response to the voltage of the inverted emission control node EM_NQB having the first level L to output the high gate voltage VGH as the emission signal EM[n]. Therefore, the emission signal EM[n] may have the second level H.

The second emission transistor TE2 may be turned off in response to the voltage of the emission control node EM_NQ1, EM_NQ2 having the second level H.

The fifth selection transistor TS5 may be turned off in response to the voltage of the emission control node EM_NQ1, EM_NQ2 having the second level H.

The first selection transistor TS1 may be turned off in response to the voltage of the emission control node EM_NQ1, EM_NQ2 having the second level H. Therefore, the gate electrode of the second selection transistor TS2 may be floated, and the voltage of the gate electrode of the second selection transistor TS2 may maintain a previous state which is the first level L.

The second selection transistor TS2 may be turned on in response to the voltage of the gate electrode of the second selection transistor TS2 having the first level L and may provide the voltage of the inverted emission control node EM_NQB having the first level L to the selection control node NSC. Therefore, the voltage of the selection control node NSC may have the first level L.

The third selection transistor TS3 may be turned off in response to the voltage of the emission control node EM_NQ1, EM_NQ2 having the second level H.

The fourth selection transistor TS4 may be turned on in response to the voltage of the inverted emission control node EM_NQB having the first level L to output the high gate voltage VGH as the selection signal SEL[n]. Therefore, the selection signal SEL[n] may have the second level H.

At the third time point TP3, the emission clock signal EM_CLK may have the first level L, the emission input signal EM_IN[n] may have the first level L, and the enable signal EN may have the first level L.

The first emission transistor TE1 may be turned on in response to the emission clock signal EM_CLK having the first level L to provide the emission input signal EM_IN[n] having the first level L to the first emission control node EM_NQ1. In addition, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the first level L.

The fifth emission transistor TE5 may be turned on in response to the voltage of the emission control node EM_NQ1, EM_NQ2 having the first level L to output the low gate voltage VGL as the emission signal EM[n]. Therefore, the emission signal EM[n] may have the first level L.

The third emission transistor TE3 may be turned off in response to the voltage of the emission control node EM_NQ1, EM_NQ2 having the first level L.

The second emission transistor TE2 may be turned on in response to the voltage of the emission control node EM_NQ1, EM_NQ2 having the first level L to provide the high gate voltage VGH to the inverted emission control node EM_NQB. Therefore, the voltage of the inverted emission control node EM_NQB may have the second level H.

The fourth emission transistor TE4 may be turned off in response to the voltage of the inverted emission control node EM_NQB having the second level H.

The fifth selection transistor TS5 may be turned on in response to the voltage of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage of the emission control node EM_NQ1, EM_NQ2 having the first level L to provide the enable signal EN having the first level L to the gate electrode of the second selection transistor TS2. Therefore, the voltage of the gate electrode of the second selection transistor TS2 may have the first level L.

The second selection transistor TS2 may be turned on in response to the voltage of the gate electrode of the second selection transistor TS2 having the first level L to provide the voltage of the inverted emission control node EM_NQB having the second level H to the selection control node NSC. Therefore, the voltage of the selection control node NSC may have the second level H.

The third selection transistor TS3 may be turned on in response to the voltage of the emission control node EM_NQ1, EM_NQ2 having the first level L to provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

As such, the voltage of the emission control node EM_NQ1, EM_NQ2 may have a phase opposite to the voltage of the inverted emission control node EM_NQB. The emission signal EM[n] may have a same phase as the voltage of the emission control node EM_NQ1, EM_NQ2. The emission driver EMD may output the emission signal EM[n] in response to the voltage of the emission control node EM_NQ1, EM_NQ2 and the voltage of the inverted emission control node EM_NQB. The selection driver SELD may output the selection signal SEL[n] in response to the voltage of the emission control node EM_NQ1, EM_NQ2, the voltage of the inverted emission control node EM_NQB, and the enable signal EN.

Figure 15:
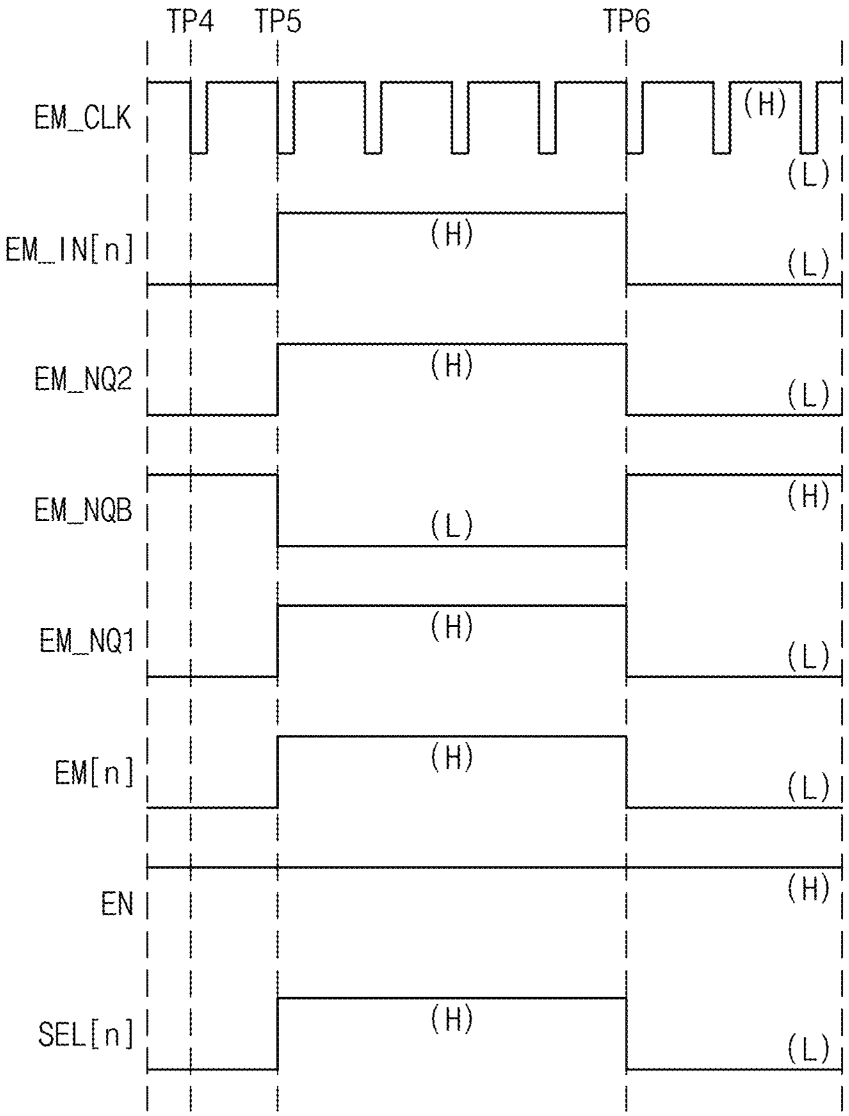
FIG. 15 is a timing diagram showing an operation of the emission selection driver of FIG. 10 when an enable signal of FIG. 10 maintains a second level.
Figure 16:
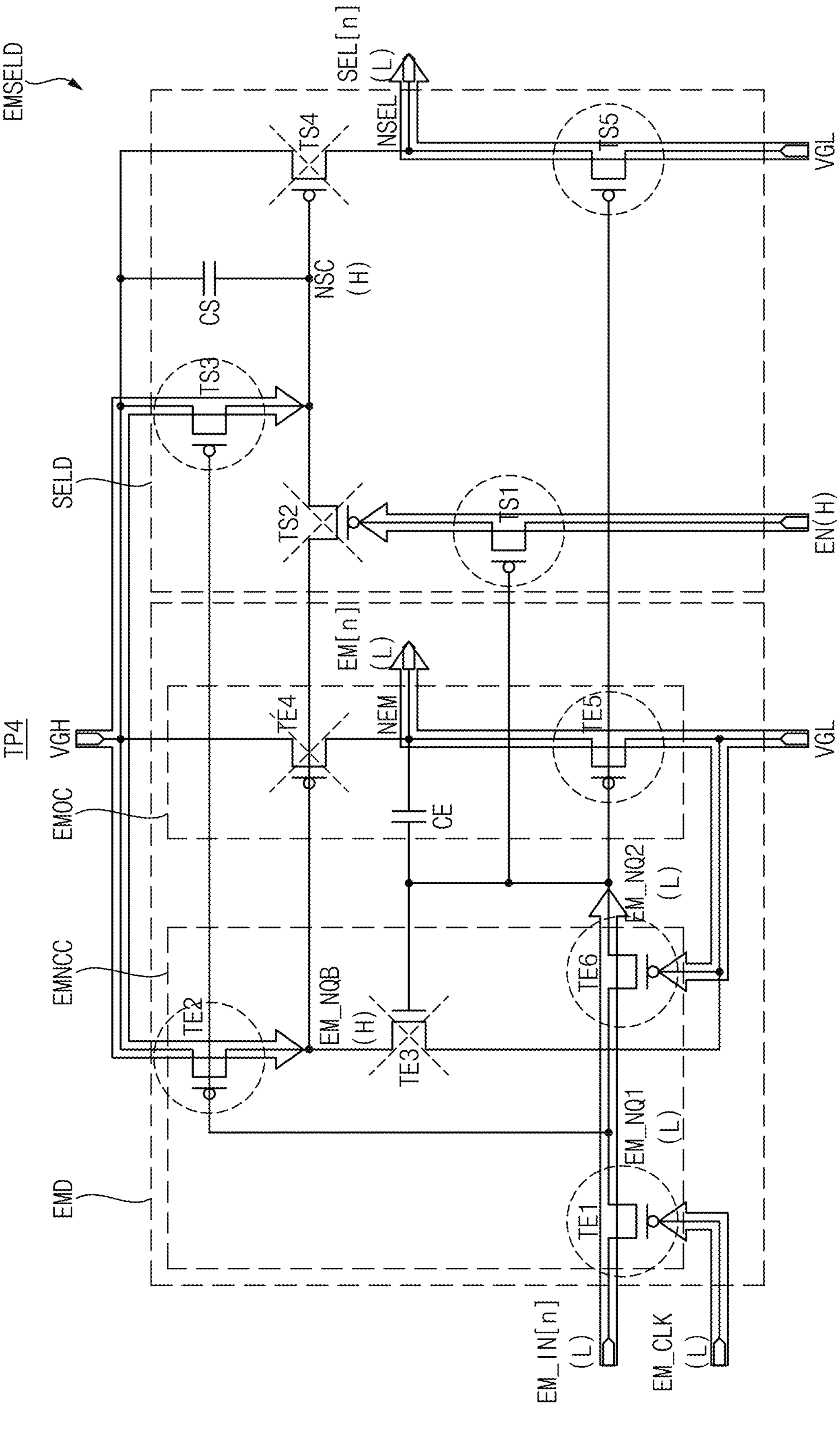
FIG. 16 is a circuit diagram showing an operation of the emission selection driver of FIG. 10 at a fourth time point of FIG. 15.
Figure 17:
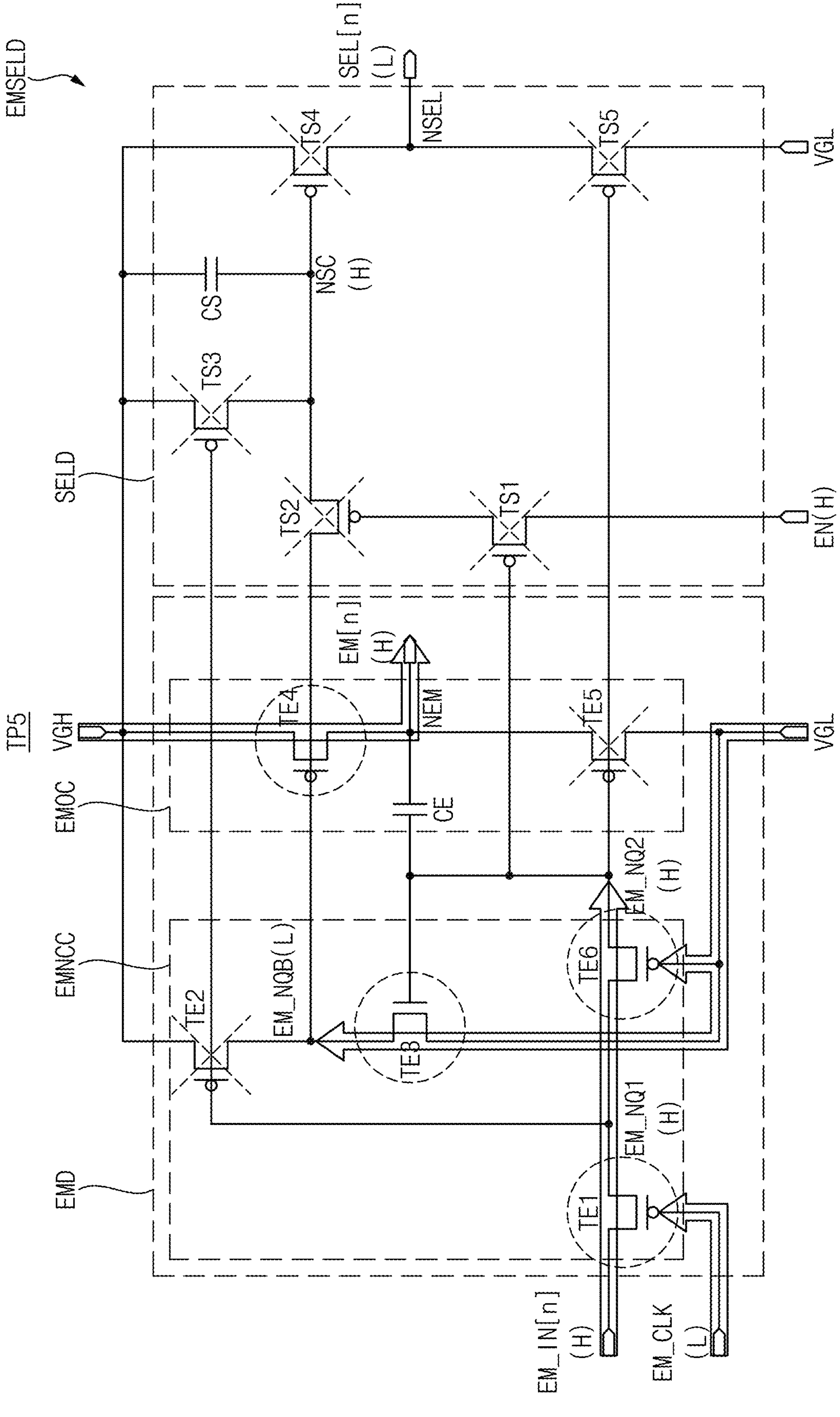
FIG. 17 is a circuit diagram showing an operation of the emission selection driver of FIG. 10 at a fifth time point of FIG. 15.
Figure 18:
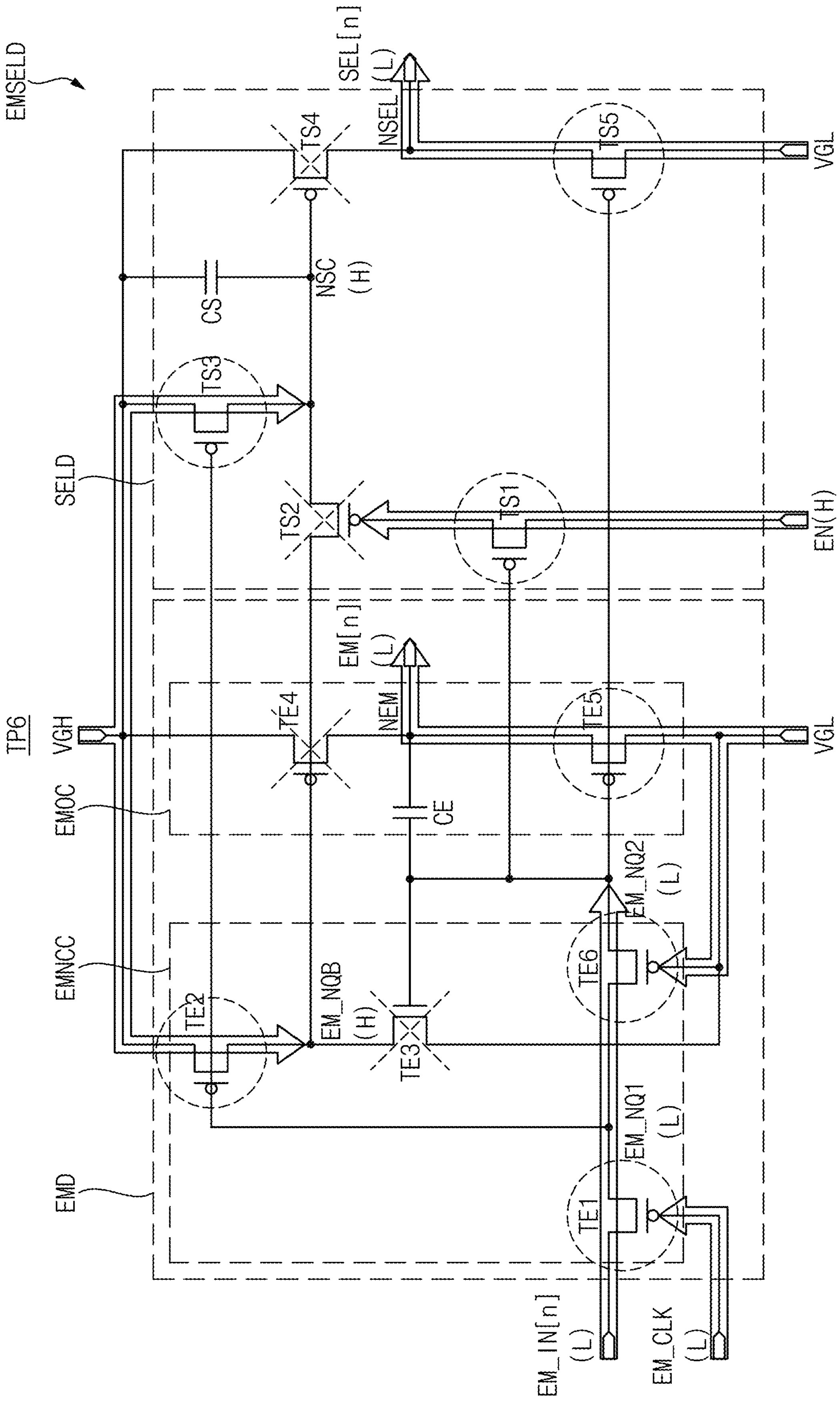
FIG. 18 is a circuit diagram showing an operation of the emission selection driver of FIG. 10 at a sixth time point of FIG. 15.

FIG. 15 is a timing diagram showing an operation of the emission selection driver EMSELD of FIG. 10 when an enable signal EN of FIG. 10 maintains a second level H. FIG. 16 is a circuit diagram showing an operation of the emission selection driver EMSELD of FIG. 10 at a fourth time point TP4 of FIG. 15. FIG. 17 is a circuit diagram showing an operation of the emission selection driver EMSELD of FIG. 10 at a fifth time point TP5 of FIG. 15. FIG. 18 is a circuit diagram showing an operation of the emission selection driver EMSELD of FIG. 10 at a sixth time point TP6 of FIG. 15.

Referring to FIGS. 1-18, at the fourth time point TP4, the emission clock signal EM_CLK may have the first level L, the emission input signal EM_IN[n] may have the first level L, and the enable signal EN may have the second level H.

The first emission transistor TE1 may be turned on in response to the emission clock signal EM_CLK having the first level L to provide the emission input signal EM_IN[n] having the first level L to the first emission control node EM_NQ1. Additionally, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the first level L.

The fifth emission transistor TE5 may be turned on in response to the voltage of the emission control node EM_NQ1, EM_NQ2 having the first level L to output the low gate voltage VGL as the emission signal EM[n]. Therefore, the emission signal EM[n] may have the first level L.

The third emission transistor TE3 may be turned off in response to the voltage of the emission control node EM_NQ1, EM_NQ2 having the first level L.

The second emission transistor TE2 may be turned on in response to the voltage of the emission control node EM_NQ1, EM_NQ2 having the first level L to provide the high gate voltage VGH to the inverted emission control node EM_NQB. Therefore, the voltage of the inverted emission control node EM_NQB may have the second level H.

The fourth emission transistor TE4 may be turned off in response to the voltage of the inverted emission control node EM_NQB having the second level H.

The fifth selection transistor TS5 may be turned on in response to the voltage of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage of the emission control node EM_NQ1, EM_NQ2 having the first level L to provide the enable signal EN having the second level H to the gate electrode of the second selection transistor TS2. Therefore, the voltage of the gate electrode of the second selection transistor TS2 may have the second level H.

The second selection transistor TS2 may be turned off in response to the voltage of the gate electrode of the second selection transistor TS2 having the second level H.

The third selection transistor TS3 may be turned on in response to the voltage of the emission control node EM_NQ1, EM_NQ2 having the first level L to provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

At the fifth time point TP5, the emission clock signal EM_CLK may have the first level L, the emission input signal EM_IN[n] may have the second level H, and the enable signal EN may have the second level H.

The first emission transistor TE1 may be turned on in response to the emission clock signal EM_CLK having the first level L to provide the emission input signal EM_IN[n] having the second level H to the first emission control node EM_NQ1. In addition, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the second level H.

The fifth emission transistor TE5 may be turned off in response to the voltage of the emission control node EM_NQ1, EM_NQ2 having the second level H.

The third emission transistor TE3 may be turned on in response to the voltage of the emission control node EM_NQ1, EM_NQ2 having the second level H to provide the low gate voltage VGL to the inverted emission control node EM_NQB. Therefore, the voltage of the inverted emission control node EM_NQB may have the first level L.

The fourth emission transistor TE4 may be turned on in response to the voltage of the inverted emission control node EM_NQB having the first level L to output the high gate voltage VGH as the emission signal EM[n]. Therefore, the emission signal EM[n] may have the second level H.

The second emission transistor TE2 may be turned off in response to the voltage of the emission control node EM_NQ1, EM_NQ2 having the second level H.

The fifth selection transistor TS5 may be turned off in response to the voltage of the emission control node EM_NQ1, EM_NQ2 having the second level H.

The first selection transistor TS1 may be turned off in response to the voltage of the emission control node EM_NQ1, EM_NQ2 having the second level H. Therefore, the gate electrode of the second selection transistor TS2 may be floated, and the voltage of the gate electrode of the second selection transistor TS2 may maintain a previous state which is the second level H.

The second selection transistor TS2 may be turned off in response to the voltage of the gate electrode of the second selection transistor TS2 having the second level H. The third selection transistor TS3 may be turned off in response to the voltage of the emission control node EM_NQ1, EM_NQ2 having the second level H. Therefore, the selection control node NSC may be floated, and the voltage of the selection control node NSC may maintain the previous state which is the second level H.

The fourth selection transistor TS4 may be turned off in response to the voltage at NSC at second level H.

Because the fifth selection transistor TS5 is turned off and the fourth selection transistor TS4 are turned off, the selection output node NSEL may be floated, and the selection signal SEL[n] may maintain the previous state which is the first level L.

At the sixth time point TP6, the emission clock signal EM_CLK may have the first level L, the emission input signal EM_IN[n] may have the first level L, and the enable signal EN may have the second level H.

The first emission transistor TE1 may be turned on in response to the emission clock signal EM_CLK having the first level L to provide the emission input signal EM_IN[n] having the first level L to the first emission control node EM_NQ1. In addition, the sixth emission transistor TE6 may be turned on in response to the low gate voltage VGL to provide the voltage of the first emission control node EM_NQ1 to the second emission control node EM_NQ2. Therefore, the voltage of the emission control node EM_NQ1, EM_NQ2 may have the first level L.

The fifth emission transistor TE5 may be turned on in response to the voltage of the emission control node EM_NQ1, EM_NQ2 having the first level L to output the low gate voltage VGL as the emission signal EM[n]. Therefore, the emission signal EM[n] may have the first level L.

The third emission transistor TE3 may be turned off in response to the voltage of the emission control node EM_NQ1, EM_NQ2 having the first level L.

The second emission transistor TE2 may be turned on in response to the voltage of the emission control node EM_NQ1, EM_NQ2 having the first level L to provide the high gate voltage VGH to the inverted emission control node EM_NQB. Therefore, the voltage of the inverted emission control node EM_NQB may have the second level H.

The fourth emission transistor TE4 may be turned off in response to the voltage of the inverted emission control node EM_NQB having the second level H.

The fifth selection transistor TS5 may be turned on in response to the voltage of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage of the emission control node EM_NQ1, EM_NQ2 having the first level L to provide the enable signal EN having the second level H to the gate electrode of the second selection transistor TS2. Therefore, the voltage of the gate electrode of the second selection transistor TS2 may have the second level H.

The second selection transistor TS2 may be turned off in response to the voltage of the gate electrode of the second selection transistor TS2 having the second level H.

The third selection transistor TS3 may be turned on in response to the voltage of the emission control node EM_NQ1, EM_NQ2 having the first level L to provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

As such, the voltage of the emission control node EM_NQ1, EM_NQ2 may have a phase opposite to the voltage of the inverted emission control node EM_NQB. The emission signal EM[n] may have a same phase as the voltage of the emission control node EM_NQ1, EM_NQ2. The emission driver EMD may output the emission signal EM[n] in response to the voltage of the emission control node EM_NQ1, EM_NQ2 and the voltage of the inverted emission control node EM_NQB. The selection driver SELD may output the selection signal SEL[n] in response to the voltage of the emission control node EM_NQ1, EM_NQ2, the voltage of the inverted emission control node EM_NQB, and the enable signal EN.

The basic operation of the emission selection driver EMSELD is described in FIGS. 11-18. The specific operation of the selection driver SELD according to the enable signal EN is described later in FIGS. 19-43.

Figure 19:
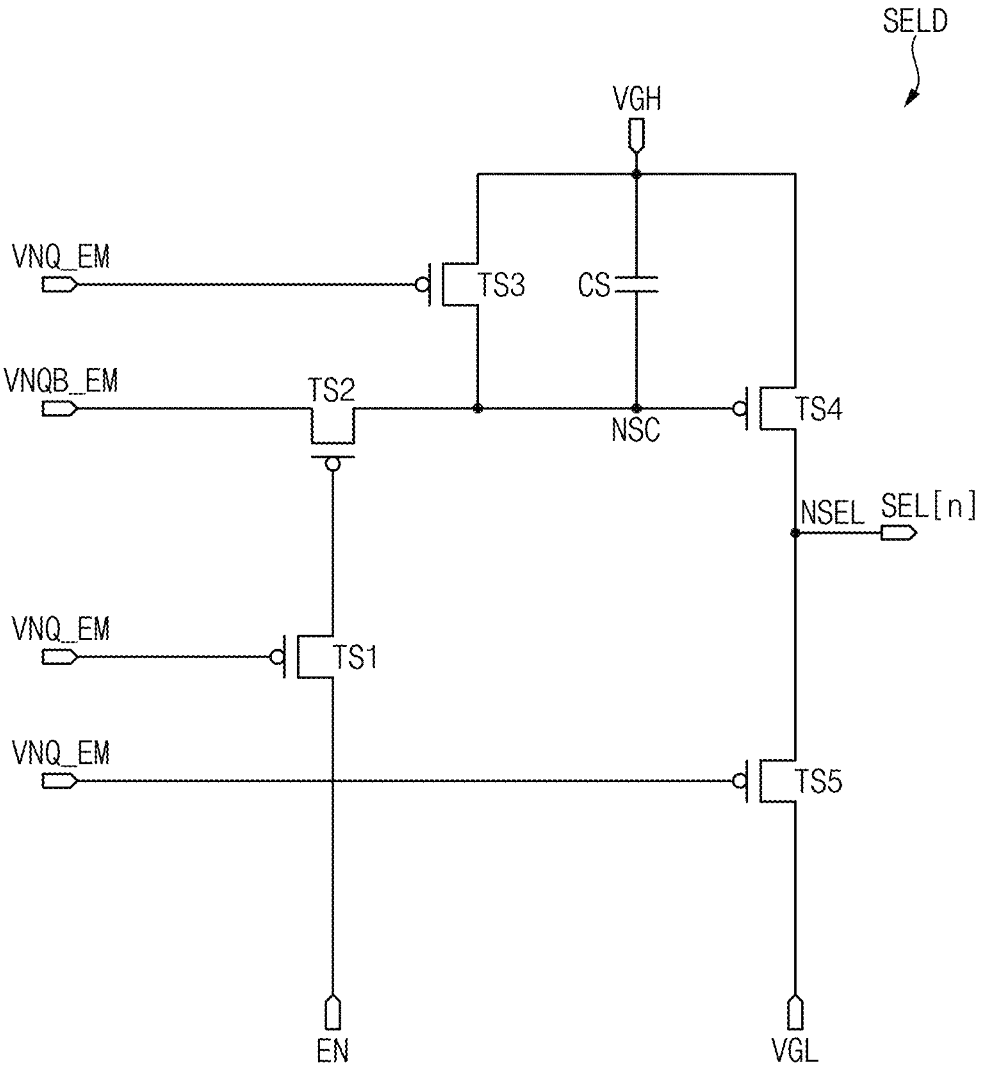
FIG. 19 is a circuit diagram showing a selection driver of FIG. 10.

FIG. 19 is a circuit diagram showing the selection driver SELD of FIG. 10.

Referring to FIGS. 1-19, the selection driver SELD may include the first to fifth selection transistors TS1 to TS5 and the selection capacitor CS. The selection driver SLED of FIG. 19 has a same configuration as the selection driver SELD of FIG. 10, so the same reference number is used and duplicate description is omitted.

Figure 20:
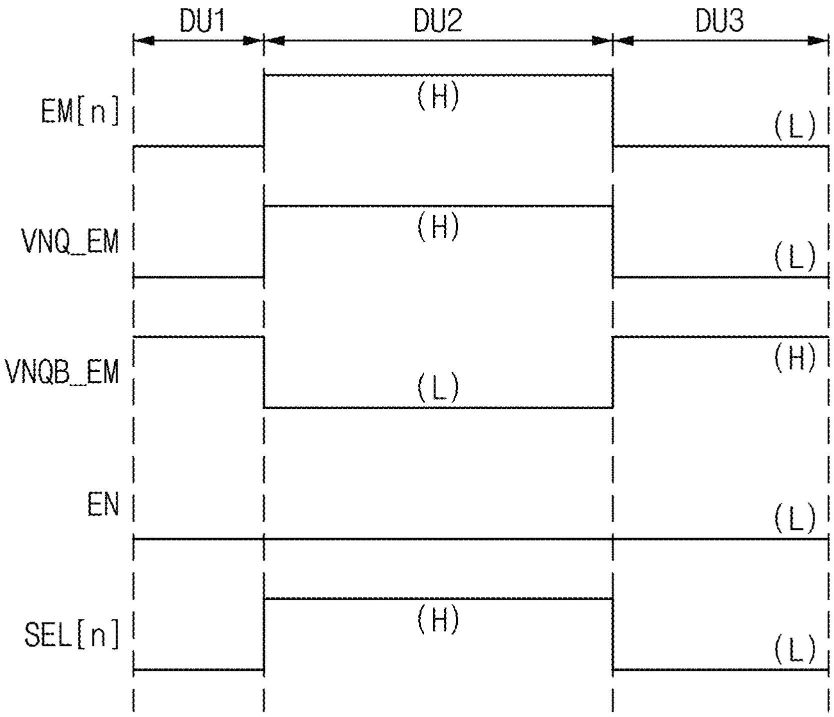
FIG. 20 is a timing diagram showing an output of a selection signal of FIG. 19 when an enable signal of FIG. 19 maintains a first level.
Figure 21:
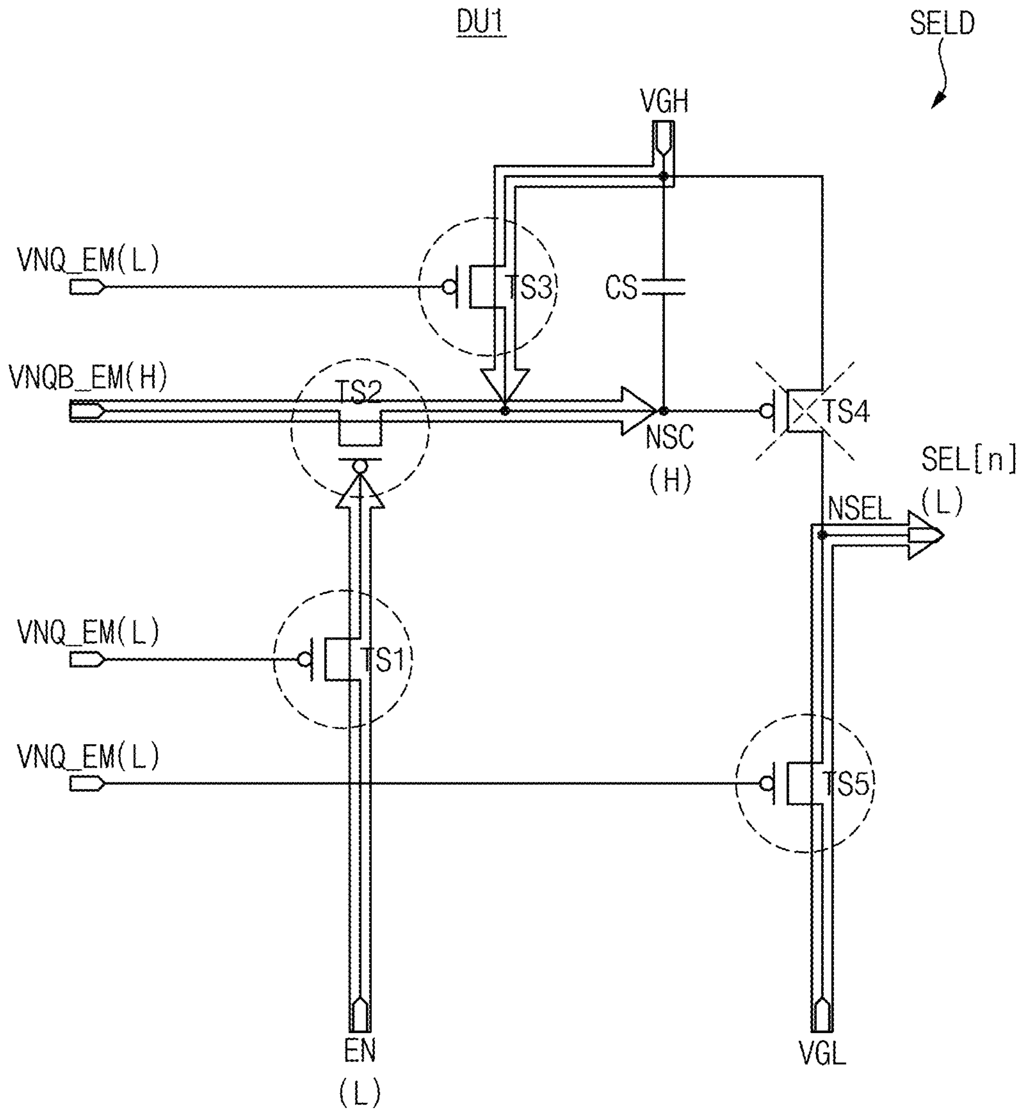
FIG. 21 is a circuit diagram showing an operation of the selection driver of FIG. 19 in a first duration of FIG. 20.
Figure 22:
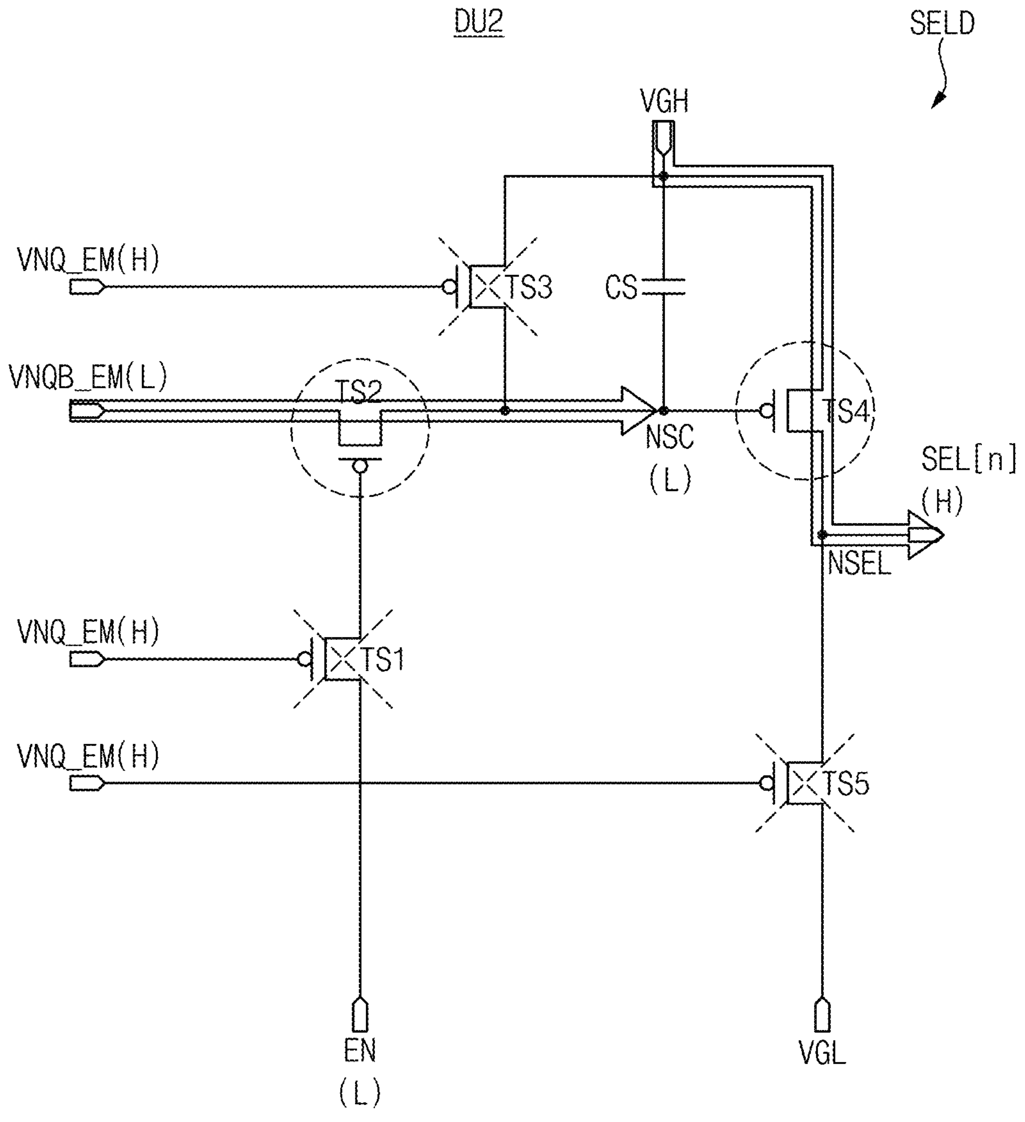
FIG. 22 is a circuit diagram showing an operation of the selection driver of FIG. 19 in a second duration of FIG. 20.
Figure 23:
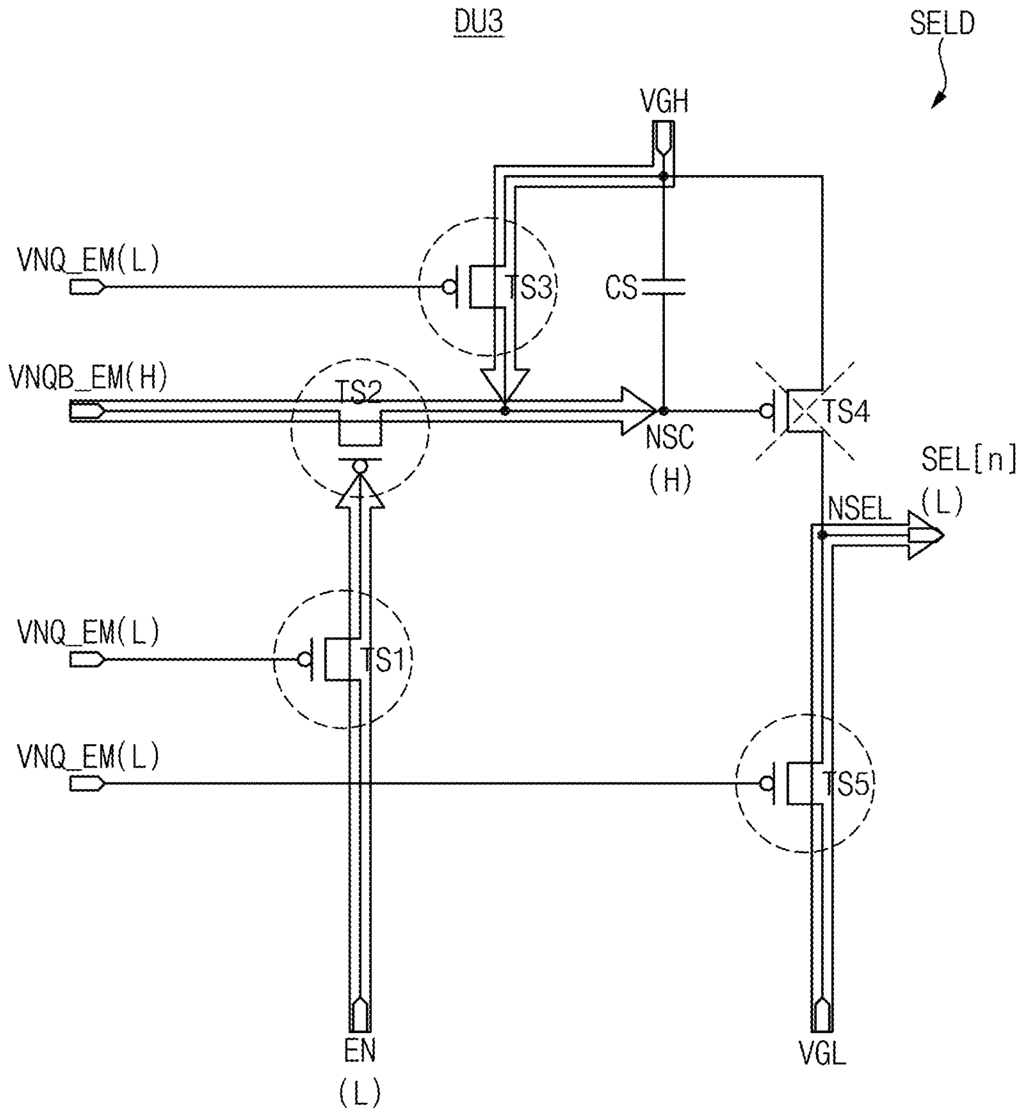
FIG. 23 is a circuit diagram showing an operation of the selection driver of FIG. 19 in a third duration of FIG. 20.

FIG. 20 is a timing diagram showing an output of the selection signal SEL[n] of FIG. 19 when an enable signal EN of FIG. 19 maintains a first level L. FIG. 21 is a circuit diagram showing an operation of the selection driver SELD of FIG. 19 in a first duration DU1 of FIG. 20. FIG. 22 is a circuit diagram showing an operation of the selection driver SELD of FIG. 19 in a second duration DU2 of FIG. 20. FIG. 23 is a circuit diagram showing an operation of the selection driver SELD of FIG. 19 in a third duration DU3 of FIG. 20.

Referring to FIGS. 1-23, in the first duration DU1, the voltage VNQ_EM of the emission control node EM_NQ1, EM_NQ2 may have the first level L, the voltage VNQB_EM of the inverted emission control node EM_NQB may have the second level H, and the enable signal EN may have the first level L. When the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

The fifth selection transistor TS5 may be turned on in response to the voltage VNQ_EM of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage VNQ_EM of the emission control node EM_NQ1, EM_NQ2 having the first level L to provide the enable signal EN having the first level L to the gate electrode of the second selection transistor TS2.

The second selection transistor TS2 may be turned on in response to the voltage of the gate electrode of the second selection transistor TS2 having the first level L to provide the voltage VNQB_EM of the inverted emission control node EM_NQB having the second level H to the selection control node NSC. Therefore, the voltage of the selection control node NSC may have the second level H.

The third selection transistor TS3 may be turned on in response to the voltage VNQ_EM of the emission control node EM_NQ1, EM_NQ2 having the first level L to provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

In the second duration DU2, the voltage VNQ_EM of the emission control node EM_NQ1, EM_NQ2 may have the second level H, the voltage VNQB_EM of the inverted emission control node EM_NQB may have the first level L, and the enable signal EN may have the first level L. When the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain a previous state. When the previous state of the voltage of the gate electrode of the second selection transistor TS2 is the first level L, the selection signal SEL[n] may have the second level H.

The fifth selection transistor TS5 may be turned off in response to the voltage VNQ_EM of the emission control node EM_NQ1, EM_NQ2 having the second level H.

The first selection transistor TS1 may be turned off in response to the voltage VNQ_EM of the emission control node EM_NQ1, EM_NQ2 having the second level H. Therefore, the gate electrode of the second selection transistor TS2 may be floated, and the voltage of the gate electrode of the second selection transistor TS2 may maintain the previous state which is the first level L.

The second selection transistor TS2 may be turned on in response to the voltage of the gate electrode of the second selection transistor TS2 having the first level L to provide the voltage VNQB_EM of the inverted emission control node EM_NQB having the first level L to the selection control node NSC. Therefore, the voltage of the selection control node NSC may have the first level L.

The third selection transistor TS3 may be turned off in response to the voltage VNQ_EM of the emission control node EM_NQ1, EM_NQ2 having the second level H.

The fourth selection transistor TS4 may be turned on in response to the voltage of the selection control node NSC having the first level L to output the high gate voltage VGH as the selection signal SEL[n]. Therefore, the selection signal SEL[n] may have the second level H.

In the third duration DU3, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

As described in FIGS. 20-23, when the enable signal EN maintains the first level L, a pulse of the selection signal SEL[n] may be output, and the pulse of the selection signal SEL[n] may have a same length and timing as a pulse of the emission signal EM[n].

Figure 24:
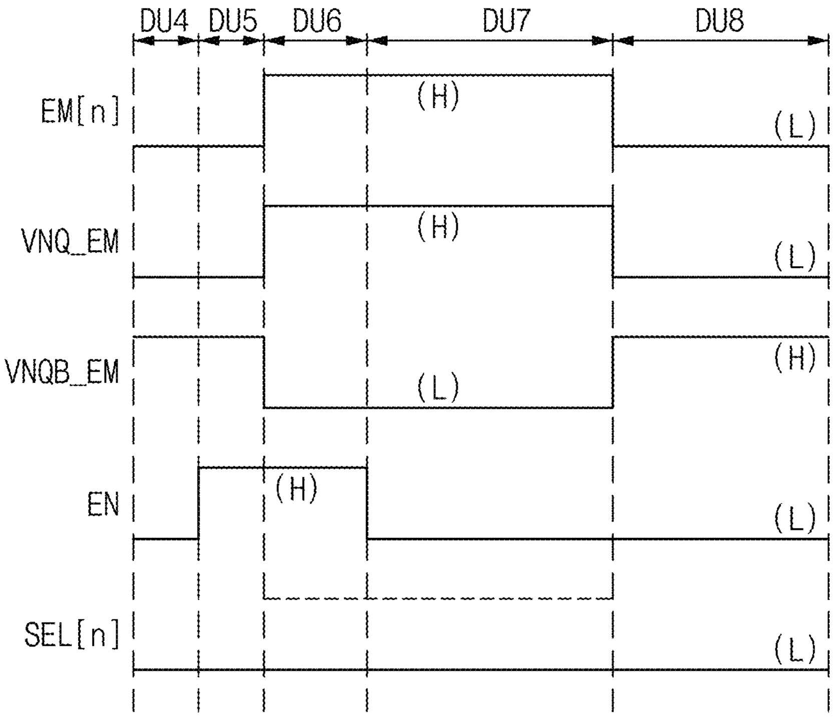
FIG. 24 is a timing diagram showing an output of a selection signal of FIG. 19 when a pulse of an enable signal of FIG. 19 is at a first position.
Figure 25:
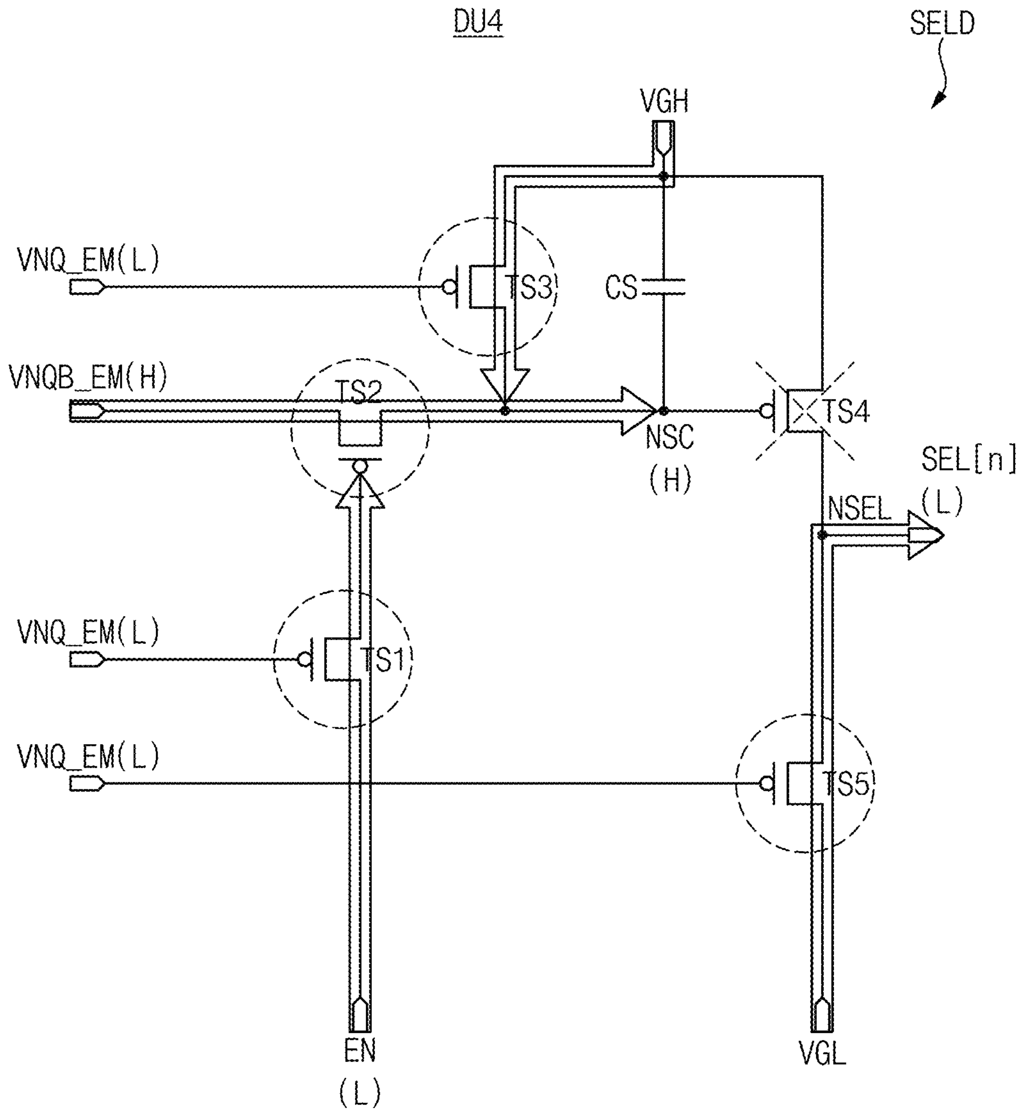
FIG. 25 is a circuit diagram showing an operation of the selection driver of FIG. 19 in a fourth duration of FIG. 24.
Figure 26:
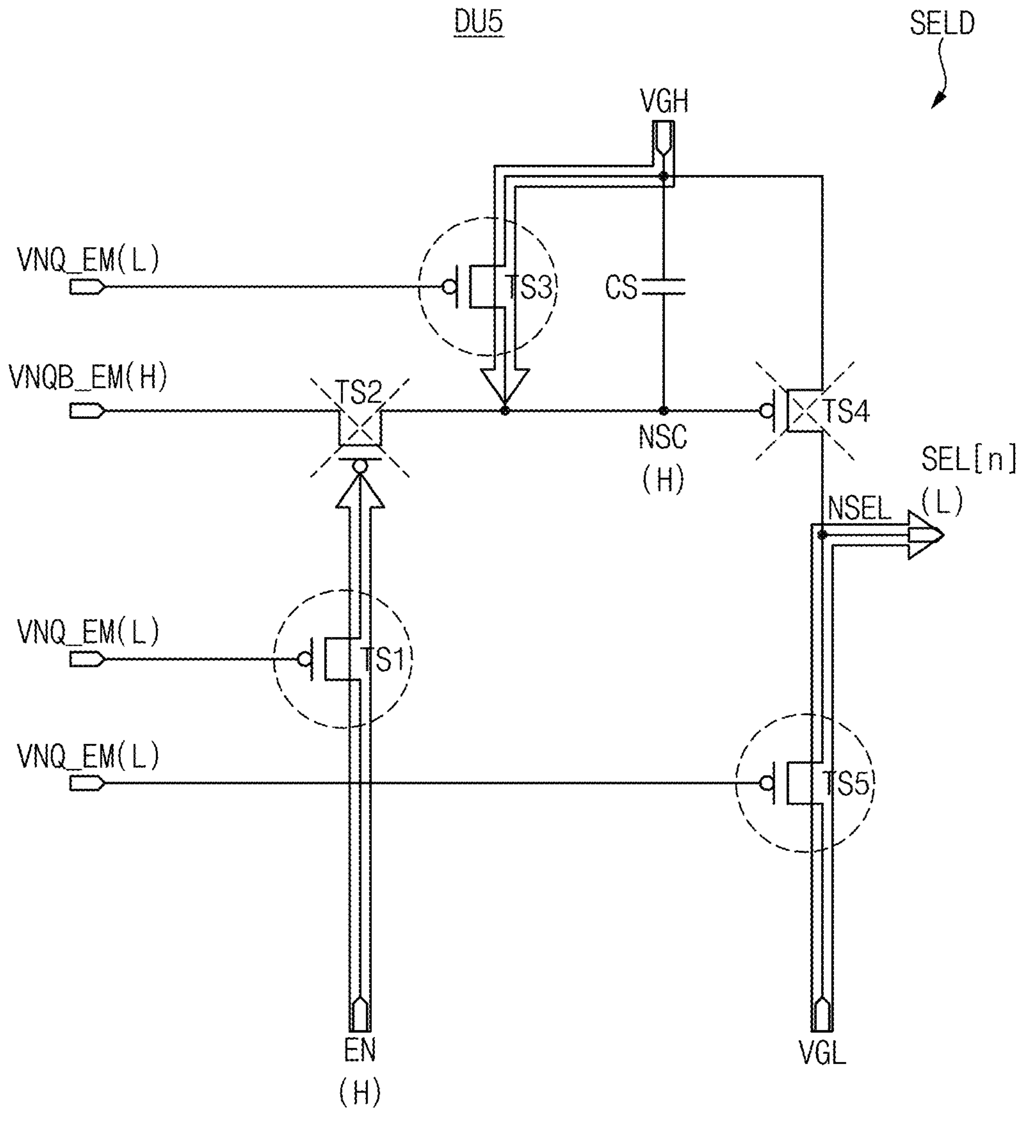
FIG. 26 is a circuit diagram showing an operation of the selection driver of FIG. 19 in a fifth duration of FIG. 24.
Figure 27:
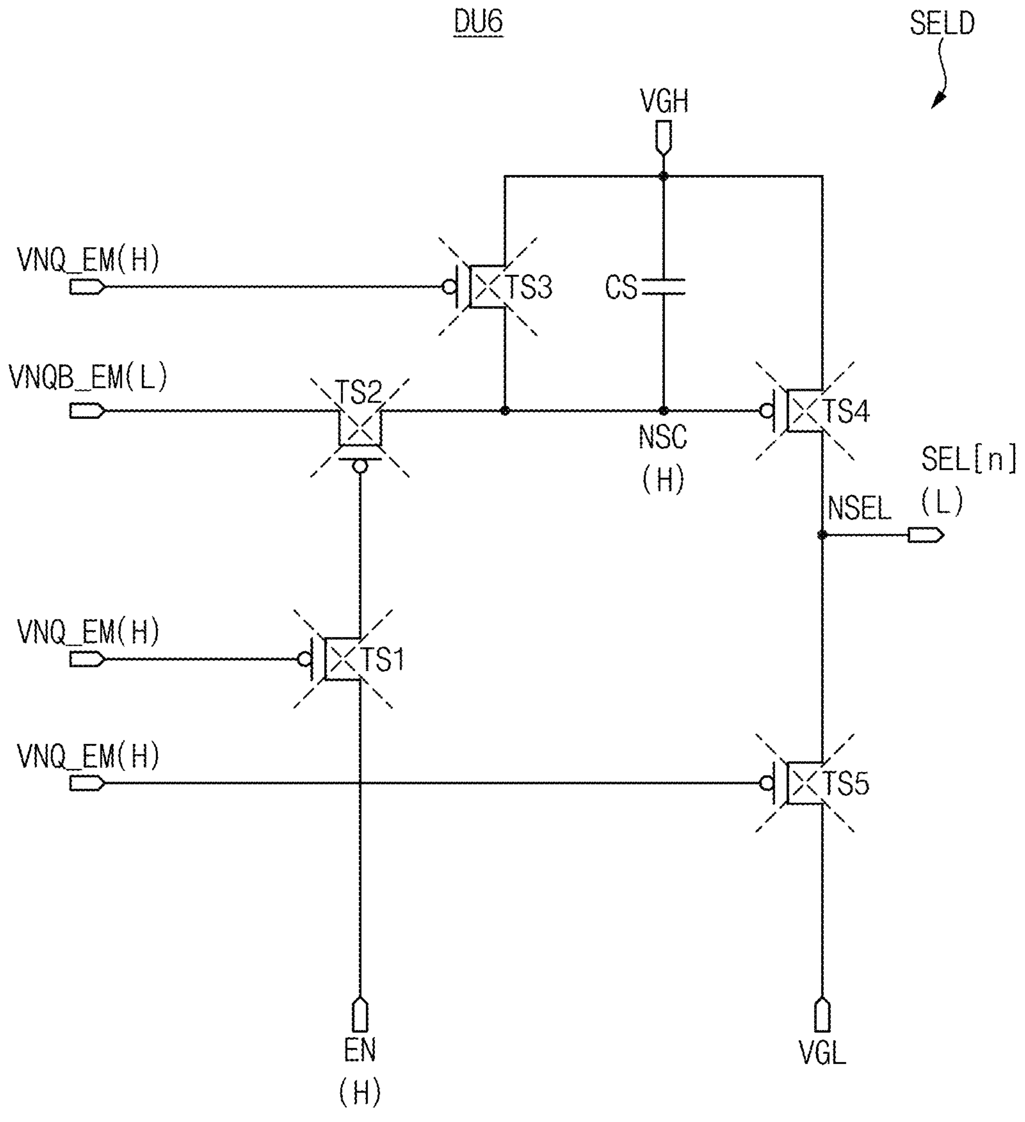
FIG. 27 is a circuit diagram showing an operation of the selection driver of FIG. 19 in a sixth duration of FIG. 24.
Figure 28:
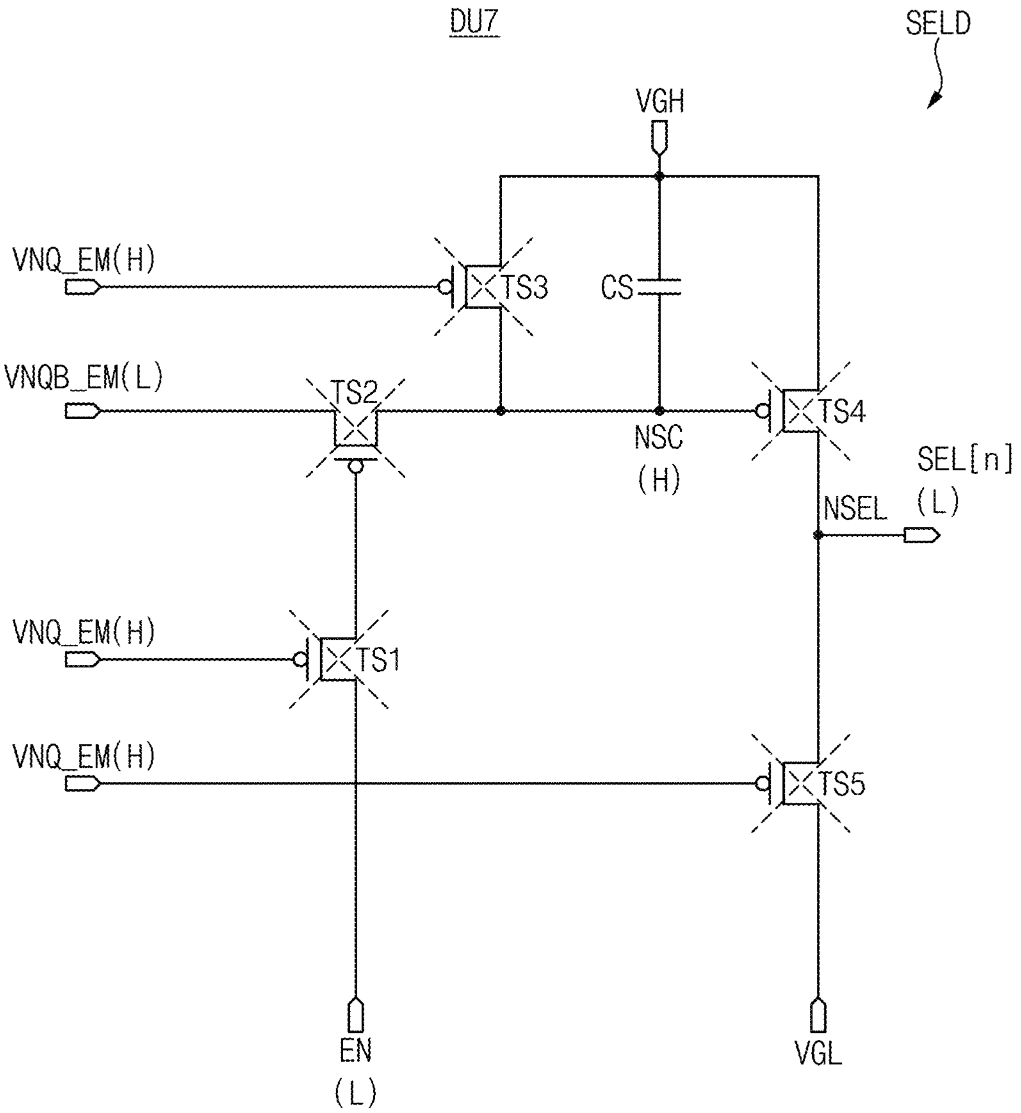
FIG. 28 is a circuit diagram showing an operation of the selection driver of FIG. 19 in a seventh duration of FIG. 24.
Figure 29:
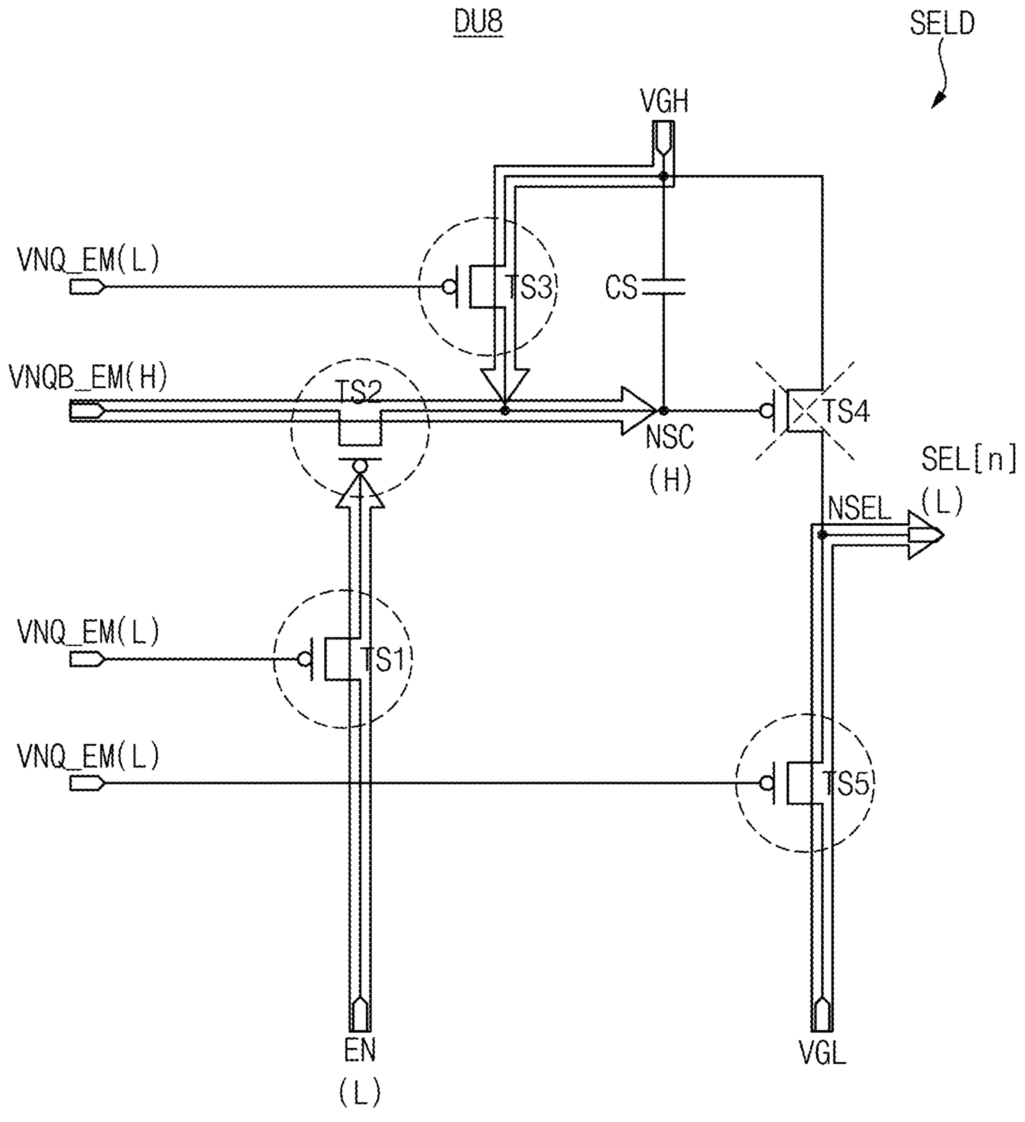
FIG. 29 is a circuit diagram showing an operation of the selection driver of FIG. 19 in an eighth duration of FIG. 24.

FIG. 24 is a timing diagram showing an output of a selection signal SEL[n] of FIG. 19 when a pulse of an enable signal EN of FIG. 19 is at a first position. FIG. 25 is a circuit diagram showing an operation of the selection driver SELD of FIG. 19 in a fourth duration DU4 of FIG. 24. FIG. 26 is a circuit diagram showing an operation of the selection driver SELD of FIG. 19 in a fifth duration DU5 of FIG. 24. FIG. 27 is a circuit diagram showing an operation of the selection driver SELD of FIG. 19 in a sixth duration DU6 of FIG. 24. FIG. 28 is a circuit diagram showing an operation of the selection driver SELD of FIG. 19 in a seventh duration DU7 of FIG. 24. FIG. 29 is a circuit diagram showing an operation of the selection driver SELD of FIG. 19 in an eighth duration DU8 of FIG. 24.

Referring to FIGS. 1-29, in the fourth duration DU4, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

In the fifth duration DU5, the voltage VNQ_EM of the emission control node EM_NQ1, EM_NQ2 may have the first level L, the voltage VNQB_EM of the inverted emission control node EM_NQB may have the second level H, and the enable signal EN may have the second level H. As described in the first duration DU1, when the voltage VNQ_EM of the emission control node EM_NQ1, EM_NQ2 has the first level L and the voltage VNQB_EM of the inverted emission control node EM NQB has the second level H, the selection signal SEL[n] may have the first level L regardless of the enable signal EN.

The fifth selection transistor TS5 may be turned on in response to the voltage VNQ_EM of the emission control node EM_NQ1, EM_NQ2 having the first level L to output the low gate voltage VGL as the selection signal SEL[n]. Therefore, the selection signal SEL[n] may have the first level L.

The first selection transistor TS1 may be turned on in response to the voltage VNQ_EM of the emission control node EM_NQ1, EM_NQ2 having the first level L and provide the enable signal EN having the second level H to the gate electrode of the second selection transistor TS2.

The second selection transistor TS2 may be turned off in response to the voltage of the gate electrode of the second selection transistor TS2 having the second level H.

The third selection transistor TS3 may be turned on in response to the voltage VNQ_EM of the emission control node EM_NQ1, EM_NQ2 having the first level L and provide the high gate voltage VGH to the selection control node NSC. Therefore, the voltage of the selection control node NSC may have the second level H.

The fourth selection transistor TS4 may be turned off in response to the voltage of the inverted emission control node EM_NQB having the second level H.

In the sixth duration DU6, the voltage VNQ_EM of the emission control node EM_NQ1, EM_NQ2 may have the second level H, the voltage VNQB_EM of the inverted emission control node EM_NQB may have the first level L, and the enable signal EN may have the second level H. When the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the second level H, the voltage of the selection control node NSC may maintain the previous state. When the previous state of the voltage of the selection control node NSC is the second level H, the selection signal SEL[n] may maintain the previous state.

The fifth selection transistor TS5 may be turned off in response to the voltage VNQ_EM of the emission control node EM_NQ1, EM_NQ2 having the second level H.

The first selection transistor TS1 may be turned off in response to the voltage VNQ_EM of the emission control node EM_NQ1, EM_NQ2 having the second level H. Therefore, the gate electrode of the second selection transistor TS2 may be floated, and the voltage of the gate electrode of the second selection transistor TS2 may maintain the previous state which is the second level H.

The second selection transistor TS2 may be turned off in response to the voltage of the gate electrode of the second selection transistor TS2 having the second level H. The third selection transistor TS3 may be turned off in response to the voltage VNQ_EM of the emission control node EM_NQ1, EM_NQ2 having the second level H. Therefore, the selection control node NSC may be floated, and the voltage of the selection control node NSC may maintain the previous state which is the second level H.

The fourth selection transistor TS4 may be turned off in response to the voltage of the selection control node NSC having the second level H.

Because the fifth selection transistor TS5 and the fourth selection transistor TS4 are turned off, the selection output node NSEL may be floated, and the selection signal SEL[n] may maintain the previous state which is the first level L.

In the seventh duration DU7, the voltage VNQ_EM of the emission control node EM_NQ1, EM_NQ2 may have the second level H, the voltage VNQB_EM of the inverted emission control node EM_NQB may have the first level L, and the enable signal EN may have the first level L. As described in the second duration DU2 and the sixth duration DU6, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the second level H, the voltage of the selection control node NSC may maintain the previous state. When the previous state of the voltage of the selection control node NSC is the second level H, the selection signal SEL[n] may maintain the previous state.

In the eighth duration DU8, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

The pulse of the enable signal EN may be at the first position. With respect to the first position, the pulse of the enable signal EN may be output before the pulse of the emission signal EM[n], and the pulse of the enable signal EN may partially overlap with the pulse of the emission signal EM[n]. As described in FIGS. 24-29, when the pulse of the enable signal EN is at the first position, the pulse of the selection signal SEL[n] may not be output.

Figure 30:
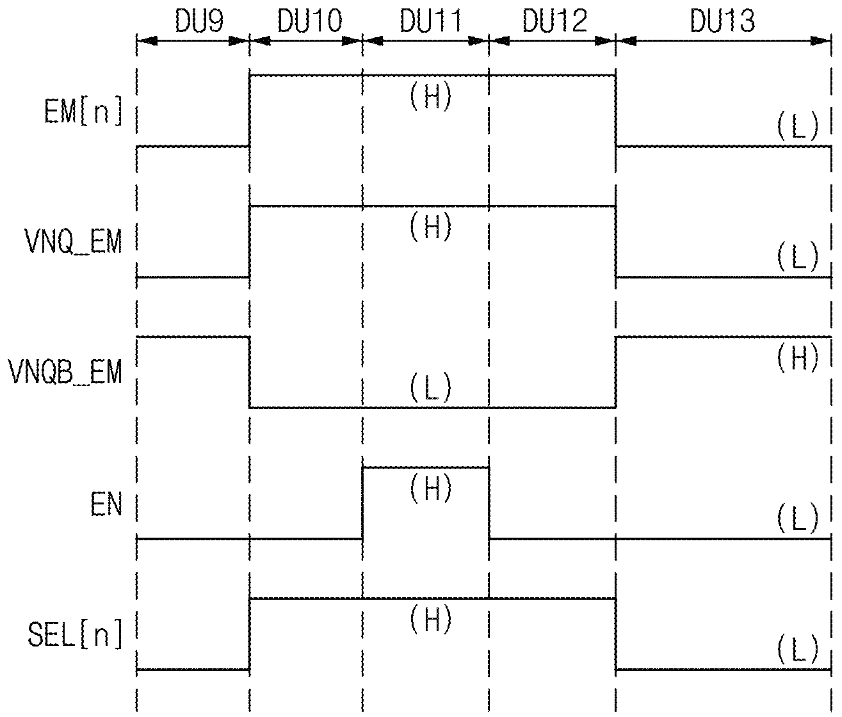
FIG. 30 is a timing diagram showing an output of a selection signal of FIG. 19 when a pulse of an enable signal of FIG. 19 is at a second position.
Figure 31:
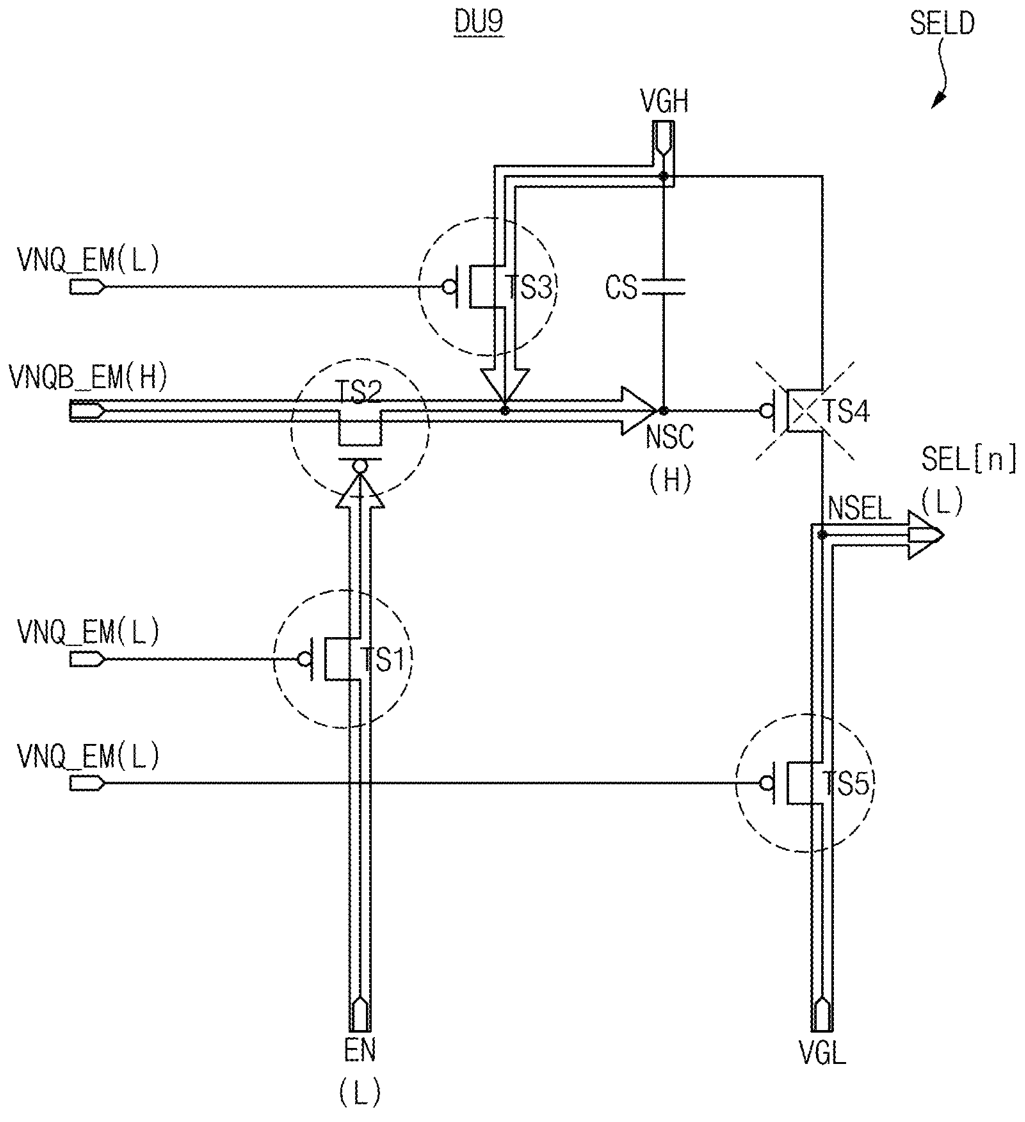
FIG. 31 is a circuit diagram showing an operation of the selection driver of FIG. 19 in the ninth duration of FIG. 30.
Figure 32:
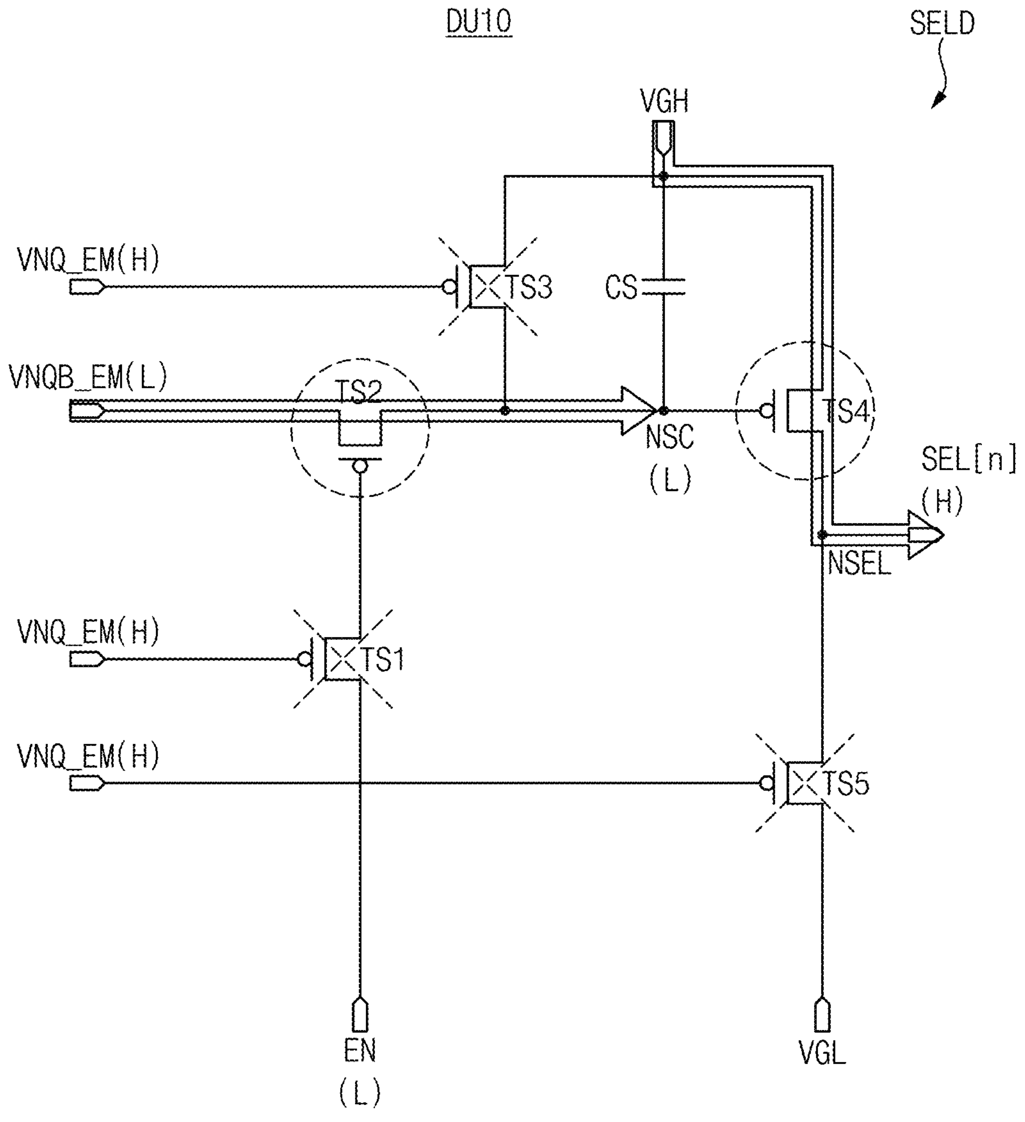
FIG. 32 is a circuit diagram showing an operation of the selection driver of FIG. 19 in a tenth duration of FIG. 30.
Figure 33:
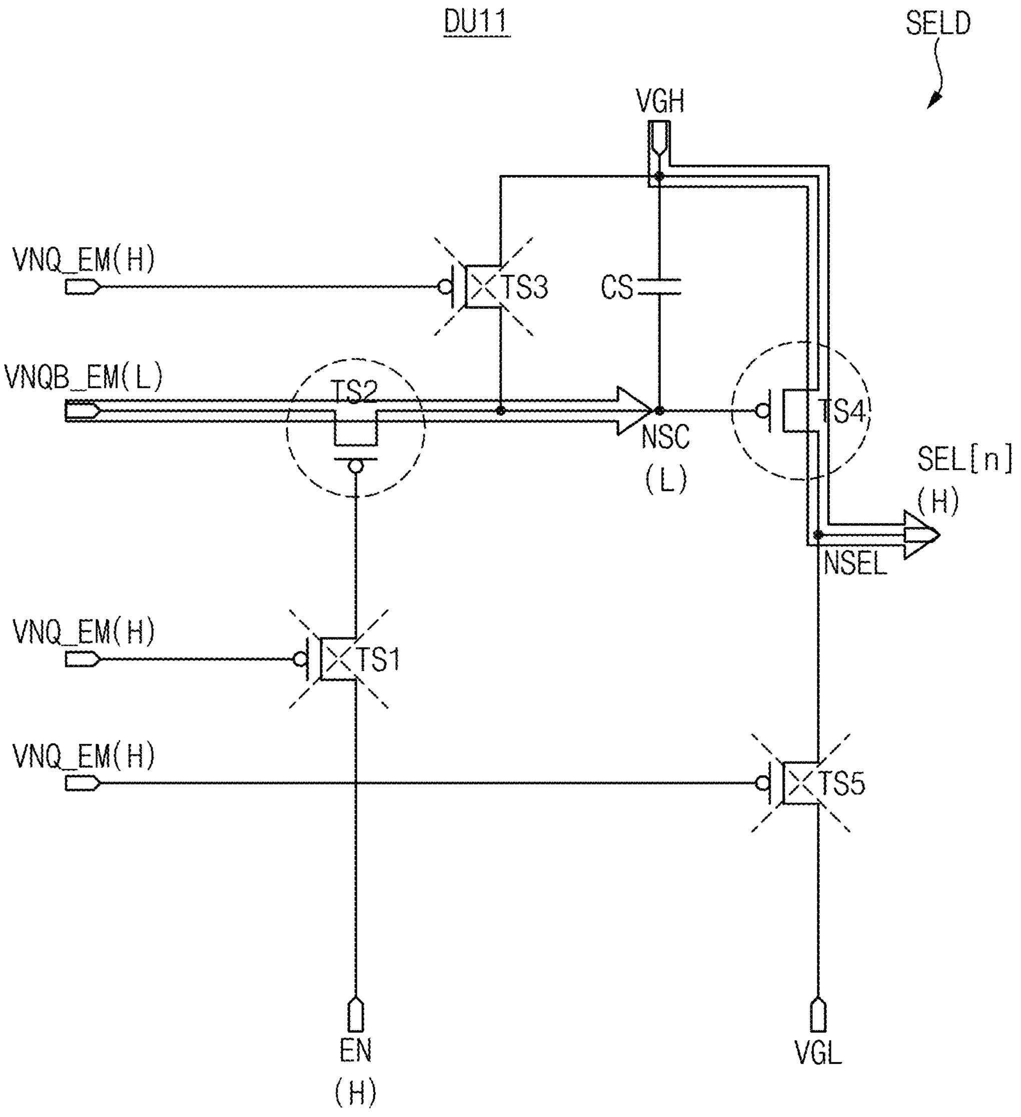
FIG. 33 is a circuit diagram showing an operation of the selection driver of FIG. 19 in the eleventh duration of FIG. 30.
Figure 34:
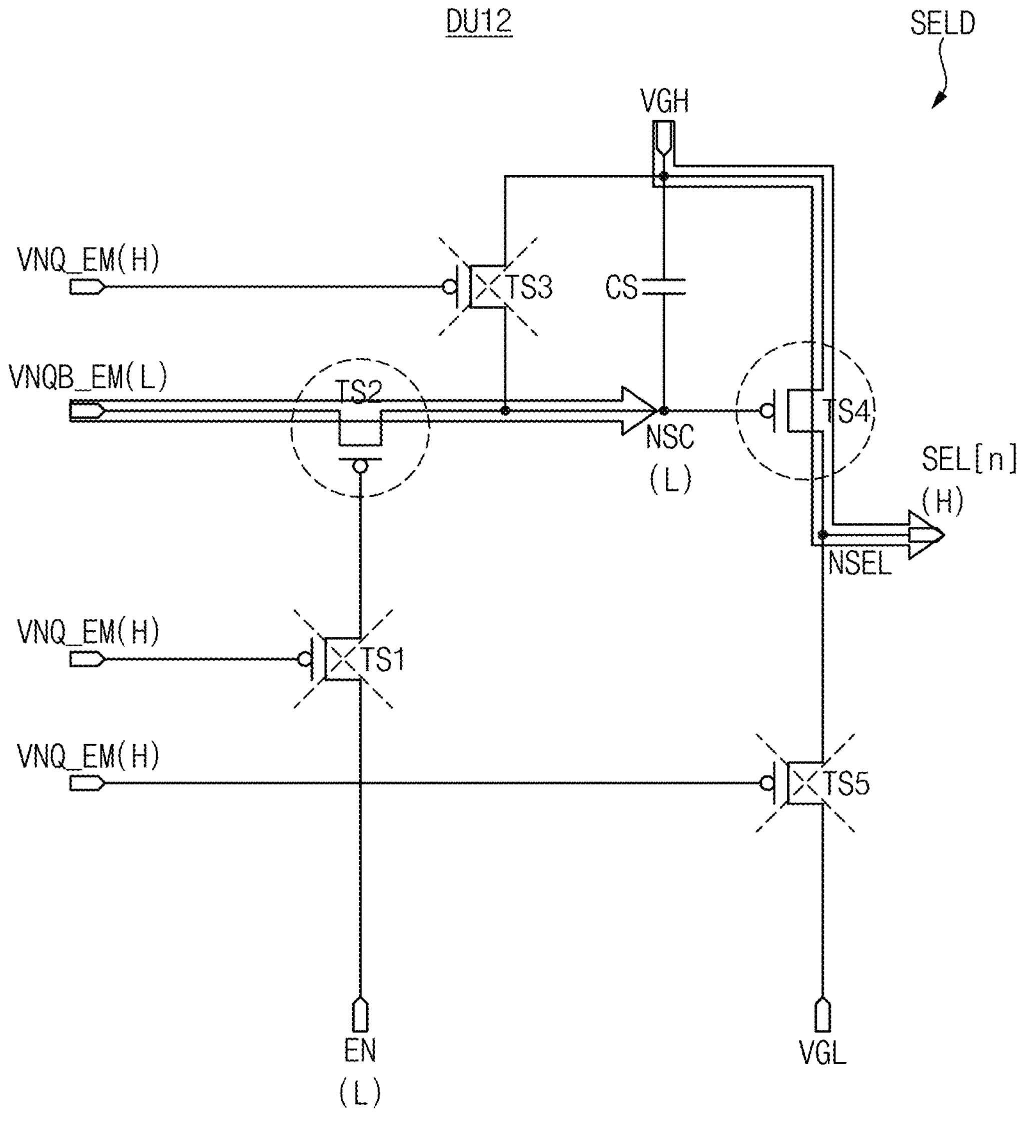
FIG. 34 is a circuit diagram showing an operation of the selection driver of FIG. 19 in a twelfth duration of FIG. 30.
Figure 35:
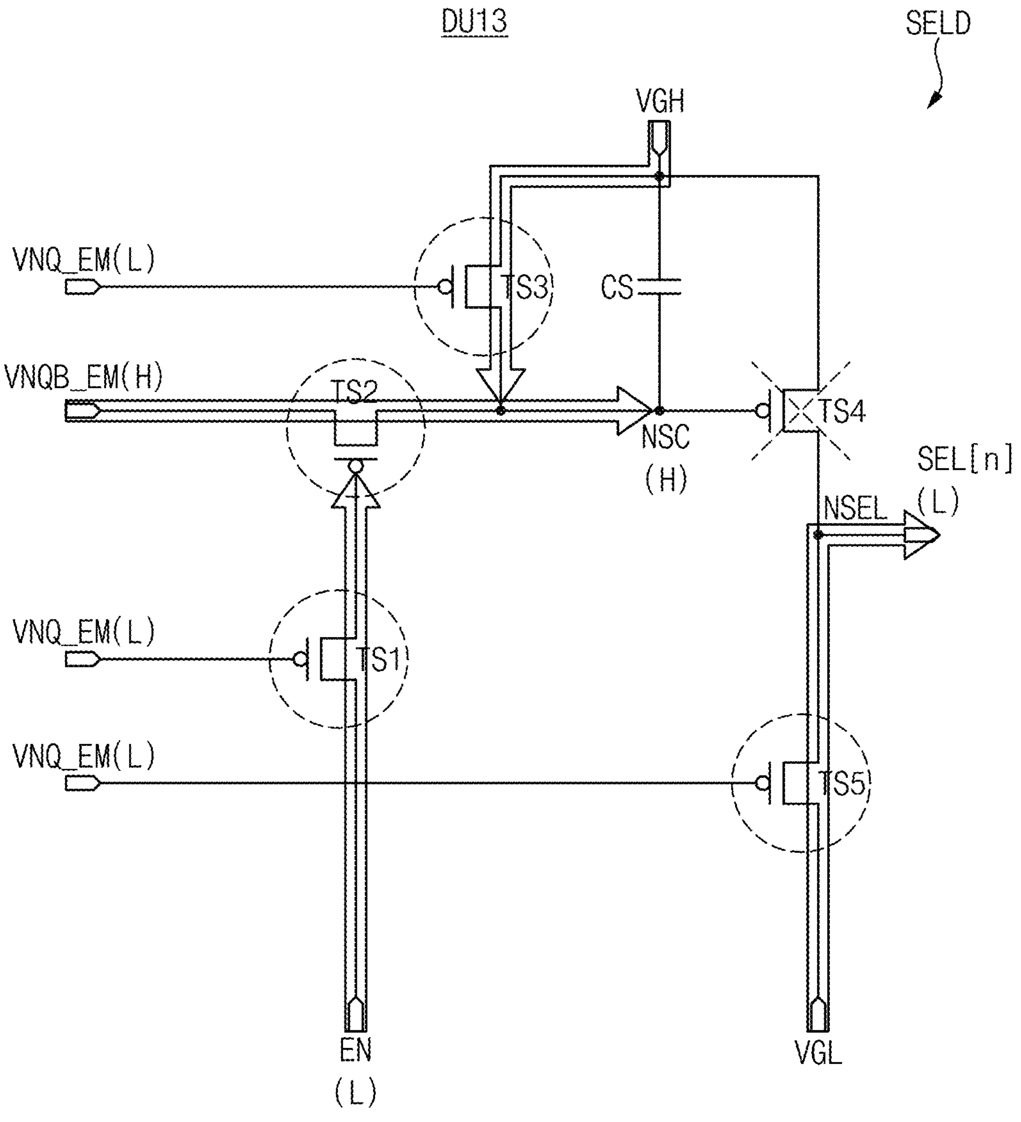
FIG. 35 is a circuit diagram showing an operation of the selection driver of FIG. 19 in a thirteenth duration of FIG. 30.

FIG. 30 is a timing diagram showing an output of a selection signal SEL[n] of FIG. 19 when a pulse of an enable signal EN of FIG. 19 is at a second position. FIG. 31 is a circuit diagram showing an operation of the selection driver SELD of FIG. 19 in the ninth duration DU9 of FIG. 30. FIG. 32 is a circuit diagram showing an operation of the selection driver SELD of FIG. 19 in a tenth duration DU10 of FIG. 30. FIG. 33 is a circuit diagram showing an operation of the selection driver SELD of FIG. 19 in the eleventh duration DU11 of FIG. 30. FIG. 34 is a circuit diagram showing an operation of the selection driver SELD of FIG. 19 in a twelfth duration DU12 of FIG. 30. FIG. 35 is a circuit diagram showing an operation of the selection driver SELD of FIG. 19 in a thirteenth duration DU13 of FIG. 30.

Referring to FIGS. 1-35, in the ninth duration DU9, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

In the tenth duration DU10, the voltage VNQ_EM of the emission control node EM_NQ1, EM_NQ2 may have the second level H, the voltage VNQB_EM of the inverted emission control node EM_NQB may have the first level L, and the enable signal EN may have the first level L. As described in the second duration DU2, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the first level L, the selection signal SEL[n] may have the second level H.

In the eleventh duration DU11, the voltage VNQ_EM of the emission control node EM_NQ1, EM_NQ2 may have the second level H, the voltage VNQB_EM of the inverted emission control node EM_NQB may have the first level L, and the enable signal EN may have the second level H. As described in the second duration DU2, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the first level L, the selection signal SEL[n] may have the second level H.

In the twelfth duration DU12, the voltage VNQ_EM of the emission control node EM_NQ1, EM_NQ2 may have the second level H, the voltage VNQB_EM of the inverted emission control node EM_NQB may have the first level L, and the enable signal EN may have the first level L. As described in the second duration DU2, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the first level L, the selection signal SEL[n] may have the second level H.

In the thirteenth duration DU13, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

The pulse of the enable signal EN may be at the second position. With respect to the second position, the pulse of the enable signal EN may be included in the pulse of the emission signal EM[n]. That is, the pulse of the enable signal EN may completely overlap with the pulse of the emission signal EM[n]. As described in FIGS. 30-35, when the pulse of the enable signal EN is at the second position, the pulse of the selection signal SEL[n] may be output, and the pulse of the selection signal SEL[n] may have the same length and timing as the pulse of the emission signal EM[n].

Figure 36:
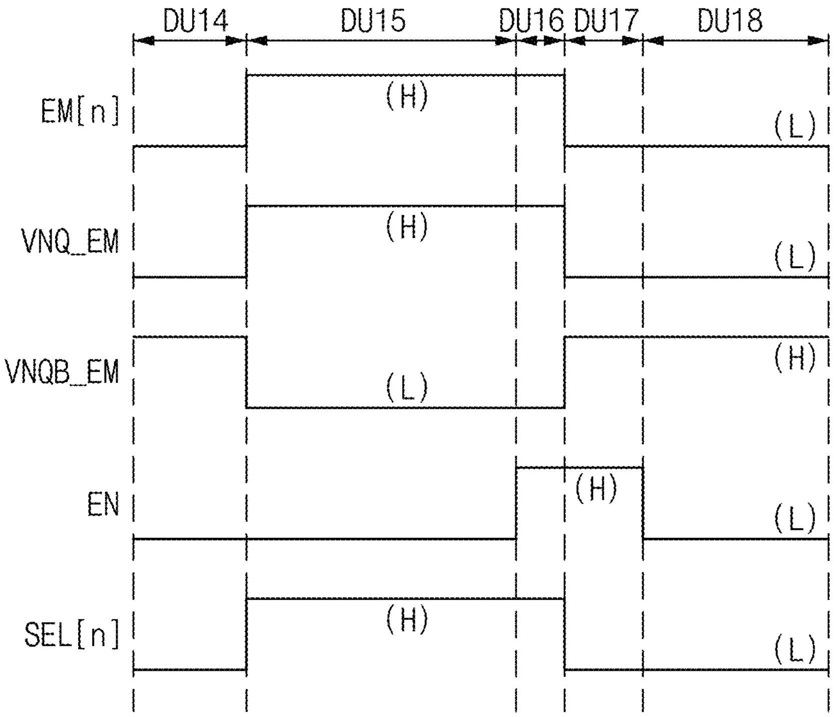
FIG. 36 is a timing diagram showing an output of a selection signal of FIG. 19 when a pulse of an enable signal of FIG. 19 is at a third position.
Figure 37:
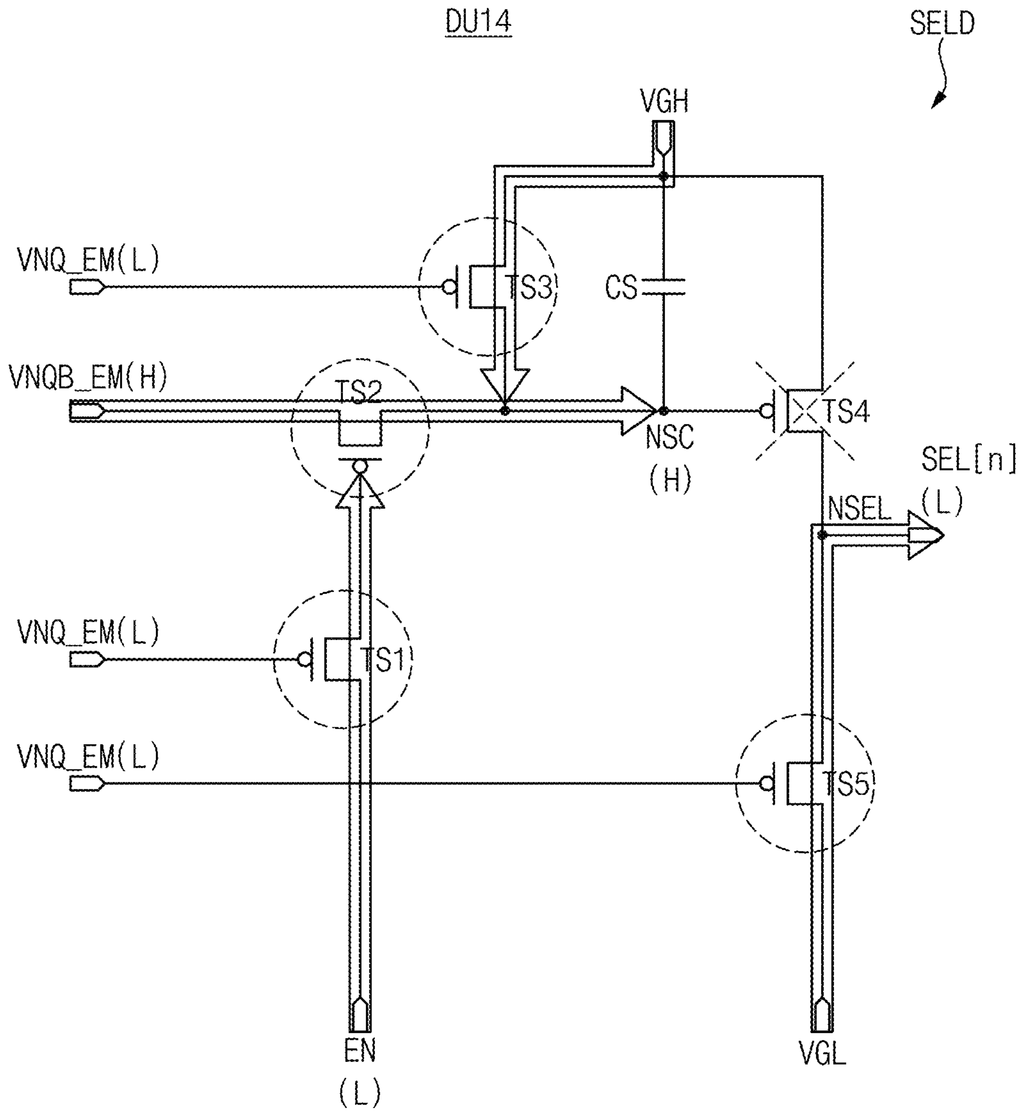
FIG. 37 is a circuit diagram showing an operation of the selection driver of FIG. 19 in a fourteenth duration of FIG. 36.
Figure 38:
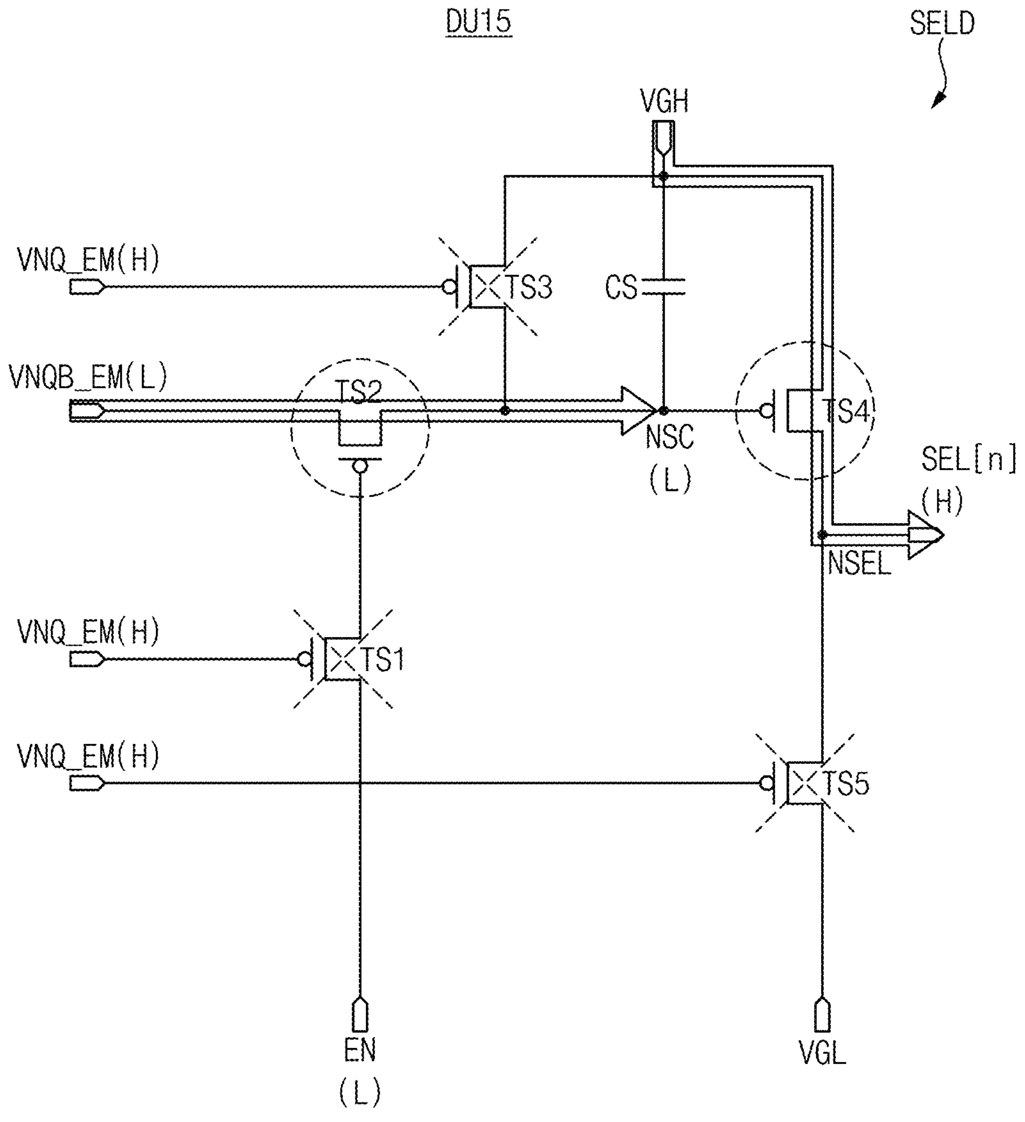
FIG. 38 is a circuit diagram showing an operation of the selection driver of FIG. 19 in a fifteenth duration of FIG. 36.
Figure 39:
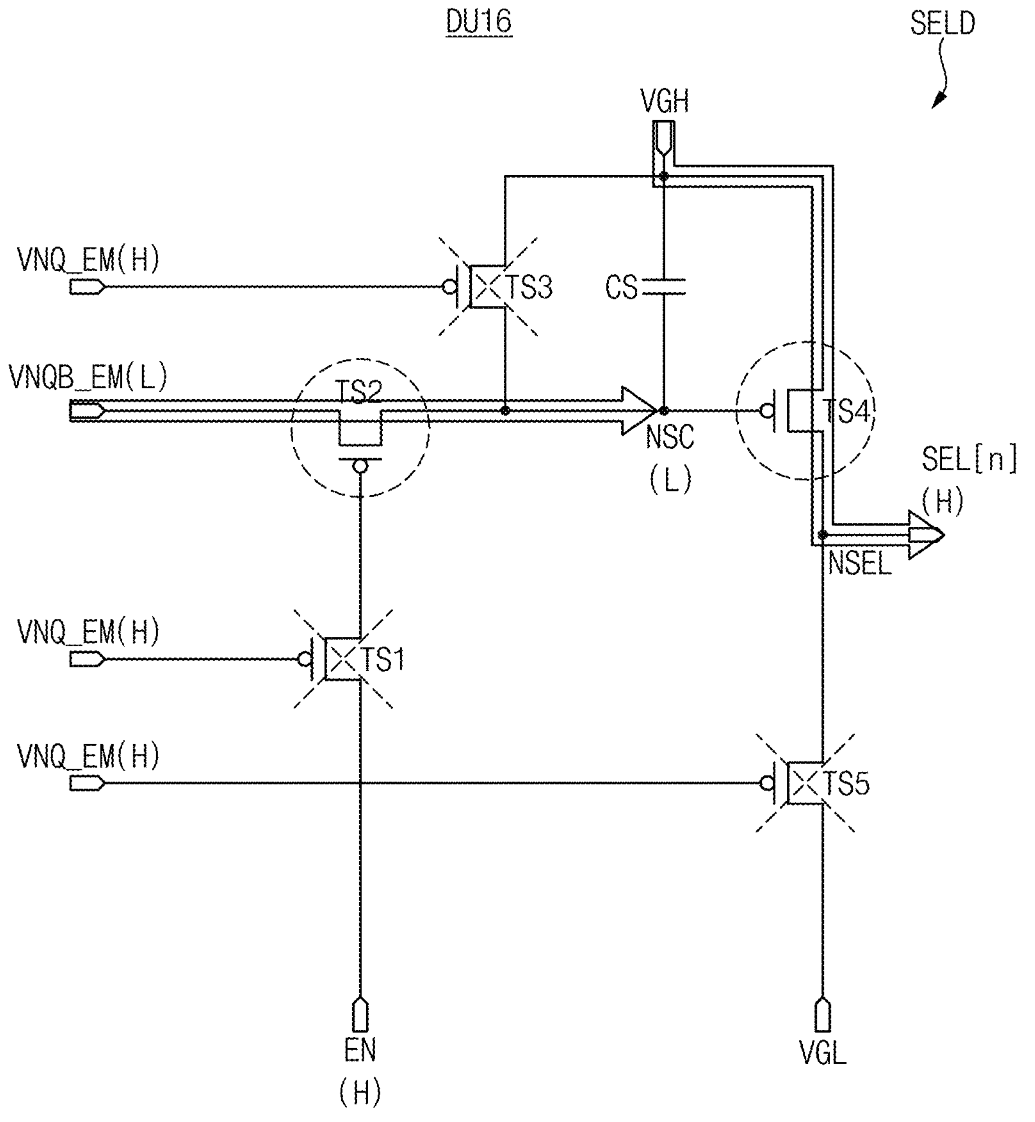
FIG. 39 is a circuit diagram showing an operation of the selection driver of FIG. 19 in a sixteenth duration of FIG. 36.
Figure 40:
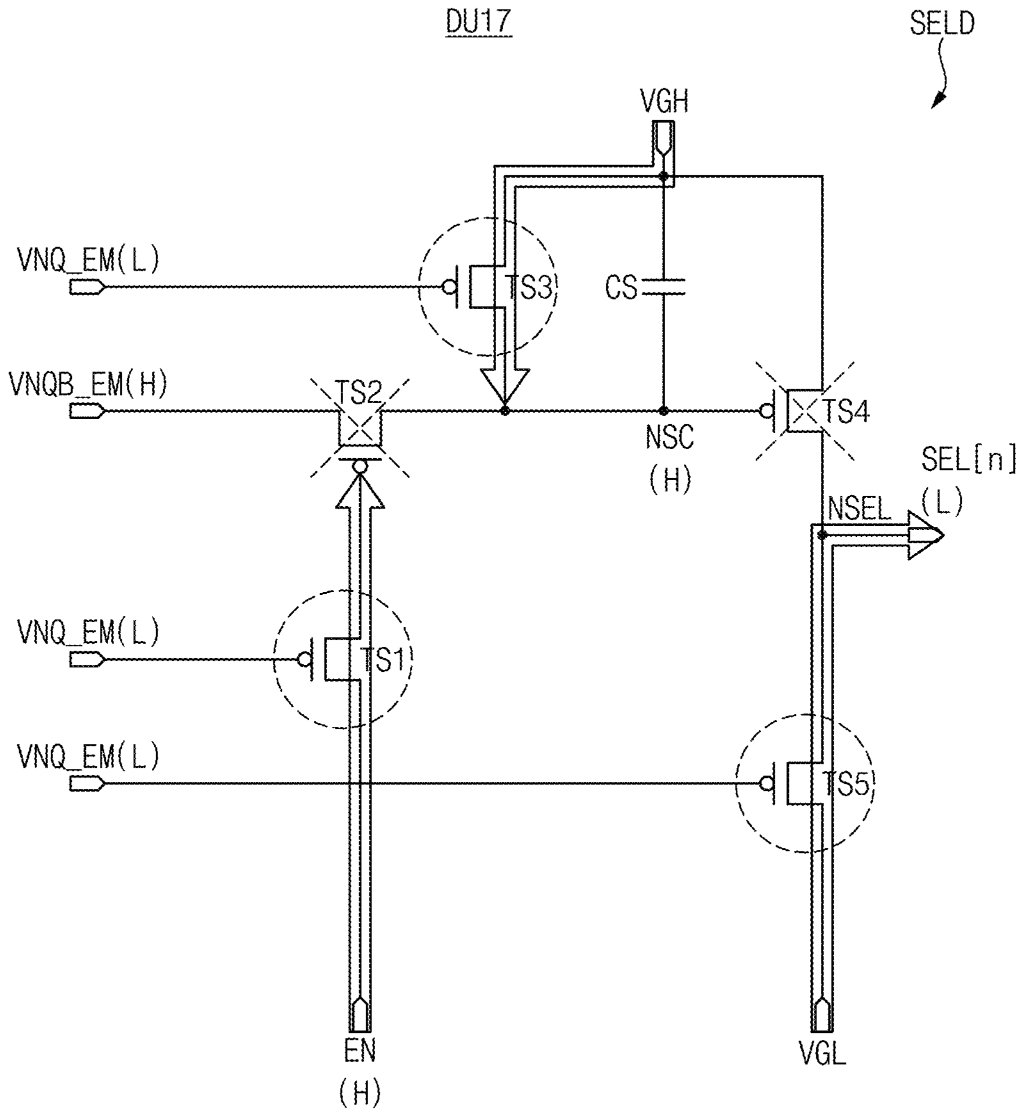
FIG. 40 is a circuit diagram showing an operation of the selection driver of FIG. 19 in a seventeenth duration of FIG. 36.
Figure 41:
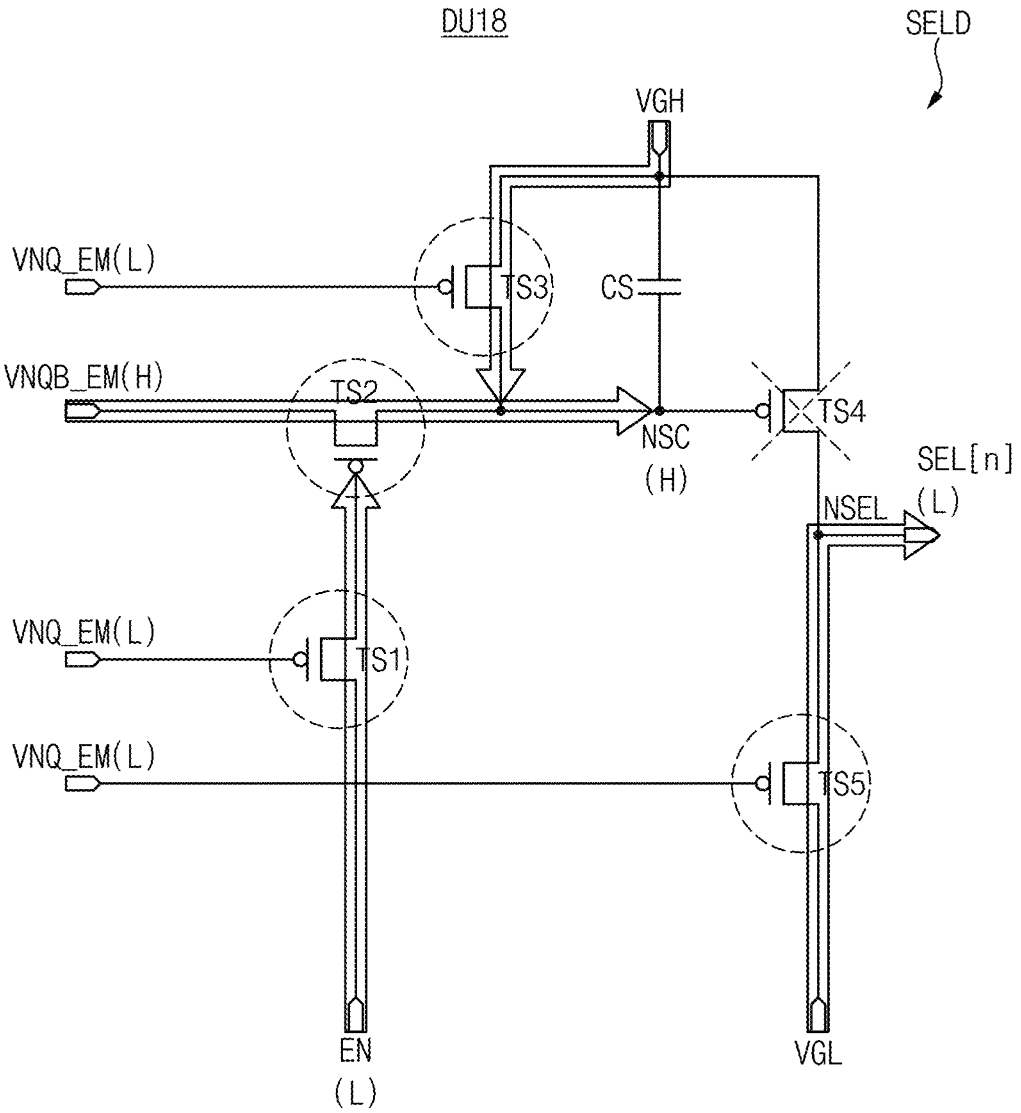
FIG. 41 is a circuit diagram showing an operation of the selection driver of FIG. 19 in an eighteenth duration of FIG. 36.

FIG. 36 is a timing diagram showing an output of a selection signal SEL[n] of FIG. 19 when a pulse of an enable signal EN of FIG. 19 is at a third position. FIG. 37 is a circuit diagram showing an operation of the selection driver SELD of FIG. 19 in a fourteenth duration DU14 of FIG. 36. FIG. 38 is a circuit diagram showing an operation of the selection driver SELD of FIG. 19 in a fifteenth duration DU15 of FIG. 36. FIG. 39 is a circuit diagram showing an operation of the selection driver SELD of FIG. 19 in a sixteenth duration DU16 of FIG. 36. FIG. 40 is a circuit diagram showing an operation of the selection driver SELD of FIG. 19 in a seventeenth duration DU17 of FIG. 36. FIG. 41 is a circuit diagram showing an operation of a selection driver SELD of FIG. 19 in an eighteenth duration DU18 of FIG. 36.

Referring to FIGS. 1-41, in the fourteenth duration DU14, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

In the fifteenth duration DU15, the voltage VNQ_EM of the emission control node EM_NQ1, EM_NQ2 may have the second level H, the voltage VNQB_EM of the inverted emission control node EM_NQB may have the first level L, and the enable signal EN may have the first level L. As described in the second duration DU2, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the first level L, the selection signal SEL[n] may have the second level H.

In the sixteenth duration DU16, the voltage VNQ_EM of the emission control node EM_NQ1, EM_NQ2 may have the second level H, the voltage VNQB_EM of the inverted emission control node EM_NQB may have the first level L, and the enable signal EN may have the second level H. As described in the second duration DU2, when the voltage VNQ_EM of the emission control node EM_NQ1, EM_NQ2 has the second level H and the voltage VNQB_EM of the inverted emission control node EM_NQB has the first level L, the voltage of the gate electrode of the second selection transistor TS2 may maintain the previous state. When the previous state of the voltage of the gate electrode of the second selection transistor TS2 is the first level L, the selection signal SEL[n] may have the second level H.

In the seventeenth duration DU17, the voltage VNQ_EM of the emission control node EM_NQ1, EM_NQ2 may have the first level L, the voltage VNQB_EM of the inverted emission control node EM_NQB may have the second level H, and the enable signal EN may have the second level H. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

In the eighteenth duration DU18, the voltage VNQ_EM of the emission control node EM_NQ1, EM_NQ2 may have the first level L, the voltage VNQB_EM of the inverted emission control node EM_NQB may have the second level H, and the enable signal EN may have the first level L. As described in the first duration DU1, when the voltage VNQ_EM of the emission control node EM_NQ1, EM_NQ2 has the first level L and the voltage VNQB_EM of the inverted emission control node EM_NQB has the second level H, the selection signal SEL[n] may have the first level L regardless of the enable signal EN.

The pulse of the enable signal EN may be at the third position. With respect to the third position, the pulse of the enable signal EN may be output later than the pulse of the emission signal EM[n], and the pulse of the enable signal EN may partially overlap with the pulse of the emission signal EM[n]. As described in FIGS. 36-41, when the pulse of the enable signal EN is at the third position, the pulse of the selection signal SEL[n] may be output, and the pulse of the selection signal SEL[n] may have the same length and timing as the pulse of the emission signal EM[n].

Figure 42:
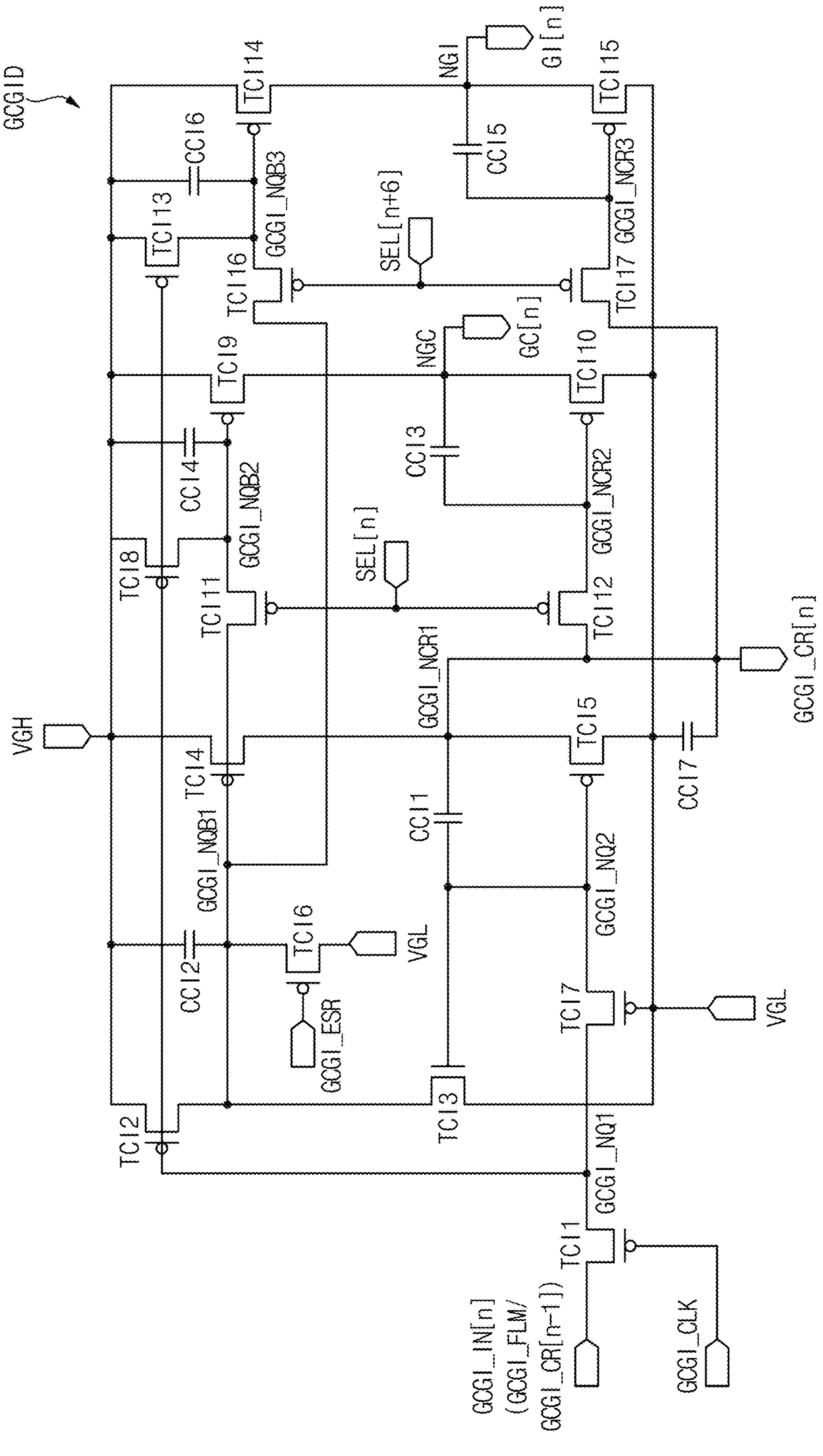
FIG. 42 is a circuit diagram showing a compensation initialization gate driver of FIG. 7.

FIG. 42 is a circuit diagram showing a compensation initialization gate driver GCGID of FIG. 7.

Referring to FIGS. 1-42, the compensation initialization gate driver GCGID may include compensation initialization stages. FIG. 42 shows an n-th compensation initialization gate stage. Here, n is a positive integer greater than or equal to 1.

The compensation initialization gate driver GCGID may include first to seventeenth compensation initialization transistors TCI1 to TCI17 and first to sixth compensation initialization capacitors CCI1 to CCI6.

The first compensation initialization transistor TCI1 may include a gate electrode receiving a compensation initialization clock signal GCGI_CLK, a first electrode receiving a compensation initialization input signal GCGI_IN[n], and a second electrode connected to a compensation initialization control node GCGI_NQ1, GCGI_NQ2. The first compensation initialization transistor TCI1 may be turned on in response to the compensation initialization clock signal GCGI_CLK to provide the compensation initialization input signal GCGI_IN[n] to the compensation initialization control node GCGI_NQ1, GCGI_NQ2. The compensation initialization input signal GCGI_IN[n] may be a compensation initialization start signal GCGI_FLM or a previous compensation initialization carry signal GCGI_CR[n−1]. When n is 1, the compensation initialization input signal GCGI_IN[n] may be the compensation initialization start signal GCGI_FLM. When n is 2 or greater, the compensation initialization input signal GCGI_IN[n] may be the previous compensation initialization carry signal GCGI_CR[n−1].

The second compensation initialization transistor TCI2 may include a gate electrode connected to the compensation initialization control node GCGI_NQ1, GCGI_NQ2, a first electrode receiving a high gate voltage VGH, and a second electrode connected to an inverted compensation initialization control node GCGI_NQB1, GCGI_NQB2, GCGI_NQB3. The second compensation initialization transistor TCI2 may be turned on in response to a voltage of the compensation initialization control node GCGI_NQ1, GCGI_NQ2 to provide the high gate voltage VGH to the inverted compensation initialization control node GCGI_NQB1, GCGI_NQB2, GCGI_NQB3.

The third compensation initialization transistor TCI3 may include a gate electrode connected to the compensation initialization control node GCGI_NQ1, GCGI_NQ2, a first electrode receiving a low gate voltage VGL, and a second electrode connected to the inverted compensation initialization control node GCGI_NQB1, GCGI_NQB2, GCGI_NQB3. The third compensation initialization transistor TCI3 may be turned on in response to the voltage of the compensation initialization control node GCGI_NQ1, GCGI_NQ2 to provide the low gate voltage VGL to the inverted compensation initialization control node GCGI_NQB1, GCGI_NQB2, GCGI_NQB3.

The inverted compensation initialization control node GCGI_NQB1, GCGI_NQB2, GCGI_NQB3 may include a first inverted compensation initialization control node GCGI_NQB1, a second inverted compensation initialization control node GCGI_NQB2, and a third inverted compensation initialization control node GCGI_NQB3.

The fourth compensation initialization transistor TCI4 may include a gate electrode connected to the first inverted compensation initialization control node GCGI_NQB1, a first electrode receiving the high gate voltage VGH, and a second electrode connected to a compensation initialization carry output node GCGI_NCR1, GCGI_NCR2, GCGI_NCR3 outputting a compensation initialization carry signal GCGI_CR[n]. The fourth compensation initialization transistor TCI4 may be turned on in response to a voltage of the first inverted compensation initialization control node GCGI_NQB1 to provide the high gate voltage VGH to the compensation initialization carry output node GCGI_NCR1, GCGI_NCR2, GCGI_NCR3.

The fifth compensation initialization transistor TCI5 may include a gate electrode connected to the compensation initialization control node GCGI_NQ1, GCGI_NQ2, a first electrode receiving the low gate voltage VGL, and a second electrode connected to the compensation initialization carry output node GCGI_NCR1, GCGI_NCR2, GCGI_NCR3. The fifth compensation initialization transistor TCI5 may be turned on in response to the voltage of the compensation initialization control node GCGI_NQ1, GCGI_NQ2 to provide the low gate voltage VGL to the compensation initialization carry output node GCGI_NCR1, GCGI_NCR2, GCGI_NCR3.

The sixth compensation initialization transistor TCI6 may include a gate electrode receiving a compensation initialization reset signal GCGI_ESR, a first electrode receiving the low gate voltage VGL, and a second electrode connected to the first inverted compensation initialization control node GCGI_NQB1. The sixth compensation initialization transistor TCI6 may be turned on in response to the compensation initialization reset signal GCGI_ESR to provide the low gate voltage VGL to the first inverted compensation initialization control node GCGI_NQB1.

The compensation initialization control node GCGI_NQ1, GCGI_NQ2 may include a first compensation initialization control node GCGI_NQ1 and a second compensation initialization control node GCGI_NQ2.

The seventh compensation initialization transistor TCI7 may include a gate electrode receiving the low gate voltage VGL, a first electrode connected to the first compensation initialization control node GCGI_NQ1, and a second electrode connected to the second compensation initialization control node GCGI_NQ2. The seventh compensation initialization transistor TCI7 may be turned on in response to the low gate voltage VGL. Therefore, the seventh compensation initialization transistor TCI7 may be an always-on transistor.

The eighth compensation initialization transistor TCI8 may include a gate electrode connected to the compensation initialization control node GCGI_NQ1, GCGI_NQ2, a first electrode receiving the high gate voltage VGH, and a second electrode connected to the second inverted compensation initialization control node GCGI_NQB2. The eighth compensation initialization transistor TCI8 may be turned on in response to the voltage of the compensation initialization control node GCGI_NQ1, GCGI_NQ2 to provide the high gate voltage VGH to the second inverted compensation initialization control node GCGI_NQB2.

The ninth compensation initialization transistor TCI9 may include a gate electrode connected to the second inverted compensation initialization control node GCGI_NQB2, a first electrode receiving the high gate voltage VGH, and a second electrode connected to a compensation gate output node NGC outputting a compensation gate signal GC[n]. The ninth compensation initialization transistor TCI9 may be turned on in response to a voltage of the second inverted compensation initialization control node GCGI_NQB2 to provide the high gate voltage VGH to the compensation gate output node NGC.

The compensation initialization carry output node GCGI_NCR1, GCGI_NCR2, GCGI_NCR3 may include a first compensation initialization carry output node GCGI_NCR1, a second compensation initialization carry output node GCGI_NCR2, and a third compensation initialization carry output node GCGI_NCR3.

The tenth compensation initialization transistor TCI10 may include a gate electrode connected to the second compensation initialization carry output node GCGI_NCR2, a first electrode receiving the low gate voltage VGL, and a second electrode connected to the compensation gate output node NGC. The tenth compensation initialization transistor TCI10 may be turned on in response to the voltage of the second compensation initialization carry output node GCGI_NCR2 to provide the low gate voltage VGL to the compensation gate output node NGC.

The eleventh compensation initialization transistor TCI11 may include a gate electrode receiving a selection signal SEL[n], a first electrode connected to the first inverted compensation initialization control node GCGI_NQB1, and a second electrode connected to the second inverted compensation initialization control node GCGI_NQB2. The eleventh compensation initialization transistor TCI11 may control the voltage of the second inverted compensation initialization control node GCGI_NQB2 based on the selection signal SEL[n]. For example, the eleventh compensation initialization transistor TCI11 may be turned on in response to the selection signal SEL[n] to transmit the voltage of the first inverted compensation initialization control node GCGI_NQB1 to the second inverted compensation initialization control node GCGI_NQB2.

The twelfth compensation initialization transistor TCI12 may include a gate electrode receiving the selection signal SEL[n], a first electrode connected to the first compensation initialization carry output node GCGI_NCR1, and a second electrode connected to the second compensation initialization carry output node GCGI_NCR2. The twelfth compensation initialization transistor TCI12 may control the voltage of the second compensation initialization carry output node GCGI_NCR2 based on the selection signal SEL[n]. For example, the twelfth compensation initialization transistor TCI12 may transmit the voltage of the first compensation initialization carry output node GCGI_NCR1 to the second compensation initialization carry output node GCGI_NCR2 in response to the selection signal SEL[n].

The thirteenth compensation initialization transistor TCI13 may include a gate electrode connected to the compensation initialization control node GCGI_NQ1, GCGI_NQ2, a first electrode receiving the high gate voltage VGH, and a second electrode connected to the third inverted compensation initialization control node GCGI_NQB3. The thirteenth compensation initialization transistor TCI13 may be turned on in response to the voltage of the compensation initialization control node GCGI_NQ1, GCGI_NQ2 to provide the high gate voltage VGH to the third inverted compensation initialization control node GCGI_NQB3.

The fourteenth compensation initialization transistor TCI14 may include a gate electrode connected to the third inverted compensation initialization control node GCGI_NQB3, a first electrode receiving the high gate voltage VGH, and a second electrode connected to an initialization gate output node NGI outputting an initialization gate signal GI[n]. The fourteenth compensation initialization transistor TCI14 may be turned on in response to a voltage of the third inverted compensation initialization control node GCGI_NQB3 to provide the high gate voltage VGH to the initialization gate output node NGI.

The fifteenth compensation initialization transistor TCI15 may include a gate electrode connected to the third compensation initialization carry output node GCGI_NCR3, a first electrode receiving the low gate voltage VGL, and a second electrode connected to the initialization gate output node NGI. The fifteenth compensation initialization transistor TCI15 may be turned on in response to a voltage of the third compensation initialization carry output node GCGI_NCR3 to provide the low gate voltage VGL to the initialization gate output node NGI.

The sixteenth compensation initialization transistor TCI16 may include a gate electrode receiving a next selection signal SEL[n+6], a first electrode connected to the first inverted compensation initialization control node GCGI_NQB1, and a second electrode connected to the third inverted compensation initialization control node GCGI_NQB3. The sixteenth compensation initialization transistor TCI16 may control a voltage of the third inverted compensation initialization control node GCGI_NQB3 based on the next selection signal SEL[n+6]. For example, the sixteenth compensation initialization transistor TCI16 may be turned on in response to the next selection signal SEL[n+6] to transmit the voltage of the first inverted compensation initialization control node GCGI_NQB1 to the third inverted compensation initialization control node GCGI_NQB3.

The seventeenth compensation initialization transistor TCI17 may include a gate electrode receiving the next selection signal SEL[n+6], a first electrode connected to the first compensation initialization carry output node GCGI_NCR1, and a second electrode connected to the third compensation initialization carry output node GCGI_NCR3. The seventeenth compensation initialization transistor TCI17 may control a voltage of the third compensation initialization carry output node GCGI_NCR3 based on the next selection signal SEL[n+6]. For example, the seventeenth compensation initialization transistor TCI17 may be turned on in response to the next selection signal SEL[n+6] to transmit the voltage of the first compensation initialization carry output node GCGI_NCR1 to the third compensation initialization carry output node GCGI_NCR3.

The first compensation initialization capacitor CCI1 may include a first electrode connected to the compensation initialization control node GCGI_NQ1, GCGI_NQ2 and a second electrode connected to the first compensation initialization carry output node GCGI_NCR1.

The second compensation initialization capacitor CCI2 may include a first electrode receiving the high gate voltage VGH and a second electrode connected to the first inverted compensation initialization control node GCGI_NQB1.

The third compensation initialization capacitor CCI3 may include a first electrode connected to the second compensation initialization carry output node GCGI_NCR2 and a second electrode connected to the compensation gate output node NGC.

The fourth compensation initialization capacitor CCI4 may include a first electrode receiving the high gate voltage VGH and a second electrode connected to the second inverted compensation initialization control node GCGI_NQB2.

The fifth compensation initialization capacitor CCI5 may include a first electrode connected to the third compensation initialization carry output node GCGI_NCR3 and a second electrode connected to the initialization gate output node NGI.

The sixth compensation initialization capacitor CCI6 may include a first electrode receiving the high gate voltage VGH and a second electrode connected to the third inverted compensation initialization control node GCGI_NQB3.

The seventh compensation initialization capacitor CCI7 may include a first electrode receiving the low gate voltage VGL and a second electrode connected to the first compensation initialization carry output node GCGI_NCR1.

In one or more embodiments, the first, second, and fourth to seventeenth compensation initialization transistors TCI1, TCI2, TCI4 to TCI17 may be P-type transistors, and the third compensation initialization transistor TCI3 may be an N-type transistor. For example, the P-type transistor may be a PMOS transistor. For example, the N-type transistor may be an NMOS transistor. However, the present disclosure is not limited thereto.

In addition, in FIG. 42, the compensation initialization gate driver GCGID is shown as including seventeen transistors TCI1 to TCI17 and seven capacitors CCI1 to CCI7, but the present disclosure is not limited thereto. The compensation initialization gate driver GCGID may have any configuration in which an output of the compensation gate signal GC and an output of the initialization gate signal GI are controlled based on the selection signal SEL.

As such, the compensation gate signal GC and the initialization gate signal GI may be masked based on the selection signal SEL.

Figure 43:
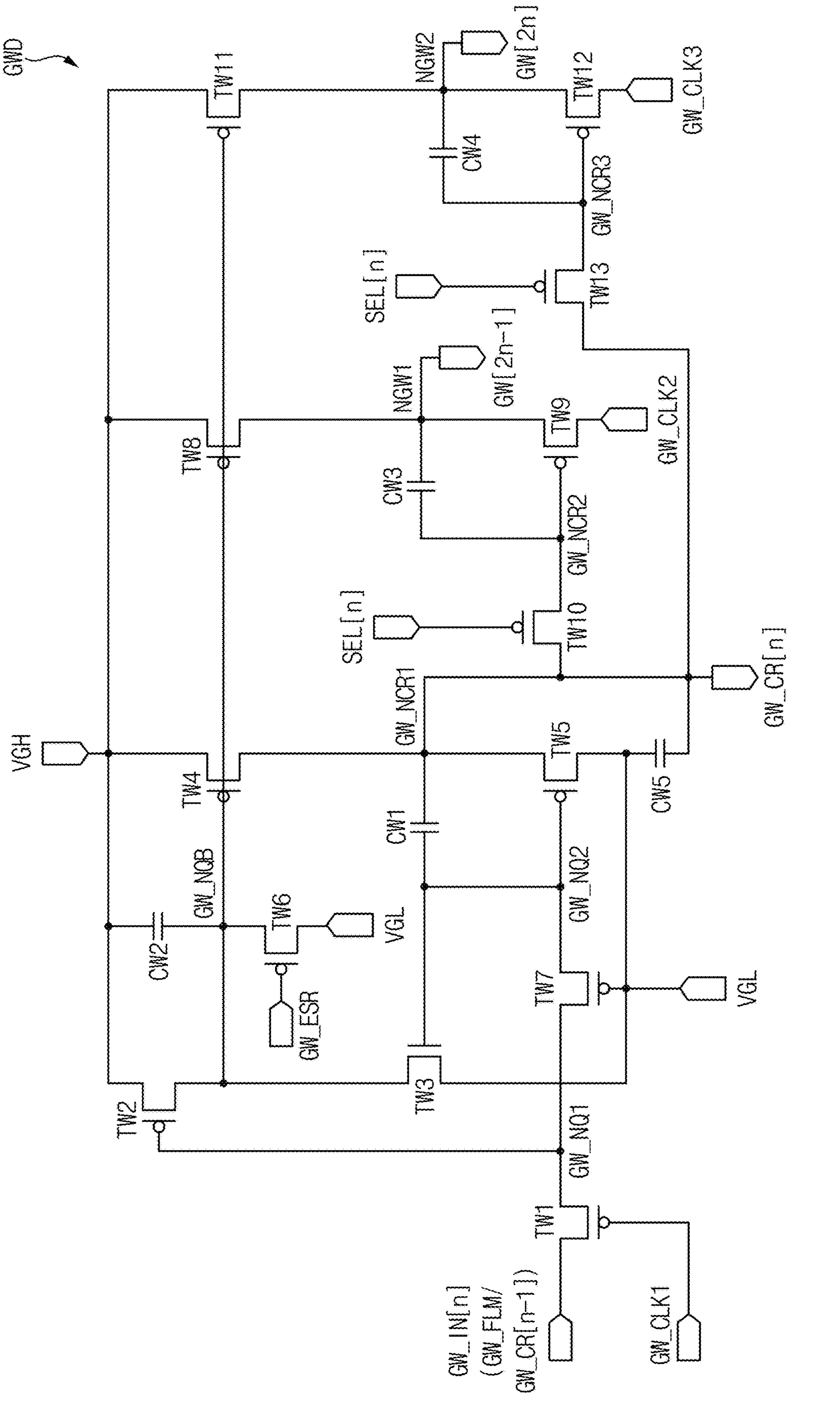
FIG. 43 is a circuit diagram showing a write gate driver of FIG. 7.

FIG. 43 is a circuit diagram showing the write gate driver GWD of FIG. 7.

Referring to FIGS. 1-43, the write gate driver GWD may include write stages. FIG. 43 shows an n-th write gate stage. Here, n is a positive integer greater than or equal to 1.

The write gate driver GWD may include first to thirteenth write transistors TW1 to TW13 and first to fourth write capacitors CW1 to CW4.

The first write transistor TW1 may include a gate electrode receiving a first write clock signal GW_CLK1, a first electrode receiving a write input signal GW_IN[n], and a second electrode connected to a write control node GW_NQ1, GW_NQ2. The first write transistor TW1 may be turned on in response to the first write clock signal GW_CLK1 to provide the write input signal GW_IN[n] to the write control node GW_NQ1, GW_NQ2. The write input signal GW_IN[n] may be a write start signal GW_FLM or a previous write carry signal GW_CR[n−1]. When n is 1, the write input signal GW_IN[n] may be the write start signal GW_FLM. When n is 2 or greater, the write input signal GW_IN[n] may be the previous write carry signal GW_CR[n−1].

The second write transistor TW2 may include a gate electrode connected to the write control node GW_NQ1, GW_NQ2, a first electrode receiving a high gate voltage VGH, and a second electrode connected to an inverted write control node GW_NQB. The second write transistor TW2 may be turned on in response to a voltage of the write control node GW_NQ1, GW_NQ2 to provide the high gate voltage VGH to the inverted write control node GW_NQB.

The third write transistor TW3 may include a gate electrode connected to the write control node GW_NQ1, GW_NQ2, a first electrode receiving a low gate voltage VGL, and a second electrode connected to the inverted write control node GW_NQB. The third write transistor TW3 may be turned on in response to the voltage of the write control node GW_NQ1, GW_NQ2 to provide the low gate voltage VGL to the inverted write control node GW_NQB.

The fourth write transistor TW4 may include a gate electrode connected to the inverted write control node GW_NQB, a first electrode receiving the high gate voltage VGH, and a second electrode connected to a write carry output node GW_NCR1, GW_NCR2, GW_NCR3 that outputs a write carry signal GW_CR[n]. The fourth write transistor TW4 may be turned on in response to a voltage of the inverted write control node GW_NQB to provide the high gate voltage VGH to the write carry output node GW_NCR1, GW_NCR2, GW_NCR3.

The fifth write transistor TW5 may include a gate electrode connected to the write control node GW_NQ1, GW_NQ2, a first electrode receiving the low gate voltage VGL, and a second electrode connected to the write carry output node GW_NCR1, GW_NCR2, GW_NCR3. The fifth write transistor TW5 may be turned on in response to the voltage of the write control node GW_NQ1, GW_NQ2 to provide the low gate voltage VGL to the write carry output node GW_NCR1, GW_NCR2, GW_NCR3.

The sixth write transistor TW6 may include a gate electrode receiving a write reset signal GW_ESR, a first electrode receiving the low gate voltage VGL, and a second electrode connected to the inverted write control node GW_NQB. The sixth write transistor TW6 may be turned on in response to the write reset signal GW_ESR to provide the low gate voltage VGL to the inverted write control node GW_NQB.

The write control node GW_NQ1, GW_NQ2 may include a first write control node GW_NQ1 and a second write control node GW_NQ2.

The seventh write transistor TW7 may include a gate electrode receiving the low gate voltage VGL, a first electrode connected to the first write control node GW_NQ1, and a second electrode connected to the second write control node GW_NQ2. The seventh write transistor TW7 may be turned on in response to the low gate voltage VGL. Therefore, the seventh write transistor TW7 may be an always-on transistor.

The eighth write transistor TW8 may include a gate electrode connected to the inverted write control node GW_NQB, a first electrode receiving the high gate voltage VGH, and a second electrode connected to a first write gate output node NGW1 outputting a write gate signal GW[2n−1]. The eighth write transistor TW8 may be turned on in response to the voltage of the inverted write control node GW_NQB to provide the high gate voltage VGH to the first write gate output node NGW1.

The write carry output node GW_NCR1, GW_NCR2, GW_NCR3 may include a first write carry output node GW_NCR1, a second write carry output node GW_NCR2, and a third write carry output node GW_NCR3.

The ninth write transistor TW9 may include a gate electrode connected to the second write carry output node GW_NCR2, a first electrode receiving a second write clock signal GW_CLK2, and a second electrode connected to the first write gate output node NGW1. The ninth write transistor TW9 may be turned on in response to a voltage of the second write carry output node GW_NCR2 to provide the second write clock signal GW_CLK2 to the first write gate output node NGW1.

The tenth write transistor TW10 may include a gate electrode receiving a selection signal SEL[n], a first electrode connected to the first write carry output node GW_NCR1, and a second electrode connected to the second write carry output node GW_NCR2. The tenth write transistor TW10 may control the voltage of the second write carry output node GW_NCR2 based on the selection signal SEL[n]. For example, the tenth write transistor TW10 may be turned on in response to the selection signal SEL[n] to transmit the voltage of the first write carry output node GW_NCR1 to the second write carry output node GW_NCR2.

The eleventh write transistor TW11 may include a gate electrode connected to the inverted write control node GW_NQB, a first electrode receiving the high gate voltage VGH, and a second electrode connected to a second write gate output node NGW2 outputting a next write gate signal GW[2n]. The eleventh write transistor TW11 may be turned on in response to the voltage of the inverted write control node GW_NQB to provide the high gate voltage VGH to the second write gate output node NGW2.

The twelfth write transistor TW12 may include a gate electrode connected to the third write carry output node GW_NCR3, a first electrode receiving a third write clock signal GW_CLK3, and a second electrode connected to the second write gate output node NGW2. The twelfth write transistor TW12 may be turned on in response to a voltage of the third write carry output node GW_NCR3 to provide the third write clock signal GW_CLK3 to the second write gate output node NGW2.

The thirteenth write transistor TW13 may include a gate electrode receiving the selection signal SEL[n], a first electrode connected to the first write carry output node GW_NCR1, and a second electrode connected to the third write carry output node GW_NCR3. The thirteenth write transistor TW13 may control the voltage of the third write carry output node GW_NCR3 based on the selection signal SEL[n]. For example, the thirteenth write transistor TW13 may be turned on in response to the selection signal SEL[n] to transmit the voltage of the first write carry output node GW_NCR1 to the third write carry output node GW_NCR3.

The first write capacitor CW1 may include a first electrode connected to the write control node GW_NQ1, GW_NQ2 and a second electrode connected to the first write carry output node GW_NCR1.

The second write capacitor CW2 may include a first electrode receiving the high gate voltage VGH and a second electrode connected to the inverted write control node GW_NQB.

The third write capacitor CW3 may include a first electrode connected to the second write carry output node GW_NCR2 and a second electrode connected to the first write gate output node NGW1.

The fourth write capacitor CW4 may include a first electrode connected to the third write carry output node GW_NCR3 and a second electrode connected to the second write gate output node NGW2.

The fifth write capacitor CW5 may include a first electrode receiving the low gate voltage VGL and a second electrode connected to the first write carry output node GW_NCR1.

In one or more embodiments, the first, second, and fourth to thirteenth write transistors TW1, TW2, TW4 to TW13 may be P-type transistors, and the third write transistor TW3 may be an N-type transistor. For example, the P-type transistor may be a PMOS transistor. For example, the N-type transistor may be an NMOS transistor. However, the present disclosure is not limited thereto.

In addition, although the write gate driver GWD in FIG. 43 is shown as including thirteen transistors TW1 to TW13 and five capacitors CW1 to CW5, the present disclosure is not limited thereto. The write gate driver GWD may have any configuration in which an output of a write gate signal GW is controlled based on the selection signal SEL.

As such, the write gate signal GW may be masked based on the selection signal SEL.

Figure 44:
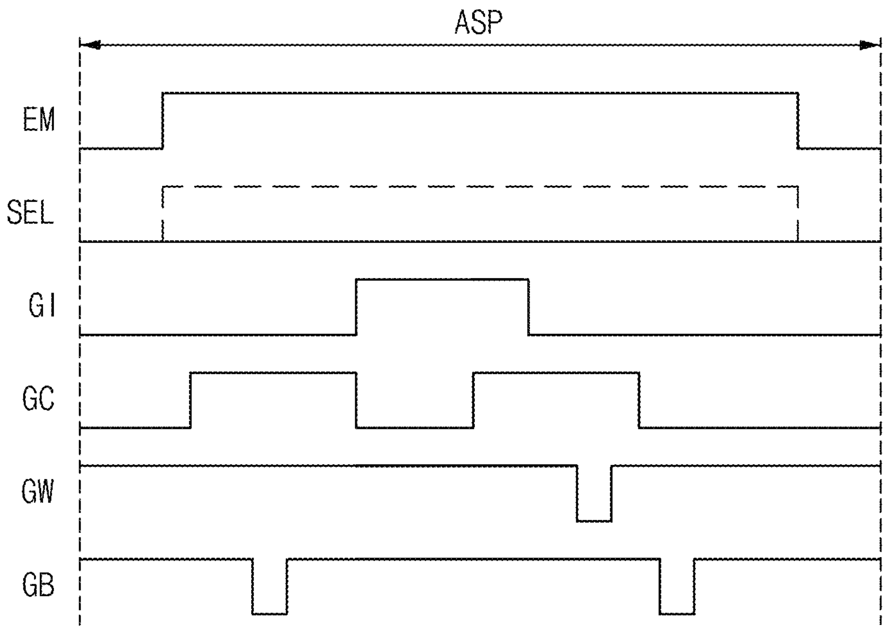
FIG. 44 is a timing diagram showing signals applied to the pixel of FIG. 2 according to a selection signal in an address scan period of FIG. 4.
Figure 45:
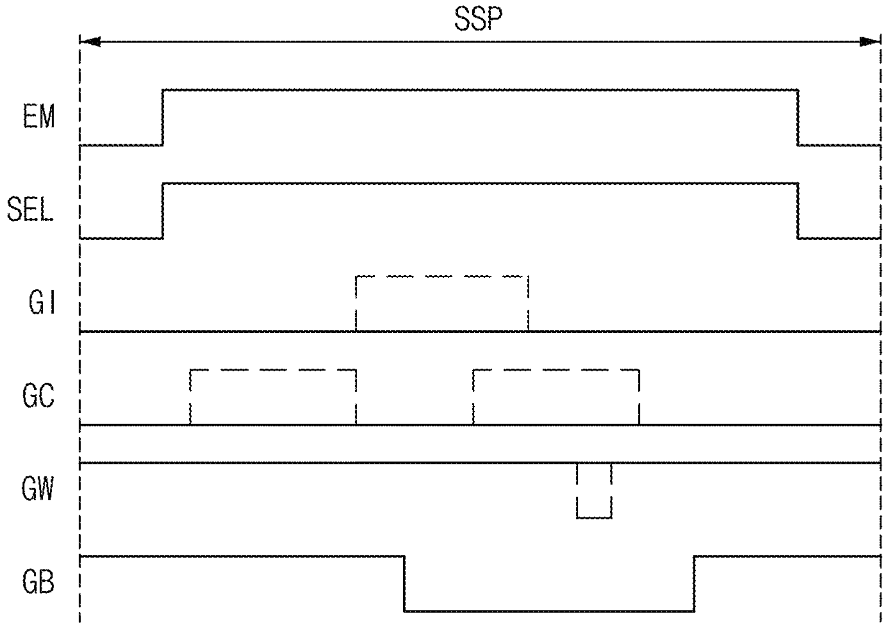
FIG. 45 is a timing diagram showing signals applied to the pixel of FIG. 2 according to a selection signal in a self-scan period of FIG. 4.

FIG. 44 is a timing diagram showing signals GW, GC, GI, GB, EM applied to the pixel of FIG. 2 according to a selection signal SEL in an address scan period ASP of FIG. 4. FIG. 45 is a timing diagram showing signals GW, GC, GI, GB, EM applied to a pixel of FIG. 2 according to a selection signal SEL in a self-scan period SSP of FIG. 4.

Referring to FIGS. 1-45, in an address scan period ASP, a selection signal SEL may have a first level L. As described above, when the selection signal SEL has the first level L, the initialization gate signal GI, the compensation gate signal GC, and the write gate signal GW may not be masked by the selection signal SEL.

On the other hand, in a self-scan period SSP, the selection signal SEL may be generated based on the emission signal EM. Therefore, when the selection signal SEL has a pulse, the pulse of the selection signal SEL may have a same length and timing as the pulse of the emission signal EM. Therefore, a duration in which the selection signal SEL has the second level H (i.e., high level) may be equal to a duration in which the emission signal EM has the second level H (i.e., high level). In addition, the selection signal SEL may be a progressive scan signal. Therefore, a duration in which the selection signal SEL has the second level H may include a duration in which the write gate signal GW has an activation pulse, a duration in which the compensation gate signal GC has activation pulses, and a duration in which the initialization gate signal GI has an activation pulse. Accordingly, the activation pulse of the write gate signal GW, the activation pulses of the compensation gate signal GC, and the activation pulse of the initialization gate signal GI may be masked without a malfunction in which only part of the activation pulses are masked by the selection signal SEL. That is, a masking operation may operate normally. Accordingly, each of the write gate signal GW, the compensation gate signal GC, and the initialization gate signal GI may be masked to have only an inactive level.

Figure 46:
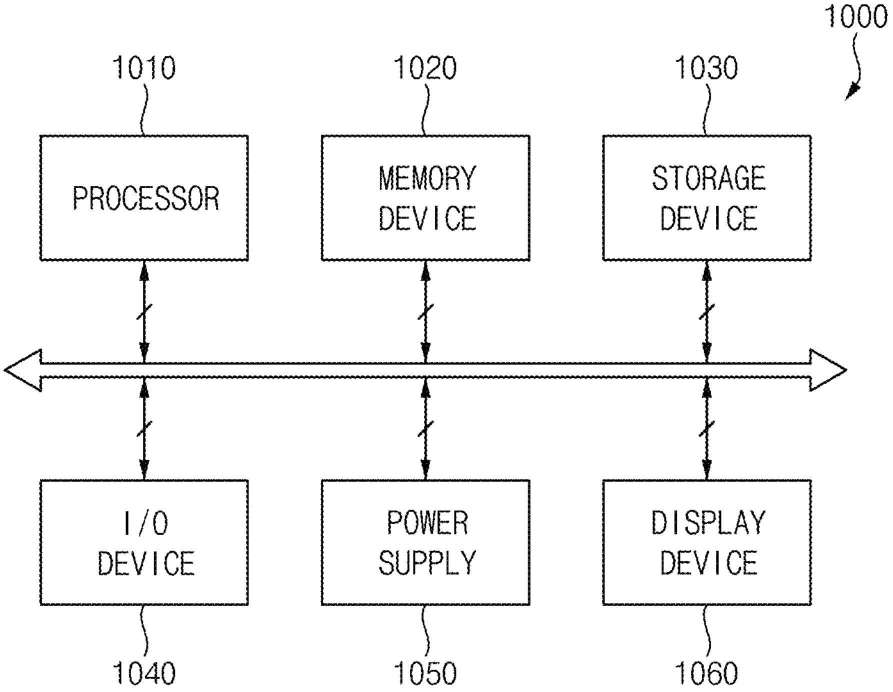
FIG. 46 is a block diagram showing an electronic device.
Figure 47:
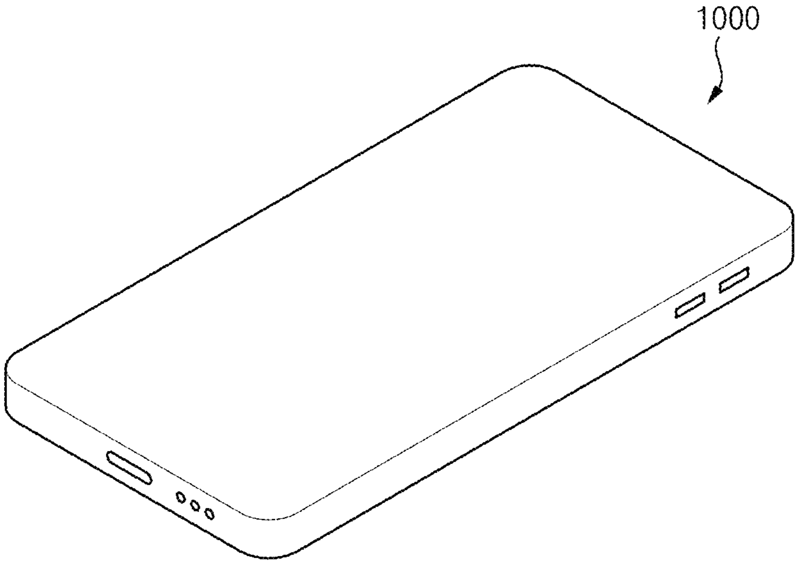
FIG. 47 is a diagram showing an embodiment in which an electronic device of FIG. 46 is implemented as a smart phone.

FIG. 46 is a block diagram showing an electronic device 1000. FIG. 47 is a diagram showing an embodiment in which an electronic device 1000 of FIG. 46 is implemented as a smart phone.

Referring to FIGS. 46 and 47, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and/or the like.

In one or more embodiments, as illustrated in FIG. 47, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and/or the like.

The processor 1010 may perform various computing functions. The processor 1010 may be a micro-processor, a central processing unit (CPU), an application processor (AP), and/or the like. The processor 1010 may be coupled to other components via an address bus, a control bus, a data bus, and/or the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like and/or at least one volatile memory device such as a dynamic random access memory (DRAM) device, a static random access memory (SRAM) device, a mobile DRAM device, and/or the like.

The storage device 1030 may include a solid state drive (SSD) device, a hard disk drive (HDD) device, a CD-ROM device, and/or the like.

The I/O device 1040 may include an input device such as a keyboard, a keypad, a mouse device, a touch-pad, a touch-screen, and/or the like, and an output device such as a printer, a speaker, and the like. In one or more embodiments, the I/O device 1040 may include the display device 1060.

The power supply 1050 may provide power for operations of the electronic device 1000.

The display device 1060 may be connected to other components through buses or other communication links.

The present disclosure may be applied to any display device and any electronic device including the touch panel. For example, the present disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings, spirit, and scope of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the embodiments, as well as other embodiments, are intended to be included within the scope of the appended claims and their equivalents. The present is defined by the following claims, with equivalents of the claims to be included therein.

What is claimed is:

1. An emission selection driver comprising:

an emission driver configured to output an emission signal in response to a voltage of an emission control node and a voltage of an inverted emission control node; and a selection driver configured to output a selection signal based on the voltage of the emission control node, the voltage of the inverted emission control node, and an enable signal, wherein the selection driver comprises:

a first selection transistor comprising a gate electrode configured to receive the voltage of the emission control node, a first electrode configured to receive the enable signal, and a second electrode;

a second selection transistor comprising a gate electrode connected to the second electrode of the first selection transistor, a first electrode configured to receive the voltage of the inverted emission control node, and a second electrode connected to a selection control node;

a third selection transistor comprising a gate electrode configured to receive the voltage of the emission control node, a first electrode configured to receive a high gate voltage, and a second electrode connected to the selection control node;

a fourth selection transistor comprising a gate electrode connected to the selection control node, a first electrode configured to receive the high gate voltage, and a second electrode connected to a selection output node from which the selection signal is output; and a fifth selection transistor comprising a gate electrode configured to receive the voltage of the emission control node, a first electrode configured to receive a low gate voltage, and a second electrode connected to the selection output node.

2. The emission selection driver of claim 1, wherein the enable signal is a global scan signal, and the emission signal and the selection signal are progressive scan signals.

3. The emission selection driver of claim 1, wherein the voltage of the emission control node has a phase opposite to the voltage of the inverted emission control node, and wherein the emission signal has a same phase as the voltage of the emission control node.

4. The emission selection driver of claim 1, wherein, when a pulse of the enable signal overlaps a pulse of the emission signal, a pulse of the selection signal is output.

5. The emission selection driver of claim 1, wherein, when a pulse of the enable signal is output before a pulse of the emission signal and the pulse of the enable signal partially overlaps with the pulse of the emission signal, the selection signal has no pulse.

6. The emission selection driver of claim 1, wherein, when the enable signal maintains a first level, a pulse of the selection signal is output.

7. The emission selection driver of claim 1, wherein, when a pulse of the enable signal is output later than a pulse of the emission signal and the pulse of the enable signal partially overlaps with the pulse of the emission signal, a pulse of the selection signal is output.

8. The emission selection driver of claim 1, wherein a pulse of the selection signal has a same length and timing as a pulse of the emission signal.

9. The emission selection driver of claim 1, wherein the first to fifth selection transistors are P-type transistors.

10. The emission selection driver of claim 1, wherein the selection driver further comprises:

a selection capacitor comprising a first electrode configured to receive the high gate voltage and a second electrode connected to the selection control node.

11. The emission selection driver of claim 1, wherein, when the voltage of the emission control node has a first level, the voltage of the inverted emission control node has a second level, and the enable signal has the first level, the selection signal has the first level.

12. The emission selection driver of claim 1, wherein, when the voltage of the emission control node has a first level, the voltage of the inverted emission control node has a second level, and the enable signal has the second level, the selection signal has the first level.

13. The emission selection driver of claim 1, wherein, when the voltage of the emission control node has a second level and the voltage of the inverted emission control node has a first level, a voltage of the gate electrode of the second selection transistor maintains a previous state.

14. The emission selection driver of claim 13, wherein, when the previous state of the voltage of the gate electrode of the second selection transistor is the first level, the selection signal has the second level.

15. The emission selection driver of claim 13, wherein, when the previous state of the voltage of the gate electrode of the second selection transistor is the second level, a voltage of the selection control node maintains a previous state.

16. The emission selection driver of claim 15, wherein, when the previous state of the voltage of the selection control node is the second level, the selection signal maintains the previous state.

17. An emission selection gate driver comprising:

an emission driver configured to output an emission signal in response to a voltage of an emission control node and a voltage of an inverted emission control node;

a selection driver configured to output a selection signal based on the voltage of the emission control node, the voltage of the inverted emission control node, and an enable signal; and a gate driver configured to output a gate signal which is masked based on the selection signal, wherein the emission selection driver comprises:

a first selection transistor comprising a gate electrode configured to receive the voltage of the emission control node, a first electrode configured to receive the enable signal, and a second electrode;

a second selection transistor comprising a gate electrode connected to the second electrode of the first selection transistor, a first electrode configured to receive the voltage of the inverted emission control node, and a second electrode connected to a selection control node;

a third selection transistor comprising a gate electrode configured to receive the voltage of the emission control node, a first electrode configured to receive a high gate voltage, and a second electrode connected to the selection control node;

a fourth selection transistor comprising a gate electrode connected to the selection control node, a first electrode configured to receive the high gate voltage, and a second electrode connected to a selection output node from which the selection signal is output; and a fifth selection transistor comprising a gate electrode configured to receive the voltage of the emission control node, a first electrode configured to receive a low gate voltage, and a second electrode connected to the selection output node.

18. The emission selection gate driver of claim 17, wherein the enable signal is a global scan signal, and the emission signal and the selection signal are progressive scan signals.

19. An electronic device comprising a display device having an emission selection driver to drive the display device, the emission selection driver comprising:

an emission driver configured to output an emission signal in response to a voltage of an emission control node and a voltage of an inverted emission control node; and a selection driver configured to output a selection signal based on the voltage of the emission control node, the voltage of the inverted emission control node, and an enable signal, wherein the emission selection driver comprises:

a first selection transistor comprising a gate electrode configured to receive the voltage of the emission control node, a first electrode configured to receive the enable signal, and a second electrode;

a second selection transistor comprising a gate electrode connected to the second electrode of the first selection transistor, a first electrode configured to receive the voltage of the inverted emission control node, and a second electrode connected to a selection control node;

a third selection transistor comprising a gate electrode configured to receive the voltage of the emission control node, a first electrode configured to receive a high gate voltage, and a second electrode connected to the selection control node;

a fourth selection transistor comprising a gate electrode connected to the selection control node, a first electrode configured to receive the high gate voltage, and a second electrode connected to a selection output node from which the selection signal is output; and a fifth selection transistor comprising a gate electrode configured to receive the voltage of the emission control node, a first electrode configured to receive a low gate voltage, and a second electrode connected to the selection output node.

20. The electronic device of claim 19, wherein the electronic device is a smart phone, a cellular phone, a video phone, a smart pad, a smart watch, a tablet PC, a car navigation system, a computer monitor, a laptop, or a head mounted display (HMD) device.

* * * * *